US006938920B2

(12) United States Patent
Inoue et al.

(10) Patent No.: US 6,938,920 B2
(45) Date of Patent: Sep. 6, 2005

(54) OCCUPANT ARRESTING DEVICE

(75) Inventors: Michio Inoue, Aichi (JP); Chiharu Totani, Aichi (JP); Toshinori Tanase, Aichi (JP); Shinji Oguchi, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 223 days.

(21) Appl. No.: 10/257,932

(22) PCT Filed: Apr. 27, 2001

(86) PCT No.: PCT/JP01/03694

§ 371 (c)(1), (2), (4) Date: Oct. 21, 2002

(87) PCT Pub. No.: WO01/83272

PCT Pub. Date: Nov. 8, 2001

(65) Prior Publication Data

US 2003/0075906 A1 Apr. 24, 2003

(30) Foreign Application Priority Data

May 1, 2000 (JP) ....................................... 2000-132581
May 26, 2000 (JP) ....................................... 2000-157323
Jun. 1, 2000 (JP) ....................................... 2000-164019
Jul. 7, 2000 (JP) ....................................... 2000-207302
Feb. 14, 2001 (JP) ......................................... 2001-37451

(51) Int. Cl.[7] .......................... B06R 21/22; B06R 21/06
(52) U.S. Cl. ..................................... 280/730.2; 280/749
(58) Field of Search ............................... 280/730.2, 749

(56) References Cited

U.S. PATENT DOCUMENTS 5,265,903 A 11/1993 Kuretake et al.
5,752,713 A 5/1998 Matsuura et al.
6,149,195 A * 11/2000 Faigle ........................ 280/749
6,158,767 A 12/2000 Sinnhuber

FOREIGN PATENT DOCUMENTS

| | | | | |
|---|---|---|---|---|
| DE | 4238427 A1 | | 5/1993 | |
| DE | 19547494 A1 | | 7/1997 | |
| DE | 19650940 A1 | | 6/1998 | |
| DE | 29905770 U1 | | 1/2000 | |
| DE | 10015160 | * | 10/2000 | |
| EP | 0849129 A1 | | 6/1998 | |
| JP | A-5-38993 | | 2/1993 | |
| JP | A-11-208410 | | 8/1999 | |
| JP | A-11-245758 | | 9/1999 | |
| JP | A-11-301399 | | 11/1999 | |
| JP | A-2000-33847 | | 2/2000 | |
| JP | B2-3039089 | | 3/2000 | |
| JP | A-2000-71927 | | 3/2000 | |
| WO | WO 93/09977 | * | 5/1993 | 280/749 |

* cited by examiner

*Primary Examiner*—Eric Culbreth
(74) *Attorney, Agent, or Firm*—Posz Law Group, PLC

(57) ABSTRACT

An occupant restraining device (S1) comprises a shielding member (51F) and an airbag (104F). The shielding member (51F) in action is deployed from the peripheral edge (DW) of a window (WF) of a vehicle to shield the window. The airbag (104F) in action is expanded and inflated from the peripheral edge (UW) of the window that it can be interposed between the shielding member (51F) and an occupant (M). The airbag (104F) allows the side of the lower end (105*b*) at the time of completion of the expansion and inflation to move in the direction generally perpendicular to the window (WF). Even if the occupant (M) is close to the window (WF), the expanded and inflated airbag (104F) is smoothly interposed between the occupant (M) and the window (WF).

18 Claims, 46 Drawing Sheets

OCCUPANT ARRESTING DEVICE

BACKGROUND OF THE INVENTION

The present invention relates to an occupant restraining device for shielding a window of a vehicle, when the vehicle makes a rollover (or a lateral turning) or a side collision, to arrest an occupant in the inner side of the vehicle.

In the prior art, there is a device for shielding a window of a vehicle with an expanded airbag. As known in International Laid-Open No. WO98/19894, for example, the airbag is folded and housed in the upper edge portion of the peripheral edge of the window and is inflated at a predetermined time with an inflating gas from an inflator thereby to shield the window with the inflated airbag.

Moreover, the airbag at the time of completion of the expansion and inflation is so arranged by establishing a tension in the longitudinal direction of the vehicle that it may not be pushed and moved to the outer side of the vehicle by the occupant.

However, the following problems arise if this airbag is employed in an occupant restraining device which is activated when a rollover (or a lateral turning) of the vehicle is predicted.

While the vehicle is rolling over, more specifically, the upper half of the occupant's body cannot avoid large lateral movements as the vehicle turns. If the airbag is expanded and inflated with the occupant 's head being extremely close to the window, the airbag may not be interposed between the occupant Is head and the window but may be disposed on the inner side of the occupant's head. If the airbag is then tensed in the longitudinal direction of the vehicle according to the completion of the inflation of the airbag, the airbag cannot be rearranged between the occupant's head and the window but pushes the head to the window.

DISCLOSURE OF THE INVENTION

The present invention contemplates to solve the above-specified problems and has an object to provide an occupant restraining device which can interpose an expanded and inflated airbag smoothly between an occupant and a window even if the occupant is positioned close to the window.

The object of the present invention can be achieved by an occupant restraining device having the following construction. Specifically, an occupant restraining device of the invention comprises a shielding member and an airbag. The shielding member in action is so deployed from the peripheral edge of a window of a vehicle that it can shield the window. The airbag in action is expanded and inflated from the peripheral edge of the window so that it can be interposed between the shielding member and an occupant. Moreover, the airbag of the invention allows its lower end side at the time of completion of the expansion and inflation to move in a direction generally perpendicular to the window.

In the occupant restraining device according to the present invention, the lower end side of the airbag can move generally perpendicularly of the window even if it is arranged on the inner side of the head of an occupant close to the window at the beginning of expansion and inflation thereof. Therefore, the expanded airbag does not press the occupant forcibly toward the window. On the contrary, while the vehicle is making a rollover, a lateral motion and a side collision, the occupant may move away from the window. At this time, the airbag is enabled to go between the occupant and the shielding member by moving its lower end side to the inner side and returning. If the airbag is thus interposed between the occupant's head and the shielding member, it can restrain the occupant's head properly.

In the occupant restraining device of the present invention, even if the occupant's head is positioned closer to the window at the beginning of the expansion and inflation of the airbag, which tends to locate the airbag on the inner side of the occupant 's head, the shielding member is arranged on the outer side of the occupant and can arrest the occupant's head. Therefore, the head arresting performance is not deteriorated.

Moreover, the shielding member of the occupant restraining device of the invention may be deployed at the time of a side collision of the vehicle but is desired to be deployed at the time of detection of a rollover of the vehicle. This is because the vehicle is demanded to have a higher performance to restrain the occupant in the vehicle at the time of a rollover than at the time of a side collision. Moreover, the shielding member of this case is also desired to be so arranged that it may substantially rise at the deployment time from the lower edge side of the window peripheral edge to shield the window. This is because that construction can arrange the shielding member smoothly to raise the occupant upward, even if the occupant leans against the window peripheral edge on the inner side.

Moreover, the shielding member of the occupant restraining device of the present invention may be housed in the side of a door, if a window is arranged in the door. If the window is arranged not in the door but in the body side of the vehicle, it is natural that the shielding member may be housed in the body side. Here, the airbag needs a mechanism for introducing the inflating gas thereinto. Therefore, it is difficult to house the airbag in the peripheral edge of the window of the door. Even if the window is arranged in the door, it is desired to house the airbag in the body side of the vehicle, i.e., in the inner side of a roof side rail portion.

As the shape at the time of deployment completion, on the other hand, the shielding member is desired to have such an oblique side to cross the window obliquely as can shield the window with its lower side.

In this case, the shielding member can raise, when deployed, and its oblique side is shaped so that the occupant leaning against the peripheral edge of the window can be raised upward.

In this case, on the other hand, the shielding member is so shaped as to shield the region on the lower side of the oblique side thereby to minimize the area for shielding the upper side of the window. Therefore, it is possible to shorten the time period from the action start to the deployment completion. Moreover, the shielding member can reduce a material therefor.

Moreover, the shielding member can minimize the entire deployment distance. Therefore, the occupant restraining device employing such shielding member can suppress the output of deployment means so that it can shield the window efficiently.

Here, the shielding member having an oblique side shields a small area of the window. However, if the oblique side has its upper end side set closer to the position of the occupant than its lower end side, the shielding member having completed its deployment can arrest the occupant without any problem.

In the shielding member having an oblique side, moreover, the shielding member may be so folded and housed that the oblique side may come close to a vertical edge portion extending upward from either one of the front or rear end portions at the lower edge portion of the window peripheral edge in the shielded region of the window, and may also be so arranged that the oblique side may deploy its lower end side in the direction apart from the side of the vertical edge portion on the housed side.

In this case, when the deployment means is active, the oblique side can be moved upward by moving its lower end side laterally. In this case, moreover, the deployment means can be arranged at the lower edge portion of the window peripheral edge. Specifically, there is a larger space on the lower side of the window than on the upper side of the window peripheral edge having an adjoining window or a ceiling portion. Therefore, the deployment means can be easily arranged at the lower edge portion of the window peripheral edge. Moreover, a tension along the oblique side of the shielding member at the time of completion of deployment can be established to support the airbag stably.

On the other hand, the airbag of the occupant restraining device of the present invention is desired to be folded and housed in the upper edge portion of the window peripheral edge, and to be connected and supported at its upper end side to and by the upper edge portion of the window peripheral edge.

In this case, the airbag at the time of completion of expansion and inflation has its lower end side as a free end to swing in the direction generally perpendicular to the window. Therefore, even if the airbag is arranged on the inner side of the head of the occupant close to the window at the beginning of the expansion and inflation, its lower end side swings to the outer side, when the occupant leaves the window according to rollover, lateral turning or side collision of the vehicle, so that it can easily go between the occupant and the shielding member.

Moreover, the airbag is desired to be so arranged that the substantially entire length of the lower end to shield the inner side of the window at the time of completion of expansion and inflation can overlap the shielding member horizontally at the deployment completion time. With this construction, when the airbag takes the mode in which it is clamped between the occupant's head and the shielding member, the airbag is stably supported by the shielding member so that the occupant is restrained in excellent cushioning properties.

Moreover, the airbag may cover the inner side portion of a pillar portion of the vehicle at the time of completion of the expansion and inflation. With this construction, the occupant can be prevented from interfering directly with the inner portion of the pillar portion if the airbag is arranged to cause its portion to cover the inner portion of the pillar portion at the time of completion of the expansion and inflation. At this time, the airbag is stably supported by the pillar portion.

In this case, the airbag may cover a portion of an adjoining window over the inner side portion of the pillar portion. With this construction, even if a shielding member and an airbag are separately arranged in the adjoining window, the area of the window outside of their arranged regions can be covered with a part of the airbag. Even if the portion of the airbag restrains the occupant's head, moreover, the airbag is close to the inner side portion of the pillar portion and is supported by the inner side portion. Therefore, the occupant can be arrested as in a stable state as possible.

In case a plurality of airbags are arranged, moreover, the individual airbags may be connected at their lower edge sides to each other. With this construction, the airbags having the connected lower edge sides can swing integrally with each other so that their occupant restraining states can be stabilized.

In case a plurality of airbags are arranged in the longitudinal direction of the vehicle, on the other hand, it is desired that an inflator is arranged between the airbags so as to feed each of airbags with the inflating gas. With this construction, the inflating gas can be quickly fed to both airbags on the two sides of the inflator thereby to shorten the time period from the beginning to the completion of the expansion and inflation of the airbags on the two sides of the inflator.

In case three or more airbags are arranged, moreover, they can be constructed to share one inflator by using feed pipes or the like individually. Then, it is possible to reduce the number of parts and steps of mounting the occupant restraining device on the vehicle.

Moreover, the occupant restraining device may further comprise: an inflator for feeding the airbag with an inflating gas; and a feed pipe for feeding the inflating gas from the inflator into the airbag. In this case, the feed pipe may be inserted straight into the upper edge side in the airbag over the substantially entire length in the longitudinal direction of the vehicle on the upper edge side of the airbag. With this construction, the center of swinging motions of the airbag can be formed so straight at the portion of the feed pipe inserted into the upper edge side in the airbag as to extend along the longitudinal direction of the vehicle. As a result, the airbag lower edge side can swing smoothly in its entirety.

Moreover, the airbag at the time of completion of expansion and inflation may include a main portion having a generally rectangular sheet shape extending downward from the upper edge side, and a bulging portion bulging from at least one edge of the main portion in the longitudinal direction of the vehicle. At the folding time, the airbag may be so folded in the upper edge portion of the airbag with the bulging portion taken in the main portion. With this construction, the area of the airbag at the time of completion of the expansion and inflation can be made larger by an area of the bulging portion while the length along the upper edge side of the airbag at the folded time being kept compact.

If the bulging portion is constructed in this case to cover the inner side portion of a pillar portion, the airbag can be protruded from the upper edge side of the window to cover the inner side portion of the pillar portion. In case a pillar garnish is arranged on the inner side of the pillar portion, therefore, no means need to be sought for preventing the airbag from intruding in the outer side of the pillar garnish unlike the case in which the airbag is protruded from the upper side of the pillar portion.

In case the vehicle is provided at a roof side rail portion with an upper rail which guides the opening/closing action of a slide door and which is provided at its front end side with a bent portion bent to the inner side, moreover, the occupant restraining device is desired to include at least two front/rear airbags arranged separately in front and in rear of the bent portion of the upper rail, and the front/rear airbags are desired to be folded and housed on the inner side of the roof side rail portion and to be connected to one feed pipe for feeding the inflating gas from one inflator.

With this construction, the front/rear airbags are connected to the single feed pipe for feeding the inflating gas from the single inflator and are spaced to each other longitudinally across the bent portion of the upper rail.

In case the folded front/rear airbags are to be housed in the roof side rail portion of the vehicle, more specifically, they can be arranged in front and in rear of the bent portion of the upper rail so that they can be arranged in the roof side rail portion without any interference with the bent portion of the upper rail.

Moreover, since the member for feeding the front/rear airbags with the inflating gas is made of no bulky single feed pipe, this feed pipe itself can be made to have as small diameter as possible as long as it can feed the inflating gas. Therefore, the feed pipe can be arranged without any problem in the roof side rail portion including the side of the bent portion of the upper rail.

In the occupant restraining device thus constructed, therefore, the folded airbag can be housed without any problem in the roof side rail portion of the vehicle having a slide door, so that the airbag can be easily mounted on the vehicle having a slide door.

A plurality of front/rear airbags may be arranged individually on the front side and the rear side of the aforementioned bent portion according to the number of windows.

Moreover, the front airbag which is folded and housed in the portion of the roof side rail portion on the front side of the bent portion may be provided with a cover portion for covering the inner side portion of a pillar portion located below the bent portion at the time of expansion and inflation. With this construction, at the time of the expansion and inflation of the front airbag, the cover portion covers the inner side portion of the pillar portion located below the bent portion so that the airbag can arrest the occupant arranged at the position of the pillar portion properly.

If the feed pipe is arranged at the arranged position of the upper rail in the longitudinal direction generally parallel to the upper rail, its interference with the upper rail can be prevented thereby to arrange the feed pipe easily at the roof side rail portion.

In case the airbag folded is covered with a door portion pushing and opening the lower edge side thereof to the inner side at the time of expansion and inflation, a hinge portion at the opening time of a door portion is preferred to be arranged substantially straight along the longitudinal direction of the vehicle. With this construction, even if the airbag at the time of completion of the expansion and inflation interferes with the door portion when the airbag swings, the door portion easily moves to the inner side over its entire length, so that the lower end side of the airbag makes smooth swinging motions.

BRIEF DESCRIPTION OF THE DRAWINGS

FIGS. 9A, 9B, and 9C are diagrams showing a sequence of the behaviors of an airbag of the first embodiment at the time of a rollover of the vehicle.

BEST MODE FOR CARRYING OUT THE INVENTION

Figure 1:
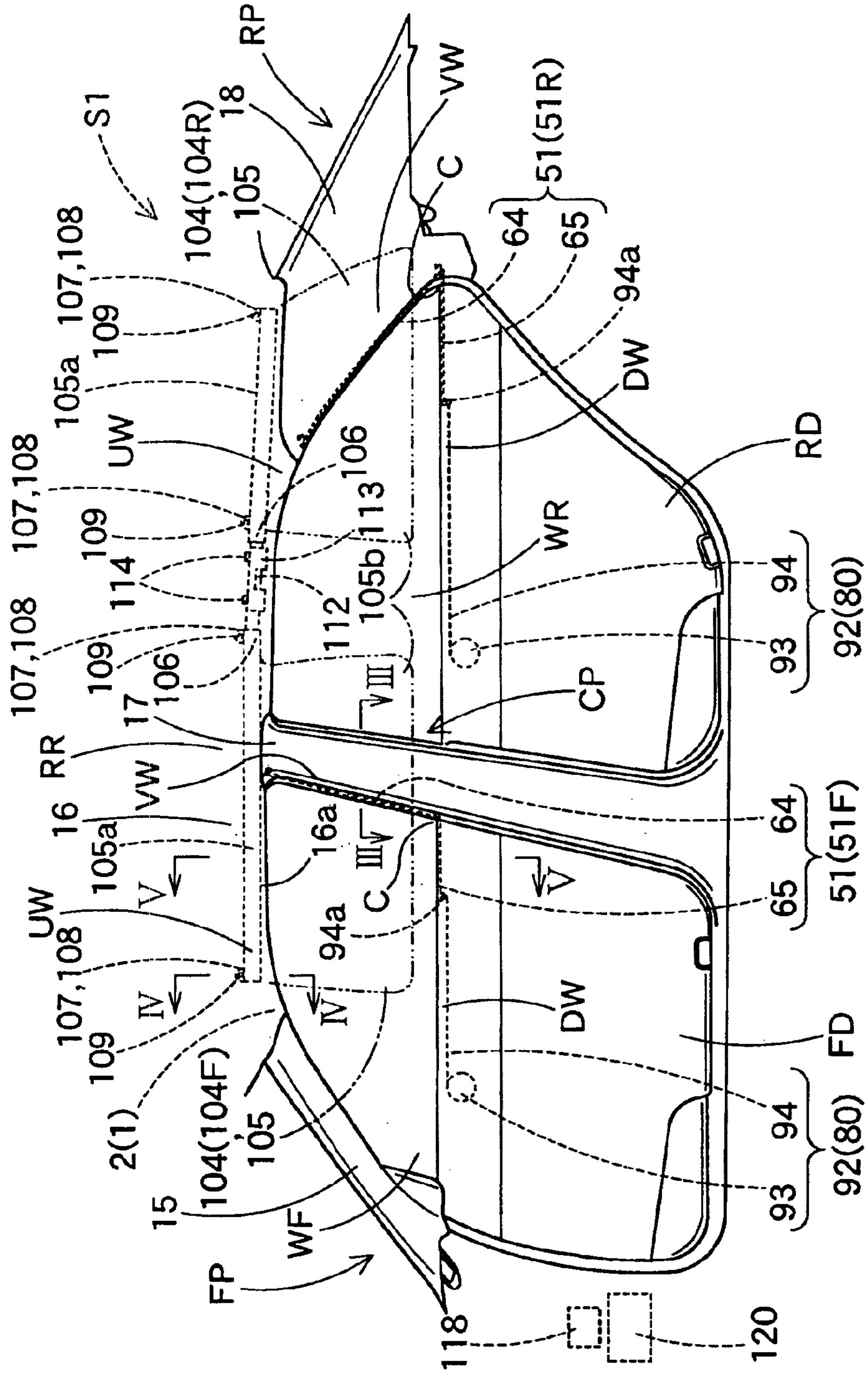
FIG. 1 is a front elevation showing an occupant restraining device according to a first embodiment of the present invention as taken from the inside of a vehicle.

One embodiment of the present invention will be described with reference to the accompanying drawings.

An occupant restraining device S1 of the first embodiment is constructed, as shown in FIGS. 1, 2, 5 and 8, to include: a shielding member 51 (51F/51R) which is so deployed from the peripheral edge of a window WF/WR as to shield the inner side of the window WF/WR; and an airbag 104 (104F/104R) which is so inflated from the peripheral edge of the window WF/WR as to be interposed between the shielding member 51 and an occupant, e.g. a driver or a passenger.

The shielding member 51 is activated by a pretensioner 92 acting as deployment means 80. The airbag 104 is expanded/inflated by an inflating gas from an inflator 112. The pretensioner 92 and the inflator 112 are operationally controlled by a control device 120. Specifically, the control device 120 activates the pretensioner 92 and the inflator 112 when it receives a rollover detection signal predicting a rollover of the vehicle from the rollover sensor 118. Here, the control device 120 and the rollover sensor 118 are arranged at predetermined positions of the vehicle.

In the vehicle of the first embodiment, moreover, the window WF/WR is arranged in each of a front door FD and a rear door RD, and the shielding member 51F is arranged in the front door FD whereas the shielding member 51R is arranged in the rear door RD. Moreover, the airbag 104F is arranged at a roof side rail portion RR on the side of a body 1 and in the peripheral edge of the window WF from over the front door FD to over a center pillar portion CP, and the airbag 104R is arranged at the roof side rail portion RR on the side of the body 1 and in the peripheral edge of the window WR from over the rear door RD to over a rear pillar portion RP.

Figure 2:
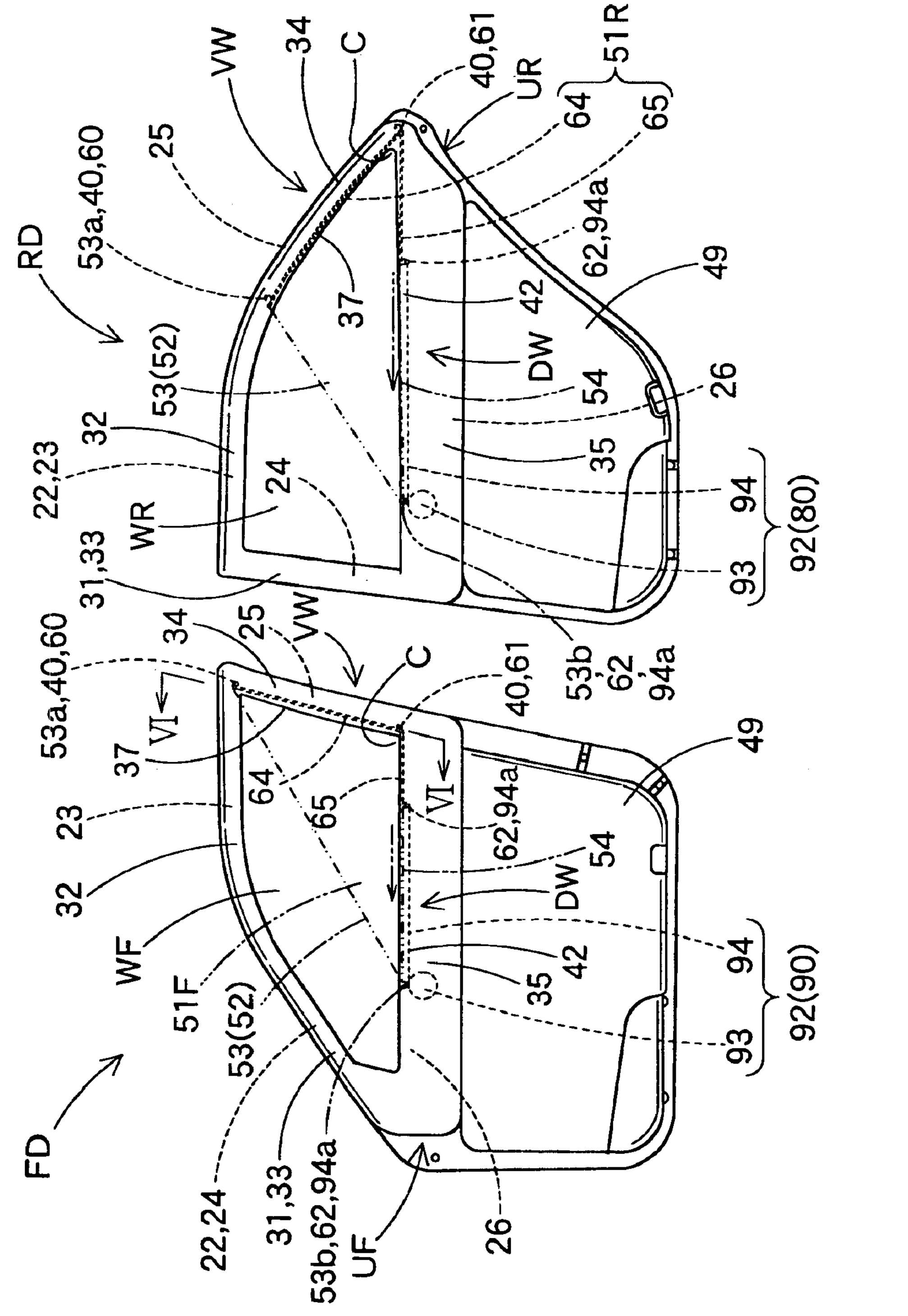
FIG. 2 is a front elevation showing a door of the first embodiment as taken front the inside of the vehicle.

The front door FD and the rear door RD are made to have substantially identical constructions excepting the shapes of the openings and the peripheral edges of the windows WF/WR, as shown in FIG. 2. The front door FD and the rear door RD are constructed to include: a door frame 22 on the outer side; a door frame garnish 31 on the peripheral edge of the window WF/WR of the door frame 22 on the inner side; and a door trim 49 arranged below the garnish 31 of the door frame 22 on the inner side.

Each door frame 22 is made of a sheet metal and constructed to include: an upper edge portion 23 arranged on the peripheral edge around the window WF/WR; front/rear vertical edge portions 24/25 arranged generally vertically on the two front and rear end sides; and a lower edge portion 26 on the lower edge side. Near the upper/lower portions of the rear vertical edge portion 25, there are formed mounting holes 25*a*/25*b* for mounting the individual shielding members 51F/51R (as referred to FIG. 6).

Each door frame garnish 31 is made of a synthetic resin such as a thermoplastic elastomer of polyolefin and is constructed to include an upper edge portion 32, front/rear vertical edge portions 33/34 and a lower edge portion 35 which are individually arranged on the peripheral edge around the window WF/WR and of which: the upper edge portion 32 is located on the upper edge side; the front/rear vertical edge portions 33/34 are arranged generally vertically on the two front/rear end sides; and the lower edge portion 35 is located on the lower edge side. The upper edge portion 32, the front vertical edge portion 33 and the rear vertical edge portion 34 are formed to have such a generally U-shaped section that they can fit on the inner sides of the upper edge portion 23, the front vertical edge portion 24 and the rear vertical edge portion 25 of the door frame 22 in the peripheral edge of the window WF/WR (as referred to FIG. 3).

Figure 3:
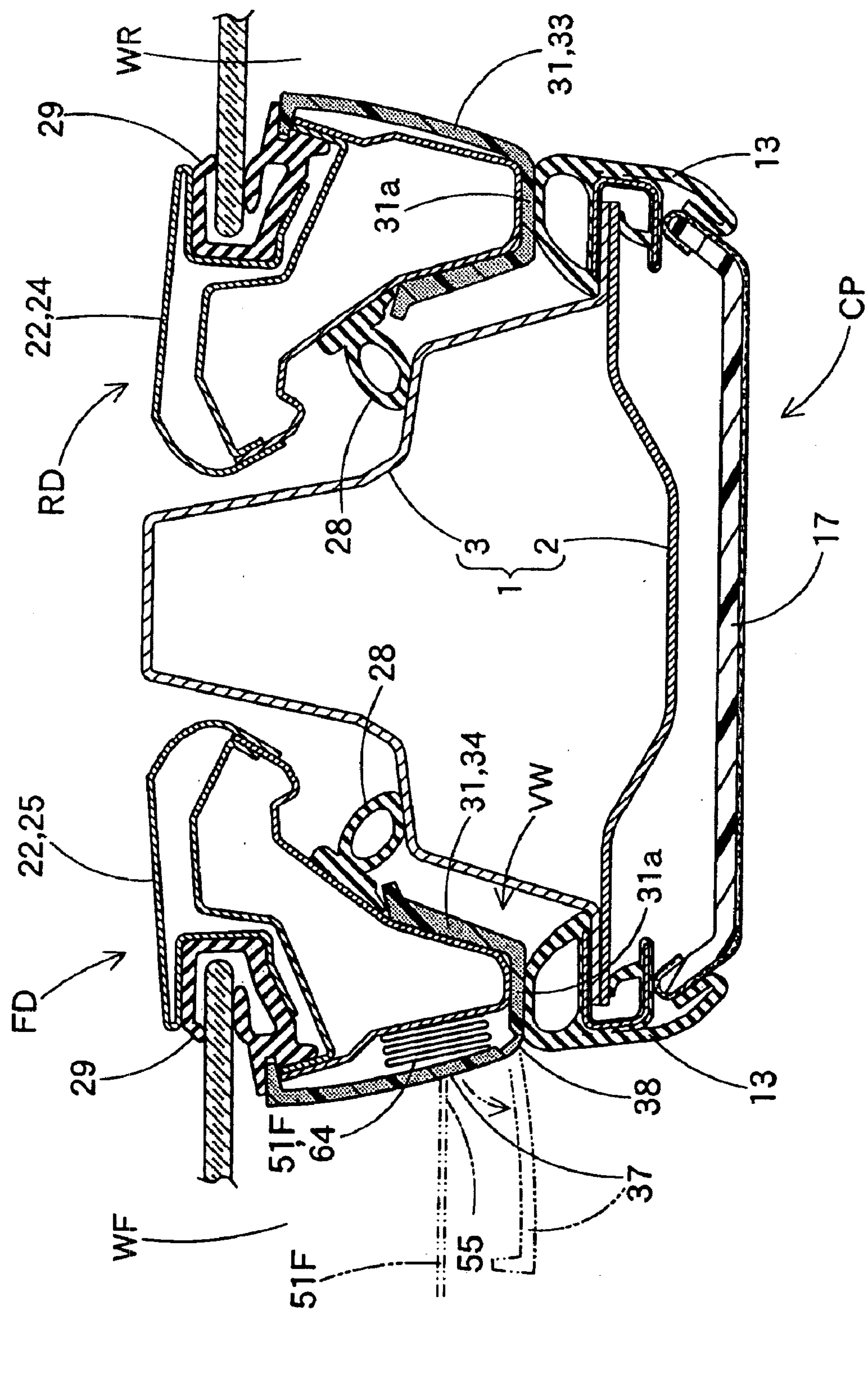
FIG. 3 is a schematic section of a portion III—III of FIG. 1.
Figure 6:
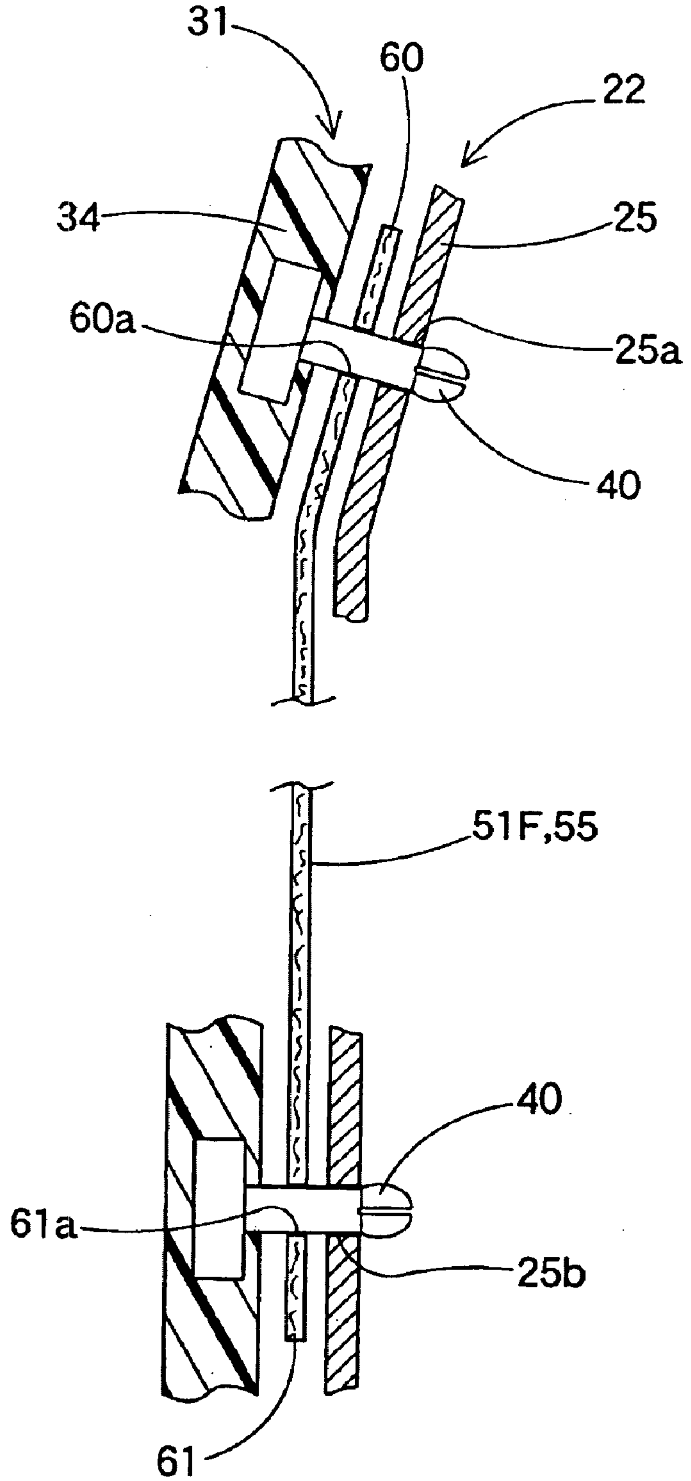
FIG. 6 is a schematic section of a portion VI—VI of FIG. 2.

In the rear vertical edge portion 34 covering the shielding member 51F/51R housed, moreover, there are buried retaining pins 40 which are made of a metal and inserted and retained in the mounting holes 25*a*/25*b* of the door frame 22 (as referred to FIG. 6). At the rear vertical edge portion 34 of each garnish 31, as shown in FIG. 3, there is arranged a door portion 37 which is pushed and opened, when the housed shielding member 51F/51R is deployed, by each shielding member 51. The door portion 37 is provided with a thin hinge portion 38 on the inner side end portion so that it may be easily opened. A later-described vertical edge side housed portion 64 in each shielding member 51 folded and housed is housed between the door portion 37 and the rear vertical edge portion 25 of the door frame 22 while being covered on its front side with the door portion 37.

Figure 5:
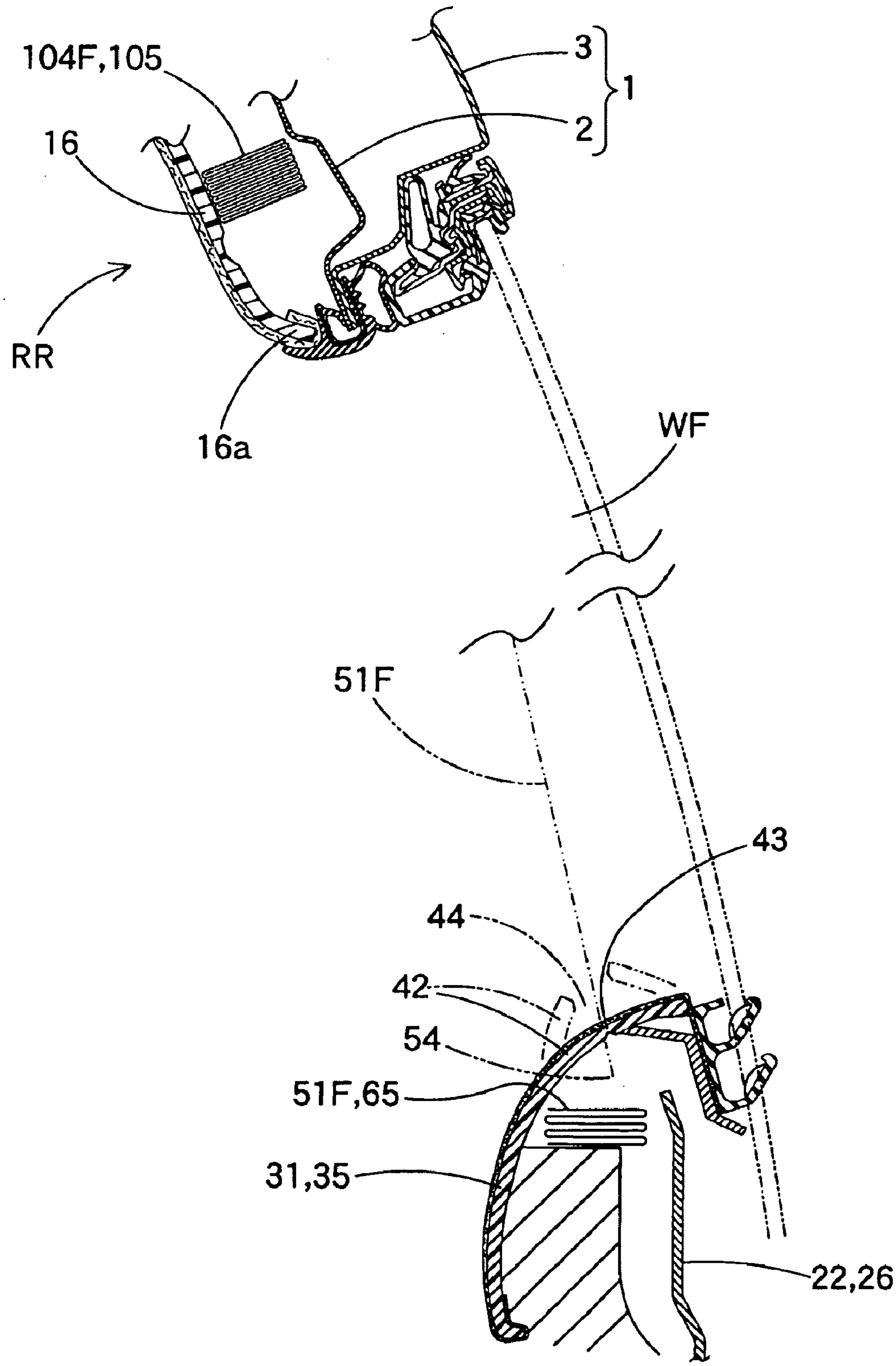
FIG. 5 is a schematic section of a portion V—V of FIG. 1.

On the upper edge side of the lower edge portion 35 of each garnish 31, as shown in FIG. 5, there is arranged a cover portion 42 which is provided with such a thin portion 43 to be broken as extends longitudinally of the vehicle. The cover portion 42 covers not only a later-described lower edge side housed portion 65 of the shielding member 51 folded and housed but also the track of a moving tension member leading end 94*a* in the pretensioner 92 acting as the deployment means 80. When the tension member leading end 94*a* moves forward (as referred to FIGS. 1 and 2), the portion 43 to be broken is broken by the shielding member 51 to form an opening 44, in which the lower edge portion 54 of the expanded shielding member 51 is arranged.

Figure 7:
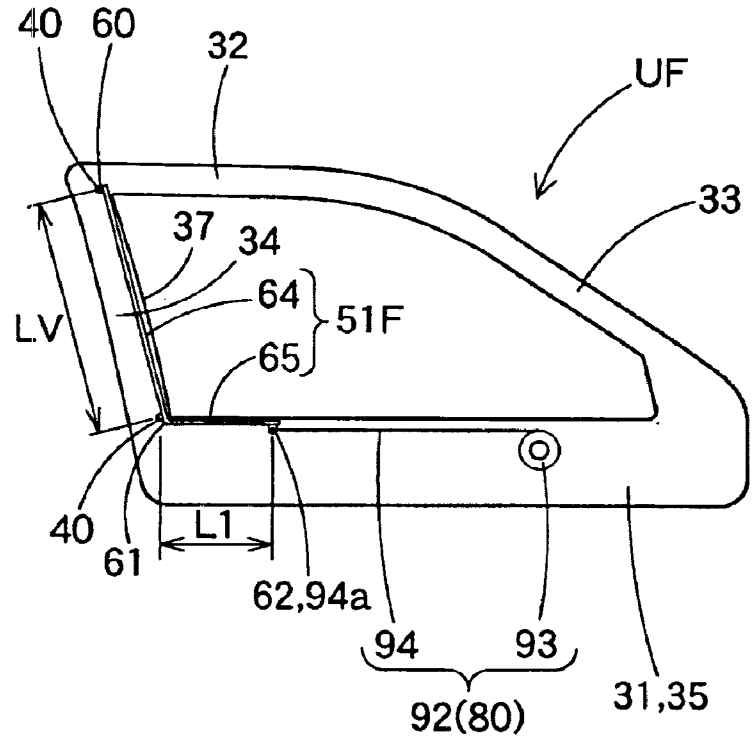
FIG. 7 presents front elevations showing a shielding member unit of the first embodiment as taken from the outside of the vehicle.
Figure 7:
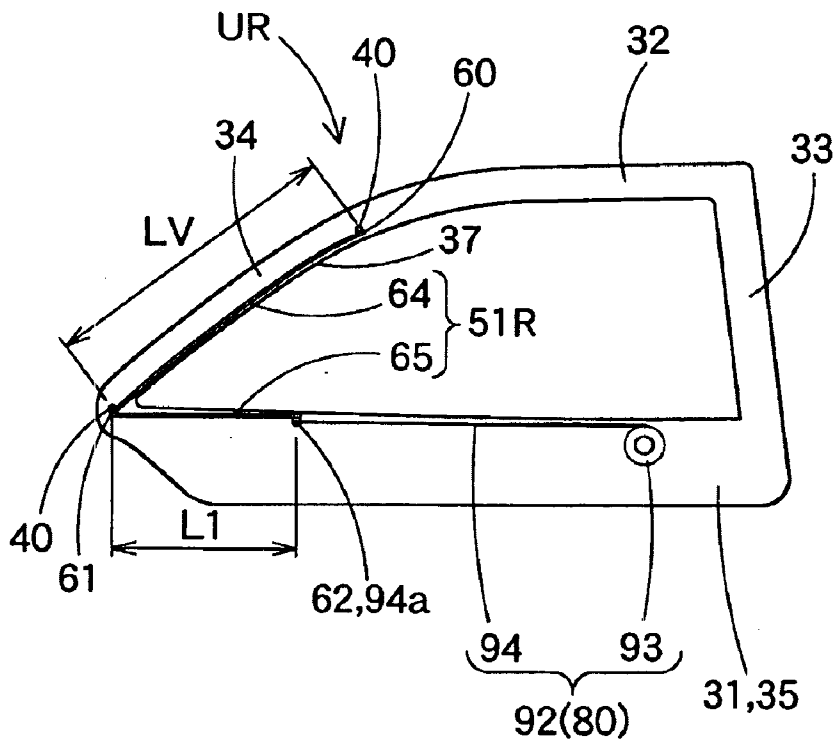

On the outer face of the garnish lower edge portion 35, moreover, there is mounted the body 93 of the pretensioner 92 (as shown in FIG. 7).

The garnish 31 of the first embodiment is constructed as a two-color molded part having a mutual compatibility. Specifically, the door portion 37, the hinge portion 38 and the cover portion 42 are made of a thermoplastic elastomer of polyolefin or the like so that they may be easily opened when the shielding member 51 is expanded, and the remaining portions are made of a synthetic resin such as hard polypropylene or the like so that they are strong.

Moreover, the side of the body 1 of the peripheral edge of the door FD/RD is constructed of an inner panel 2 and an outer panel 3, as shown in FIG. 3, and there is arranged on the side of the body 1 a weather strip 13 for sealing the outer peripheral edge of the door FD/RD. The weather strip 13 is pressed, when the door FD/RD is closed, onto the top portion 31*a* of the garnish 31 protruding to the vehicle's inner side and on the front edge, the lower edge and the rear edge of the door FD/RD on the lower side apart from the garnish 31. The inward protruding top portion 31*a* of the garnish 31 is arranged at the upper edge portion 32, the front vertical edge portion 33 and the rear vertical edge portion 34. On the other hand, a member designated by numeral 28 in FIG. 3 is a weather strip fixed on the outer edge side of the door frame 22. This weather strip 28 is pressed, when the door FD/RD is closed, onto the outer panel 3 on the side of the body 1. Moreover, a member designated by numeral 29 is a glass run.

As shown in FIGS. 1 and 2, each shielding member 51 (51F/51R) is formed of a flexible cloth of polyester or polyamide yarns or the like to shield the window WF/WR. A major part of the shielding member 51F is housed in that vertical edge portion VW of the peripheral edge of the window WF, which is arranged generally vertically on the rear side. A major part of the shielding member 51R is also housed in that vertical edge portion VW of the window WR, which is arranged generally vertically on the rear side. In the case of the first embodiment, the window WF/WR are opened in the front/rear door FD/RD. The shielding member 51F/51R is folded and housed between the rear vertical edge portion 25 of the door frame 22 and the rear vertical edge portion 34 of the door frame garnish 31 in the peripheral edge of the window WF/WR of the door FD/RD, and its excess portion 65 is folded and housed between the lower edge portion 26 of the door frame 22 and the lower edge portion 35 of the door frame garnish 31, as located at the lower edge portion DW of the peripheral edge of the window WF/WR.

Moreover, the shielding member 51F/51R is provided with an oblique portion 53 crossing the window WF/WR obliquely at the time of completion of the deployment, and shields the window WF/WR by the lower side of the oblique side 53. In the first embodiment, the shielding member 51F/51R is formed in a generally triangular sheet which has apexes 60/61 at the upper/lower points of the vertical edge portion VW on the housing side and an apex 62 at the leading end portion extending along the lower edge of the peripheral edge of the window WF/WR.

Moreover, the upper/lower apex portions 60/61 are fixed at the rear vertical edge portion 25 of the door frame 22 in the vertical edge portion VW, and the apex portion 62 on the leading end side is connected to a tension member 94 of the pretensioner 92. The upper/lower apex portions 60/61 are provided with mounting holes 60*a*/61*a*, respectively. Then, the upper/lower apex portions 60/61 are fixed on the door frame 22 by inserting the retaining pins 40, which is buried in the garnish 31 arranged on the inner side of the door frame 22, into the mounting holes 60*a*/61*a* to retain/mount themselves to the mounting holes 25*a*/25*b* formed in the upper/lower portions of the rear vertical edge portion 25 of the door frame 22. The leading end apex portion 62 is connected to the leading end 94*a* of the tension member 94 of the pretensioner 92.

As shown in FIG. 2, moreover, the shielding member 51F/51R is housed in such an inverted L-shape as to cross the corner C of the lower rear side of the window WF/WR. The inverted L-shaped portion is composed of the vertical edge side housed portion 64 covered with the rear vertical edge portion 34 of the door frame garnish 31 and the lower edge side housed portion 65 covered with the lower edge portion 35 of the door frame garnish 31. As shown in FIG. 10, the shielding member S1 is folded in such a folding-fan shape on its upper apex portion 60 in the expanded flat shape as to have a wider folded width on the side of the lower edge portion 54 than on the side of the upper apex portion 60.

Here, the lower edge side housed portion 65 of the shielding member 51 on the lower side in the housed state is housed in about one third to one fifth of the entire length of the lower edge portion 35 close to the garnish rear vertical edge portion 34, not over the entire length of the garnish lower edge portion 35.

The pretensioner 92 as the deployment means 80 of the shielding member 51F/51R is constructed to pull the flexible tension member 94 extending from the body 93 by using the gas pressure of the inflator, an electric motor, the restoring force of a spring, an electromagnetic solenoid and so on. In the case of the first embodiment, moreover, the pretensioner 92 is mounted in advance together with the shielding member 51F/51R on the outer face of the garnish 31 of the door FD/RD.

Figure 4:
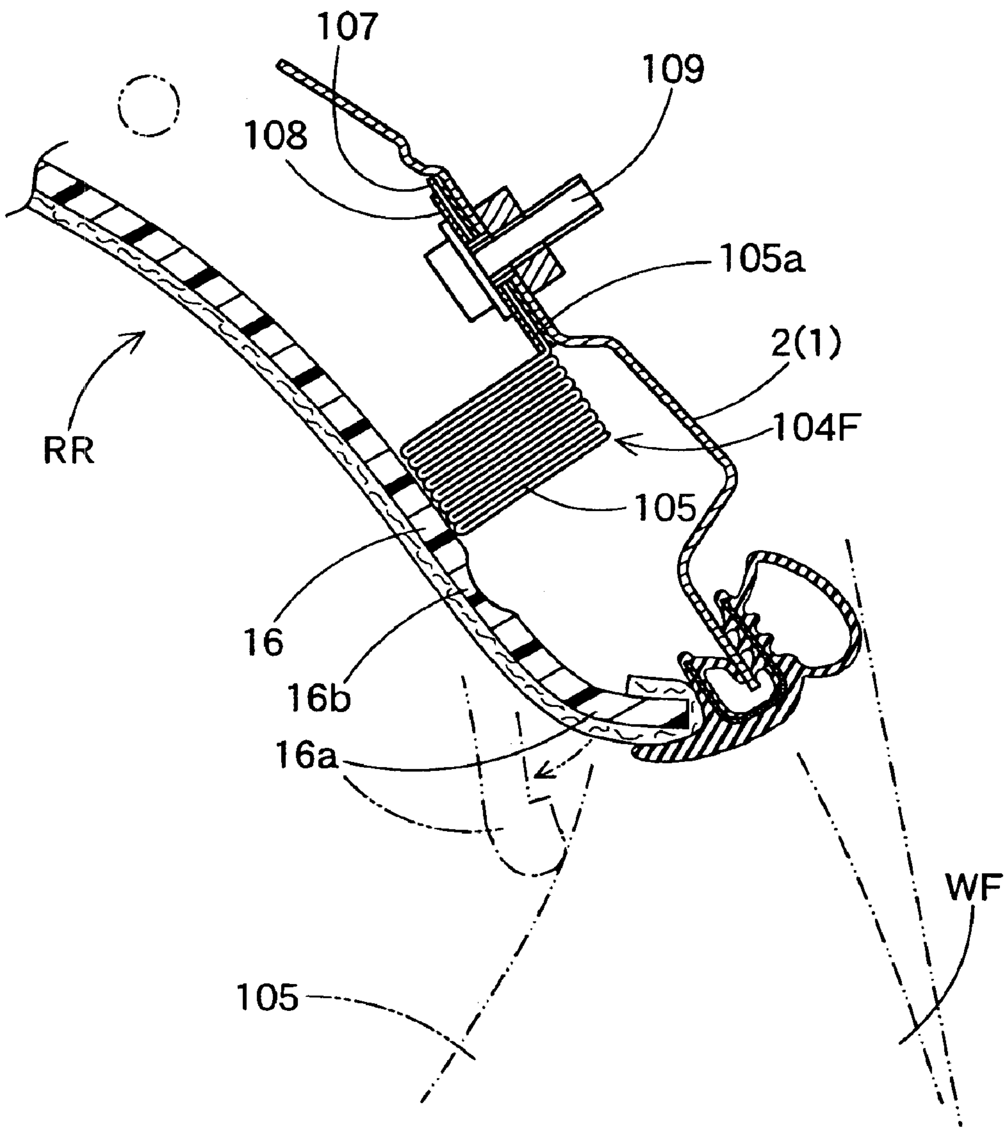
FIG. 4 is a schematic section of a portion IV—IV of FIG. 1.
Figure 8:
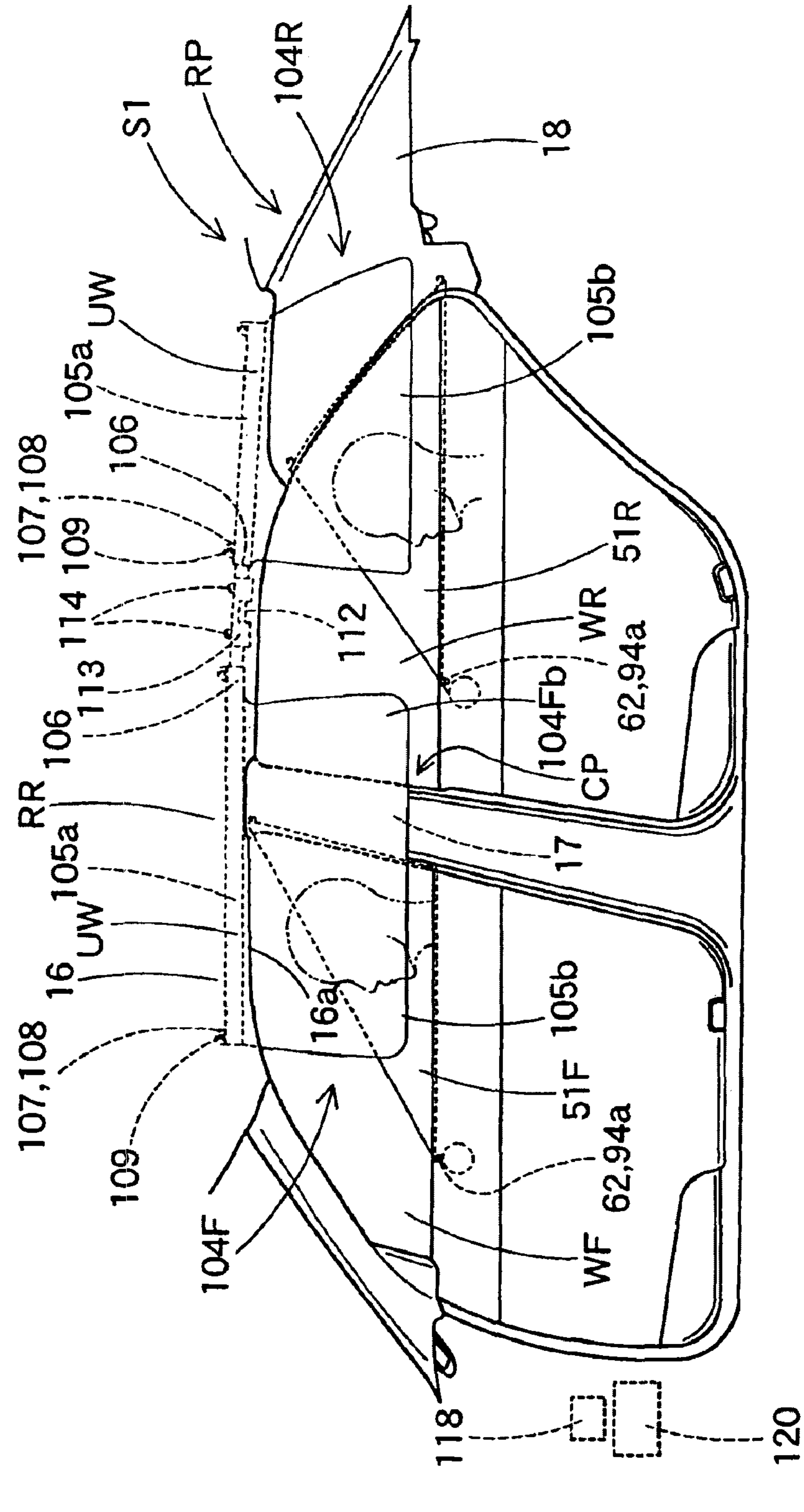
FIG. 8 is a front elevation showing the acting time of the occupant restraining device of the first embodiment as taken from the inside of the vehicle.

The airbags 104F/104R are made separate and independent of each other in a bag shape and are inflated when fed with an inflating gas from the inflator 112, as shown in FIGS. 1 and 8. In the case of the first embodiment, both airbags 104F/104R are formed generally into a rectangular sheet shape. Each airbag 104F/104R is constructed to include: a body portion 105 to be inflated when fed with the inflating gas; and a cylindrical gas inlet port 106 for feeding the inflating gas into the body portion 105. The gas inlet port 106 of the airbag 104F is arranged on the upper rear side of the body portion 105 of the airbag 104F, and the gas inlet port 106 of the airbag 104R is arranged on the upper front side of the body portion 105 of the airbag 104R. These gas inlet portions 106 are individually connected with the inflator 112. On the upper end side of the airbag 104F/104R, there is arranged a plurality of mounting portions 107. These mounting portions 107 are fixed at the roof side rail portion RR on the inner panel 2 on the side of the body 1. Specifically, on the mounting portion 107, as shown in FIG. 4, there is fixed a mounting bracket 108, with which the mounting portion 107 is fixed on the inner panel 2 by means of bolt 109.

Moreover, the airbags 104F/104R are individually fixed only at the upper end sides 105*a* of their body portions 105 on the inner panel 2, when expanded/inflated, by using individual mounting portions 107. In other words, the airbags 104F/104R are so arranged that the sides of the body portion lower ends 105*b* at the time of expansion/inflation are allowed to act as free ends, i.e., to swing inward and outward in the directions generally normal to the windows WF/WR.

Moreover, the airbag 104F/104R is folded in bellows from the lower end 105*b* to the upper end 105*a* and is housed in an upper edge portion UW of the peripheral edge of the window WF/WR. In the embodiment, the airbag 104F/104R thus folded is housed while being covered with a roof head lining 16 on the inner side of the roof side rail portion RR. This roof head lining 16 is made of a synthetic resin and is provided at its lower edge with a door portion 16*a* which can be opened to the inner side. At the time of expansion/inflation, moreover, the air bag 104F/104R pushes and opens the door portion 16*a* and protrudes downward to take a position between the occupant and the shielding member 51F/51R.

The door portion 16*a* is provided on its upper edge side with a thin hinge portion 16*b* for allowing the door portion 16*a* to open easily to the inner side I of the vehicle. This hinge portion 16*b* is arranged in the roof head lining 16 from a front pillar portion FP to over the rear pillar portion RP generally linearly in the longitudinal direction of the vehicle.

At the time of expansion/inflation, the airbag 104F covers the rear inner side of the window WF, the upper side of a center pillar garnish 17 on the inner side of the center pillar portion CP and the front inner side of the window WR. The airbag 104R covers the rear inner side of the window WR and the front side of a rear pillar garnish 18 on the inner side of the rear pillar portion RP.

In the case of the first embodiment, moreover, the airbag 104F/104R is so arranged that the substantially entire length of the lower end 105*b* at the time of completion of the expansion/inflation can overlap the shielding member 51F/51R horizontally at the deployment completion time (as referred to FIG. 8).

The inflator 112 is made into a cylinder type and is mounted on the inner panel 2 of the roof side rail portion RR by means of mounting bolts 114 while being held by a mounting bracket 113. The inflator 112 is of a dual type capable of discharging the inflating gas from its two ends so that the inflating gas discharged from the front end side expands/inflates the airbag 104F on the front side and so that the inflating gas discharged from the rear end side expands/inflates the airbag 104R on the rear side.

Here will be described how to mount the occupant restraining device S1 of the first embodiment on the vehicle.

First of all, shielding member units UF/UR are assembled, as shown in FIGS. 2 and 7. The shielding member unit UF/UR is constructed to include the shielding member 51F/51R, the garnish 31 and the pretensioner 92. These members are integrated to improve their assembling workability on the door frame 22.

Figure 10A:
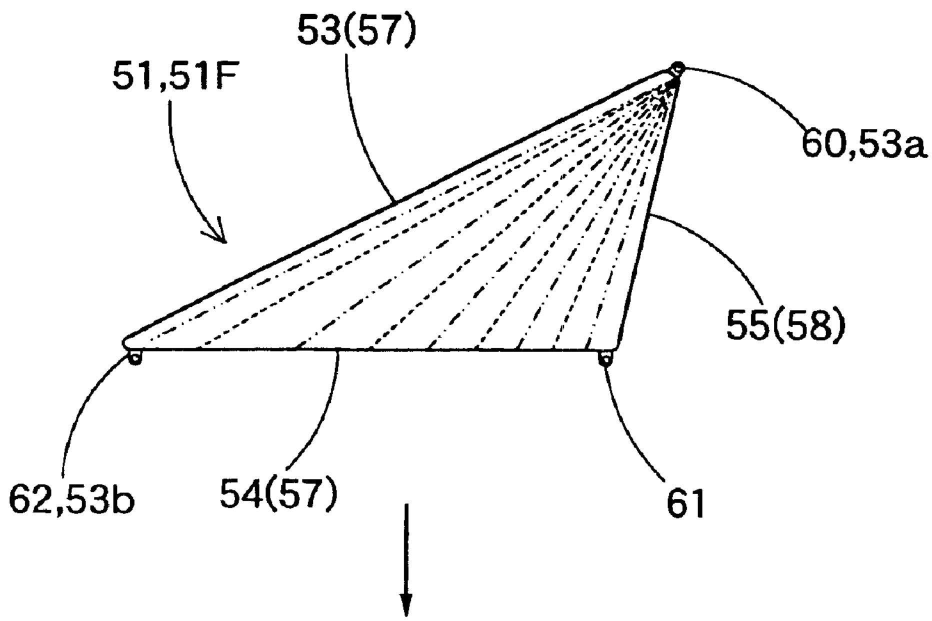
FIGS. 10A, 10B and 10C are diagrams showing the sequential steps of folding the shielding member of the first embodiment.
Figure 10B:
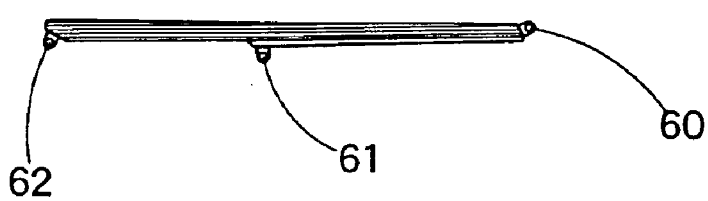
Figure 10C:
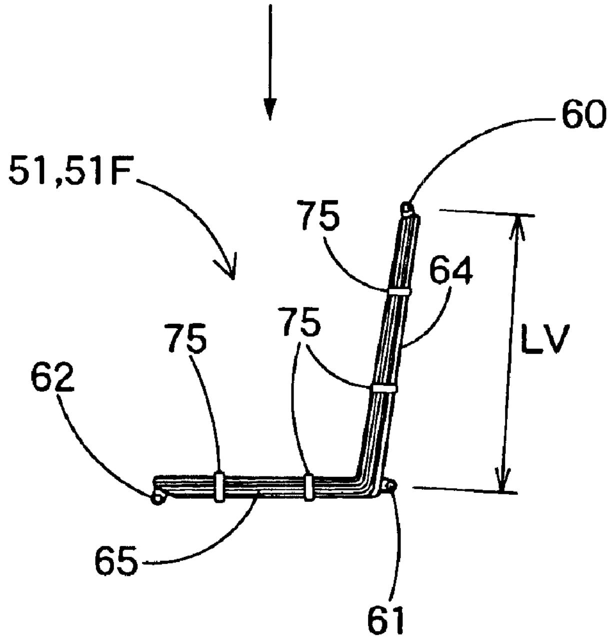

In the assembling work of the shielding member unit UF/UR, the shielding member 51 in the flatly expanded state is folded at first in such a folding-fan shape on its upper apex portion 60 that the folded width is made wider on the side of the lower edge portion 54 than on the side of the upper apex portion 60 thereby to bring the leading end apex portion 62 closer to the lower apex portion 61, as shown in FIGS. 10A and 10B. As shown in FIG. 10C, the shielding member 51 thus folded is wrapped with a plurality of breakable tape members 75 to prevent the folding collapse. In this folded state, the folded portion from the upper apex portion 60 to the lower apex portion 61 provides the vertical edge side housed portion 64 which is to be housed between the rear vertical edge portion 25 of the door frame 22 and the rear vertical edge portion 34 of the door frame garnish 31. The folded portion from the lower apex portion 61 to the leading end apex portion 62 provides the lower edge side housed portion 65 which is to be housed between the rear lower edge portion 26 of the door frame 22 and the lower edge portion 35 of the door frame garnish 31. Moreover, the pretensioner 92 is mounted on the outer side face of the garnish 31. Here, the leading end apex portion 62 is exposed at the leading end position in the completely folded state so as to be easily jointed to the later-described tension member leading end 94*a* of the pretensioner 92.

Then, the shielding member unit UF/UR can be assembled by inserting the retaining pins 40 into the mounting holes 60*a*/61*a* to mount the upper/lower apex portion 60/61 of the shielding member 51 on the outer side of the garnish rear vertical edge portion 34 and by jointing the leading end apex portion 62 of the shielding member 51 to the leading end 94*a* of the tension member 94 of the pretensioner 92.

After the shielding member unit UF/UR was assembled, the retaining pins 40/40 are mounted in the mounting holes 25*a*/25*b* of door frame 22, and the upper edge portion 32, the front vertical edge portion 33 and the rear vertical edge portion 34 of the garnish 31 are fitted on the upper edge portion 23, the front vertical edge portion 24 and the rear vertical edge portion 25 of the door frame 22. When the garnish 31 is properly fixed on the door frame 22 of the door FD/RD by means of bolts or the like at not-shown portions, the shielding member unit UF/UR can be assembled with the predetermined door frame 22. When the door trim 49 is then mounted on the lower portion of the door frame lower edge portion 26, the assembly of the door FD/RD can be completed. When this door FD/RD is mounted on the body 1, the shielding member 51F/51R and the pretensioner 92 can be mounted on the vehicle.

Here will be described how to mount the airbag 104F/104R on the vehicle. The airbag 104F/104R is folded on the side of the upper end 105*a* and is so wrapped with not-shown breakable tape members that it may not be collapsed. Next, the mounting brackets 108 are mounted on the mounting portion 107 of the airbag 104F/104R, and the airbag assembly is made by connecting the gas inlet port 106 to the inflator 112 and mounting the mounting bracket 113*on* the inflator 112. After this, the mounting brackets 108/113 are mounted on the inner panel 2 by the bolts 109/114, and the roof head lining 16 is mounted on the inner panel 2. Thus, the airbag 104F/104R and the inflator 112 can be mounted on the vehicle. When the shielding member 51F/51R, the pretensioner 92, the airbag 104F/104R and the inflator 112 are then mounted on the vehicle, the occupant restraining device S1 can be mounted on the vehicle.

Here, the control device 120 and the rollover sensor 118 are separately mounted at predetermined positions of the vehicle, and not-shown lead wires extending from the pretensioner 92 and the inflator 112 are connected with the control device 120 when the occupant restraining device S1 is mounted on the vehicle.

After the occupant restraining device S1 was mounted on the vehicle, the control device 120 activates the pretensioner 92 when it receives a rollover detection signal predicting a rollover of the vehicle from the rollover sensor 118. Then, the pretensioner 92 pulls the leading end 94*a* of the tension member 94 forward so that the shielding member 51F/SIR has its leading end apex portion 62 moved forward from its folded state, as indicated by double-dotted lines in FIGS. 2, 3 and 5 or by solid lines in FIG. 8. Therefore, the shielding member 51F/51R expands to push and open the door portion 37 of the garnish rear vertical edge portion 34 and to open the portion 43 to be broken of the garnish lower edge portion 35, thereby to shield the window WF/WR.

At this time, the control device 120 receives the rollover detection signal from the rollover sensor 118 and activates the inflator 112 to discharge the inflating gas. In the airbag 104F/104R, the body portion 105 is then inflated with the inflating gas to break the not-shown tape members, open the door portion 16*a* of the roof head lining 16, and expands/inflates downward to shield the window WF/WR inside the shielding member 51F/51R, as shown in FIG. 8.

In the occupant restraining device S1 of the first embodiment, more specifically, the shielding member 51F/51R shields the window WF/WR on the inner side so that the airbag 104F/104R can be interposed between the shielding member 51F/51R and the occupant on the inner side to shield the window WF/WR, thereby to restrain the occupant properly with the shielding member 51F/51R and the airbag 104 (104F/104R).

Figure 9A:
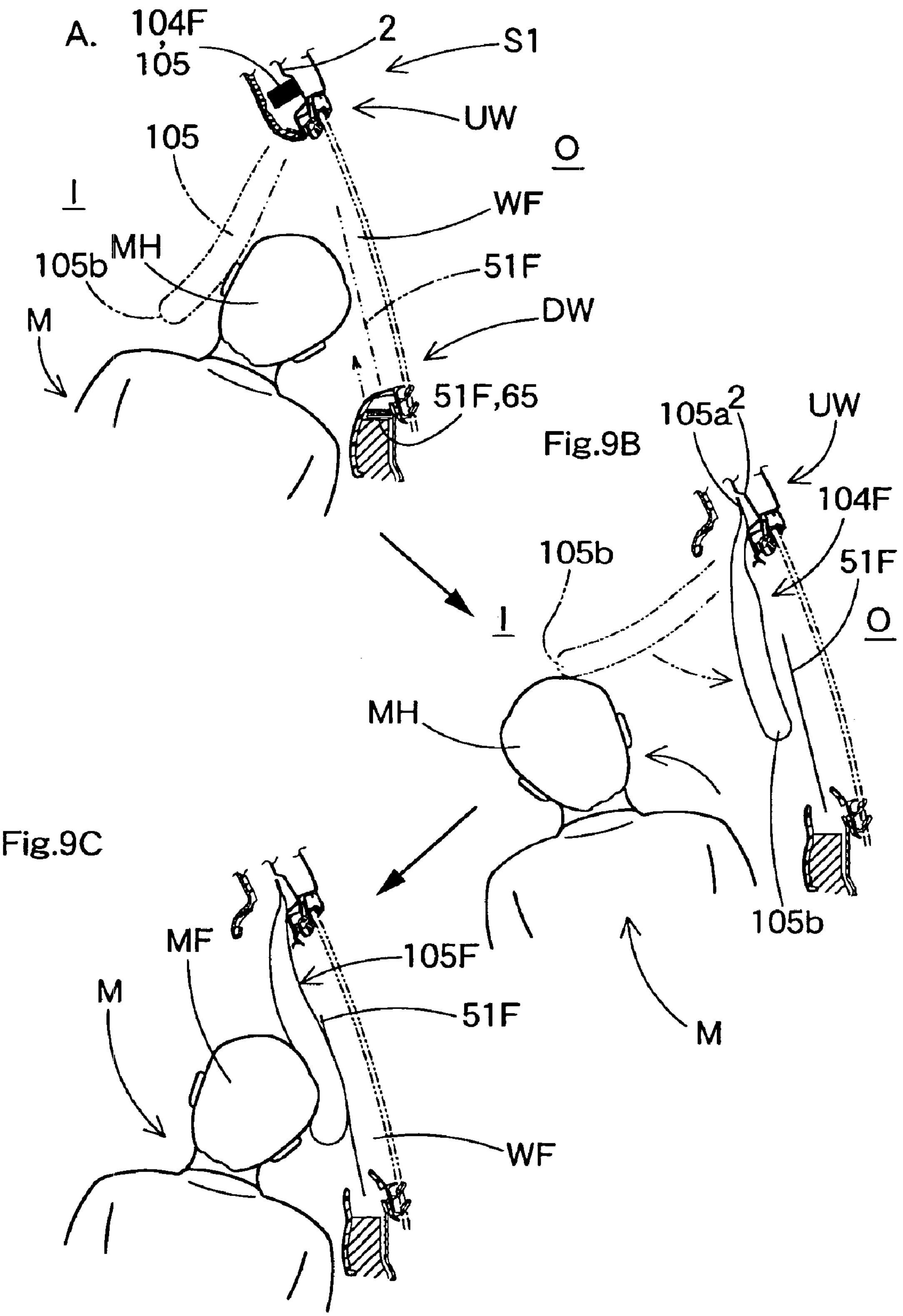

In the occupant restraining device S1 of the first embodiment, for example, if the airbag 104F is expanded/inflated on condition that the head MH of the occupant M is close to the window WF, as shown in FIG. 9A, the airbag 104F is arranged on the inner side I of the occupant's head MH. However, the airbag 104F is so connected at its upper end 105*a* to the inner panel 2 of the upper edge portion UW of the peripheral edge of the window WF that the lower end 105*b* may become a free end to swing generally perpendicular to the window WF. On the other hand, the occupant M may leave or approach the window WF while the vehicle is rolling over. Therefore, when the occupant M leaves the window WF, as shown in FIG. 9B, the airbag 104F swings toward the outer side O of the vehicle and easily goes into the space between the occupant M and the shielding member 51F. If the airbag 104F is then sandwiched between the occupant 's head MH and the shielding member 51F, as shown in FIG. 9C, the airbag 104F can arrest the occupant's head MH properly. These correlations likewise apply to the airbag 104R.

Even if the occupant's head MH approaches the window WF/WR at the beginning of expansion/inflation of the airbag 104 and the airbag 104 takes a position on the inner side I of the occupant's head MH, the shielding member 51F/51R is arranged on the inner side I of the window WF/WR. Therefore, the shielding member 51F/51R naturally restrains the occupant's head MH and secures the restraining performance of the occupant's head MH.

In the occupant restraining device S1 of the first embodiment, therefore, the airbag 104F/104R to be activated on detection of a rollover can be smoothly interposed between the occupant M and the window WF/WR even if the occupant M is close to the window WF/WR.

Here, the first embodiment has been described on the case in which the shielding member 51 and the airbag 104 are activated at the time of detection of the rollover. However, a side collision sensor capable of detecting a side collision of the vehicle may be connected with the control device 120 to activate the shielding member 51 and the airbag 104 at the time of a side collision of the vehicle.

Moreover, the first embodiment has been described on the case in which the lower end 105*b* of the airbag 104 is left as the free end. However, it is sufficient if the lower end side of the expanded/inflated airbag can move generally perpendicularly of the window. For example, an airbag of a generally rectangular sheet shape may be attached to the pillar portion FP/CP/RP of the peripheral edge of a window so that the airbag may protrude at the expansion/inflation time in the front and rear directions of the vehicle from the pillar portion so as to cover the window. In this modification, the free end of the airbag is located at the end portion of the vertical edge side protruded from the pillar portion. Alternatively, an airbag of a generally rectangular sheet shape may be attached to the roof side rail portion RR and either one of pillar portions FP/CP/RP of the peripheral edge of a window so that the airbag may protrude at the expansion/inflation time from the roof side rail portion and the pillar portion so as to cover the window. In this modification, the free end of the airbag is located at the lower corner apart from the roof side rail portion and the pillar portion. This lower end side of the airbag can move generally perpendicularly of the window. Therefore, the airbag does not press the occupant violently onto the window, even if the airbag takes a position on the inner side of the occupant's head close to the window at the beginning of expansion/inflation. Moreover, if the vehicle is making a rollover, a side slide or a side collision, the occupant may move apart from the window, and the airbag may have its lower end side returned to the inner side so that it can take the position between the occupant and the shielding member. If the airbag is then sandwiched between the occupant's head and the shielding member, it can restrain the occupant's head properly.

If the lower end side of the airbag at the time of completion of the expansion/inflation can move generally perpendicularly of the window, moreover, the airbag 104 expanded/inflated from the upper edge portion UW of the peripheral edge of the window may have a tension in the longitudinal direction of the vehicle at its lower end 105*b*.

In the first embodiment, still moreover, the airbag 104F/104R at the time of completion of the expansion/inflation is so arranged that the substantially entire length of the lower end 105*b* excepting the portion of the pillar portion CP/RP can overlap the completely deployment shielding member 51F/51R horizontally. When the airbag 104F/104R is clamped between the occupant's head MH and the shielding member 51F/51R, therefore, the airbag can be stably supported by the shielding member 51F/51R to arrest the occupant M in excellent cushioning properties.

In the first embodiment, moreover, the rear side of the lower end 105*b* of the completely expanded/inflated airbag 104F/104R covers the inner side of the center pillar portion CP or the rear pillar portion RP, too. Therefore, the airbag 104F/104R is more stably supported by these pillar portions CP/RP. The airbag 104F/104R, on the other hand, prevents the interference between the center pillar portion CP or the rear pillar portion RP and the occupant M.

In the first embodiment, furthermore, the airbag 104F at the time of completion of the expansion/inflation goes over the inner side portion of the center pillar portion CP to cover a part of the adjoining window WR. Therefore, that area of the adjoining window WR, which is not covered with the different shielding member 51R and airbag 104R, if any, can be covered with a portion 104Fb of the airbag 104F (as referred to FIG. 8). In case the portion 104Fb of the airbag 104F restrains the occupant's head MH, moreover, the airbag is positioned close to and supported by the inner side portion of the pillar portion CP. Therefore, the airbag portion 104Fb can restrain the occupant M as in a stable state as possible.

In the first embodiment, furthermore, the inflator 112 is so arranged between the airbags 104F/104R, provided in plurality in the longitudinal direction of the vehicle, as to feed the inflating gas to the airbags 104F/104R. Therefore, the inflating gas can be promptly fed to both airbags 104F/104R on the two sides of the inflator 112 thereby to shorten the time period from the start to the completion of the expansion/inflation of the airbags 104F/104R.

In the first embodiment, furthermore, the door portion 16*a* for covering the folded airbag 104F/104R has its opened hinge portion 16*b* arranged generally linearly in the longitudinal direction of the vehicle. Even if the airbag 104F/104R at the time of completion of the expansion/inflation swings generally perpendicularly of the window WF/WR to interfere with the door portion 16*a*, therefore, this door portion 16*a* is allowed to move to the inner side of the vehicle all over its length. Therefore, the lower end 105*b* of the airbag 104F/104R can swing smoothly.

In the shielding member 51 of the first embodiment, furthermore, the oblique side 53 acting as an edge portion 52 to cross the window WF/WR substantially rises at the deployment time from the lower edge portion DW of the peripheral edge of the window WF/WR to shield the window WF/WR. Even if the occupant M leans against the peripheral edge of the window WF/WR on the inner side I, therefore, the shielding member 51 can be smoothly arranged raising the occupant M from the lower side.

Moreover, the shielding member 51 of the first embodiment is provided with the oblique side 53 to cross the window WF/WR obliquely when it is completely deployed, thereby to shield the window by the lower side of the oblique sides 3. Specifically, the shielding member 51 is made as small as possible in the area for shielding the upper side of the window WF/WR by shielding the window with the region below the oblique side 53. Therefore, it is possible to shorten the time period from the start of the action to the completion of the deployment. Moreover, the shielding member 51 can reduce the material therefor. Still moreover, the shielding member 51 can minimize the deployment distance of its entire length. In the occupant restraining device S1 using this shielding member 51, therefore, the output of the deployment means 80 can also be suppressed to shield the window WF/WR efficiently.

Here, the shielding member 51 provided with the oblique side 53 shields a small area of the window WF/WR. If the side of the upper end 53*a* of the oblique side 53 (as referred to FIG. 2) is set closer to the occupant's position than the side of the lower end 53*b* of the oblique side 53, however, the shielding member 51 in the completely deployed state can restrain the occupant without any problem.

On the other hand, the deployment means 80 for letting off the shielding member 51 may be exemplified not only by the pretensioner 92 of the first embodiment, but also by an inflator or cylinder using gas pressure such as the type in which a combustion gas is produced by ignition, the type discharging a compressed gas or their mixed type.

Figure 11:
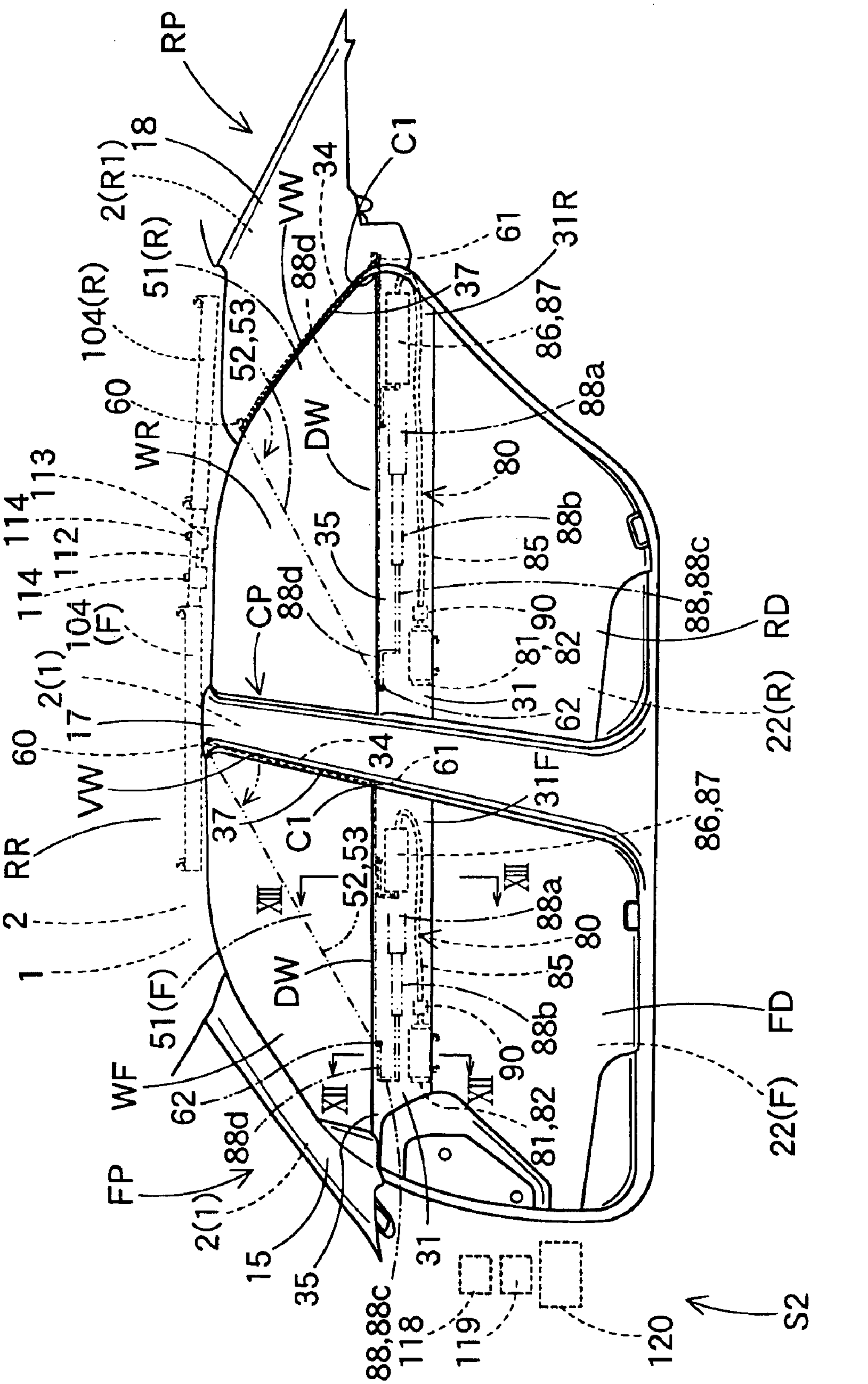
FIG. 11 is a front elevation showing an occupant restraining device of a second embodiment as taken from the inside of a vehicle.
Figure 12:
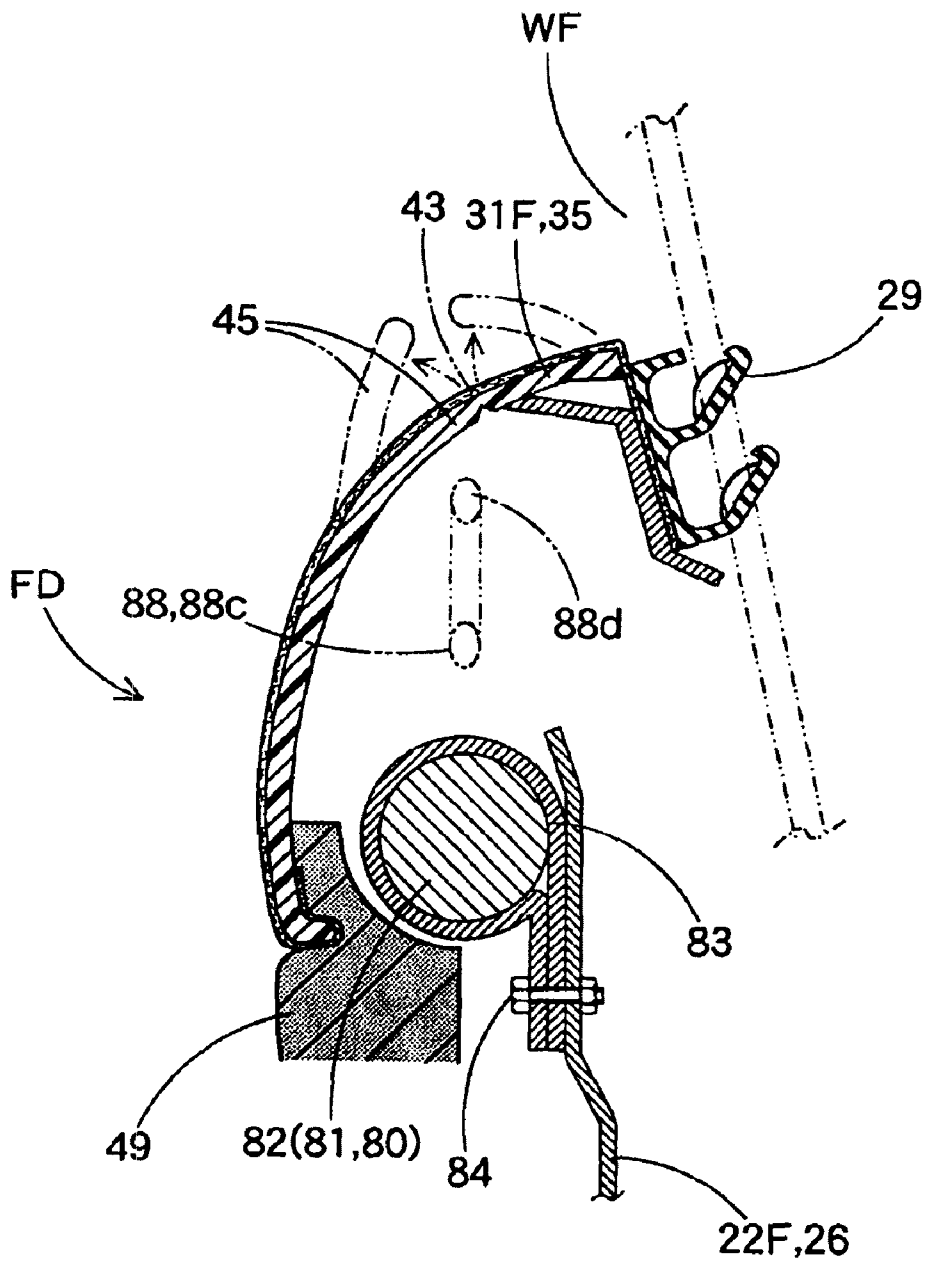
FIG. 12 is a schematic section of a portion XII—XII of FIG. 11.
Figure 13:
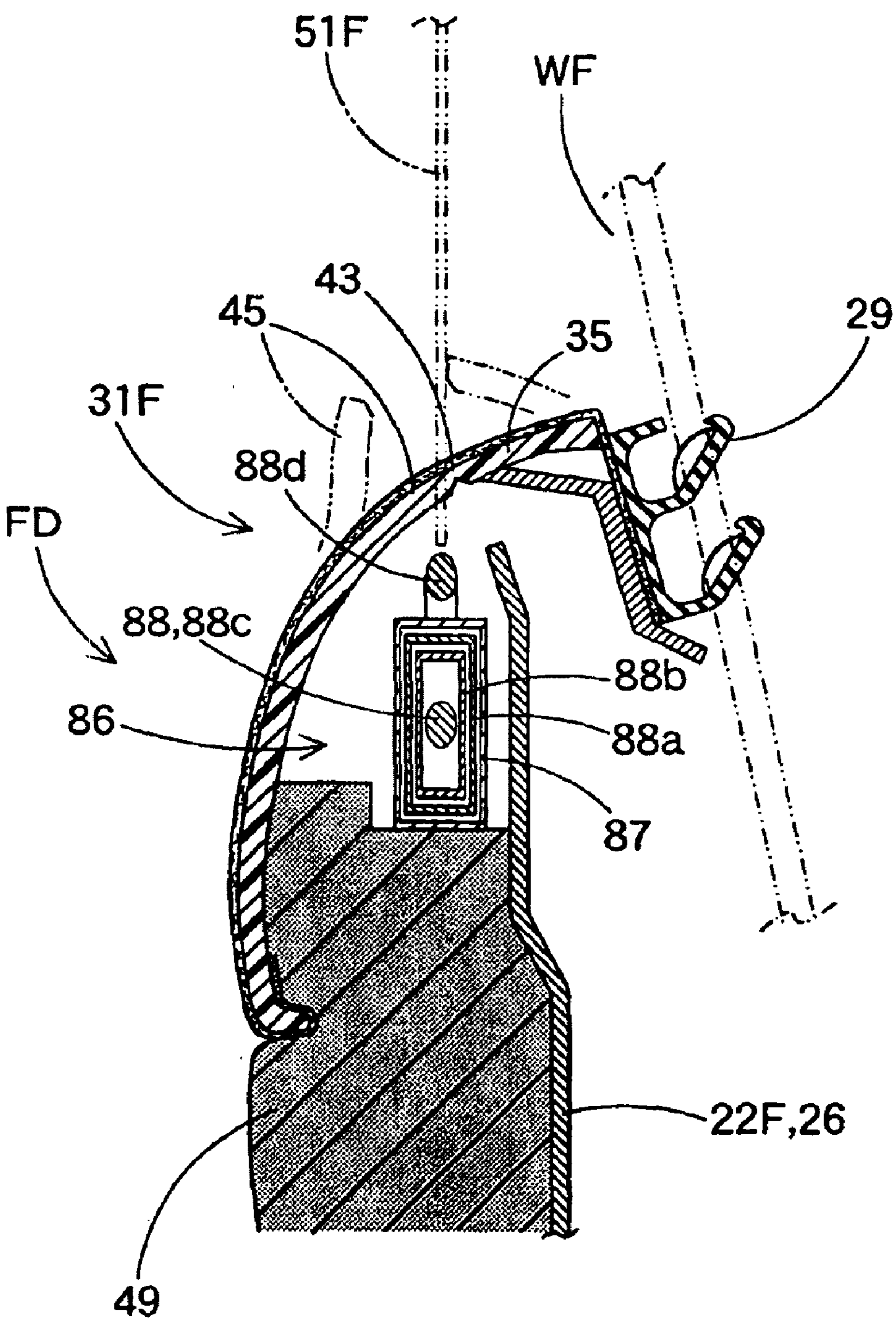
FIG. 13 is a schematic section of a portion XIII—XIII of FIG. 11.

An occupant restraining device S2 of a second embodiment, as shown in FIGS. 11 to 13, is constructed, like the first embodiment, to include the sheet-shaped shielding members 51 (51F/51R) and the airbags 104 (104F/104R). The shielding members 51F/51R are arranged in the front and rear doors FD/RD, respectively. The airbag 104F/104R is folded and housed on the lower edge side of the roof side rail portion RR and is expanded/inflated downward from the folded state by the action of the inflator 112. The airbag 104F/104R at the time of completion of the expansion/inflation has its lower end side as the free end. The shielding members 51F/51R are individually expanded from their folded states when they are activated by inflators 82 of the deployment means 80. These inflators 82/82 are drive sources 81 for the deployment means 80 and are activated together with the inflator 112 by the control device 120.

The control device 120 activates the inflators 82/112 when it receives such a rollover detection signal from the rollover sensor 118 as predicts a rollover (e.g., a lateral rollover) of the vehicle and when it receives such a side collision detection signal from a side collision sensor 119 as indicates that an impact at a predetermined or higher level is applied to the side face of the vehicle.

Here, the rollover sensor 118, the side collision sensor 119 and the control device 120 are arranged at predetermined positions of the vehicle and are electrically connected with one another. Moreover, the inflators 82 and 112 are also electrically connected with the control device 120.

In this second embodiment, the deployment means 80 of the shielding member 51F/51R is different from that of the first embodiment, and the description of the portions similar to those of the first embodiment will be partially omitted by designating them by the common reference numerals.

The shielding member 51F/51R of the second embodiment is formed, as in the first embodiment, into a sheet shape of a flexible cloth of polyester or polyamide yarns. Both shielding members 51F/51R are formed into a triangular sheet shape, as shown in FIG. 11, and the upper/lower apex portions 60/61 on the rear edge side are mounted on the door frames 22F/22R of the doors FD/RD by means of predetermined bolts. Moreover, the shielding member 51F/51R is folded backward in a bellows shape and housed in an inverted L-shape. In other words, the shielding member 51F/51R is housed to cross the corner C1 at which the lower edge portion DW and the vertical edge portion VW of the peripheral edge of the window WF/WR intersect. The shielding member 51F/51R thus housed is covered with the rear vertical edge portion 34 and the lower edge portion 35 in door frame garnish 31F/31R.

The door frame garnish 31F/31R is made of a synthetic resin and is mounted on the door frame 22F/22R of the peripheral edge of the window WF/WR. Here, the inner side of the door FD/RD is provided with the door frame garnish 31F/31R and the door trim 49 below the former.

At the rear vertical edge portion 34 of the door frame garnish 31F/31R and at the lower edge portion 35 extending forward from the lower end of the rear vertical edge portion 34, moreover, there are formed door portions 37/45 (although numeral 37 is not shown) which can be opened to the inner side of the vehicle, as in the first embodiment.

Moreover, the deployment means 80 of the shielding member 51F/51R of the second embodiment is constructed to include the inflator 82 as the drive source 81 and connection means 86. This connection means B6 is connected to the shielding member 51F/51R. Moreover, the connection means 86 also acts as guide means for guiding the shielding member 51F/51R being deployed. The inflator 82 discharges the inflating gas, when activated, like the inflator 112 for inflating the airbag 104F/104R. The connection means 86 is constructed of a cylinder 87 and a piston rod 88 in the case of the embodiment. The cylinder 87 admits the inflating gas from the inflator 82. The piston rod 88 protrudes largely from the cylinder 87 when the inflating gas flows into the cylinder 87. The cylinder 87 is fixed on the side of the lower edge portion 26 of the door FD/RD, as shown in FIGS. 11 and 13, by using not-shown mounting brackets and mounting bolts. The inflator 82 and the cylinder 87 thus fixed are covered with the lower edge portion 35 of the garnish 31. The piston rod 88 is formed of multiple stages of a first rod 88*a*, a second rod 88*b* and a third rod 88*c*. When the inflating gas is introduced into the cylinder 87, the first rod 88*a* of the piston rod 88 is protruded forward from the cylinder 87, and the second rod 88*b* is protruded forward from the first rod 88*a*. The third rod 88*c* is further protruded forward from the second rod 88*b*. The third rod 88*c* is bent at its front end portion, and its upper end 88*d* is connected at its leading end to the leading end apex portion 62 of the shielding member 51F/51R by means of a predetermined bolt.

The inflator 82 for letting off and expanding the shielding member 51F/51R is made of a cylinder type, as shown in FIGS. 11 and 12, and is clamped by a mounting bracket 83. The inflator 82 is connected on its rear end side to a feed pipe 85 for feeding the inflating gas discharged to the rear end side of the cylinder 87. The inflator 82 is arranged on the front side of the lower edge portion DW in the peripheral edge of the window WF/WR of the door frame 22F/22R by using the mounting bracket 83. The mounting bracket 83 is fixed on the lower edge portion 26 of the door frame 22F/22R by means of bolts 84.

The feed pipe 85 is provided with a flow control valve 90 near the inflator 82. The flow control valve 90 can adjust the flow rate of the inflating gas. Moreover, the flow control valve 90 is electrically connected with the control device 120, by which the flow rate of the inflating gas is adjusted. In the case of the embodiment, the flow control valve 90 is normally kept fully open. By the control of the control device 120, moreover, the valve 90 is controlled to a closed side for throttling the flow rate of the inflating gas. In the case of the embodiment, when the inflator 82 is activated with the flow control valve 90 being fully open, the shielding member 51F/51R completes its expansion substantially simultaneously as the completion of the inflation of the airbag 104F/104R. When the flow control valve 90 is controlled to throttle the flow rate of the inflating gas, moreover, the shielding member 51F/51R completes its expansion after the completion of the inflation of the airbag 104F/104R. In the case of the embodiment, more specifically, the control device 120 does not make the throttling control of the flow control valve 90 but activates the inflator 82 when it receives the side collision detection signal from the side collision sensor 119. In response to the rollover detection signal from the rollover sensor 118, moreover, the control device 120 controls the flow control valve 90 to throttle the flow rate of the inflating gas.

Here will be described the action modes of the occupant restraining device S2 of the second embodiment. When the control device 120 receives a rollover detection signal predicting a rollover of the vehicle from the rollover sensor 118, it controls the flow control valve 90 to activate the inflators 82/82, individually. Then, the inflating gas discharged from the inflator 82 flows via the feed pipe 85 into the cylinder 87. In this cylinder 87, moreover, the individual rods 88*a*/88*b*/88*c* are sequentially protruded forward.

At this time, the shielding member 51F/51R is released according to the forward movement of the piston rod 88, as indicated by double-dotted lines in FIG. 11, so that its leading end apex portion 62 laterally moves forward. As a result, the shielding member 51F/51R pushes and opens the door portion 37/45 of the door frame garnish 31 so that it expands. At this time, the shielding member 51F/51R is housed in advance from the rear vertical edge portion 34 to the lower edge portion 35 on the lower edge side of the door frame garnish 31 in the peripheral edge of the window WF/WR on the inner side of the vehicle. Therefore, the shielding member 51F/51R raises the oblique side 53 clockwise, as viewed from the inner side, on the upper apex portion 60 from the lower edge portion DW of the peripheral edge of the window WF/WR thereby to shield the window WF/WR. Specifically, the oblique side 53 sloping down forward in the triangular sheet plate at the expansion time becomes the edge portion 52 to cross the window WF/WR so that it rises substantially from the lower edge portion of the window WF/WR.

As a result, the shielding member 51F/51R is smoothly expanded to raise the occupant from the lower side even if this occupant leans against the peripheral edge (especially, on the lower edge portion DW) of the window WF/WR on the inner side of the vehicle.

At this time, moreover, the inflator 112 is also activated by the control device 120 so that the airbag 104F/104R is expanded and inflated.

Here, in the occupant restraining device S2 of the second embodiment, in response to the side collision detection signal from the side collision sensor 119, the control device 120 activates the inflators 82/82 without controlling the flow control valves 90/90 in the fully open state. Therefore, the shielding member 51F/51R is expanded to complete its shielding action in a shorter time period than the time from the starting time to the shield completion of the rollover sensor 118. Even an impact acts on the side face of the vehicle, therefore, the shielding member 51F/51R shields the window WF/WR quickly to arrest the occupant properly.

In the occupant restraining device S2 of the second embodiment, more specifically, the deployment means 80 employs the inflator 82 using gas pressure as the drive source 81 for expanding and moving the shielding member 51F/51R. Moreover, the deployment means 80 is provided in its gas passage with the flow control valve 90 for adjusting the flow rate of the gas thereby to adjust the expanding/moving speed of the shielding member 51F/51R. In the second embodiment, therefore, the expanding/moving speed of the shielding member 51F/51R can be easily changed to match the rollover or the side collision merely by adjusting the open state of the flow control valve 90.

In the case of the embodiment, moreover, the flow control valve 90 is normally held in the fully open state. In the second embodiment, therefore, the shielding member 51F/51R can be quickly expanded at the time of the side collision, in which the impact acts on the side face of the vehicle, without adjusting the flow control valve 90.

Here, the second embodiment may be modified by eliminating the flow control valve 90 such that the deployment completion of the shielding member 51F/51R and the expansion/inflation completion of the airbag 104F/104R occur substantially simultaneously even at the time of the rollover. On the contrary, alternatively, the construction may also be modified such that the deployment completion of the shielding member 51F/51R and the expansion/inflation completion of the airbag 104F/104R are made substantially simultaneous when throttling by the flow control valve 90, to quicken the deployment completion of the shielding member 51F/51R than the expansion/inflation completion of the airbag 104F/104R at a predetermined time on the rollover or the side collision. This modification may be made, too, in case the pretensioner 92 is employed as the deployment means 80.

In the second embodiment, moreover, the shielding member 51F/51R is housed on the peripheral edge of the window WF/WR at the door FD/RD, and the inflator 82 as the drive source 81 for expanding and moving the shielding member 51F/51R is arranged in front of the side of the lower edge portion DW of the peripheral edge of the window WF/WR of the door frame 22F/22R. In short, the inflator 82 is arranged in front of the occupant thereby to minimize the risk of interfering with the occupant. It is quite natural that both the shielding member 51F/51R and the drive source 81/81 are arranged on the side of the door FD/RD.

Without any complicated structure of the occupant restraining device S2, therefore, the shielding member 51F/51R is smoothly expanded by the drive source 81/81.

Here, in the first and second embodiments, the shielding member 51F/51R is exemplified by the sheet shape which is not inflated. In a third embodiment shown in FIG. 14, however, a sheet shape which is expanded by introducing the inflating gas thereinto may be used.

Figure 14:
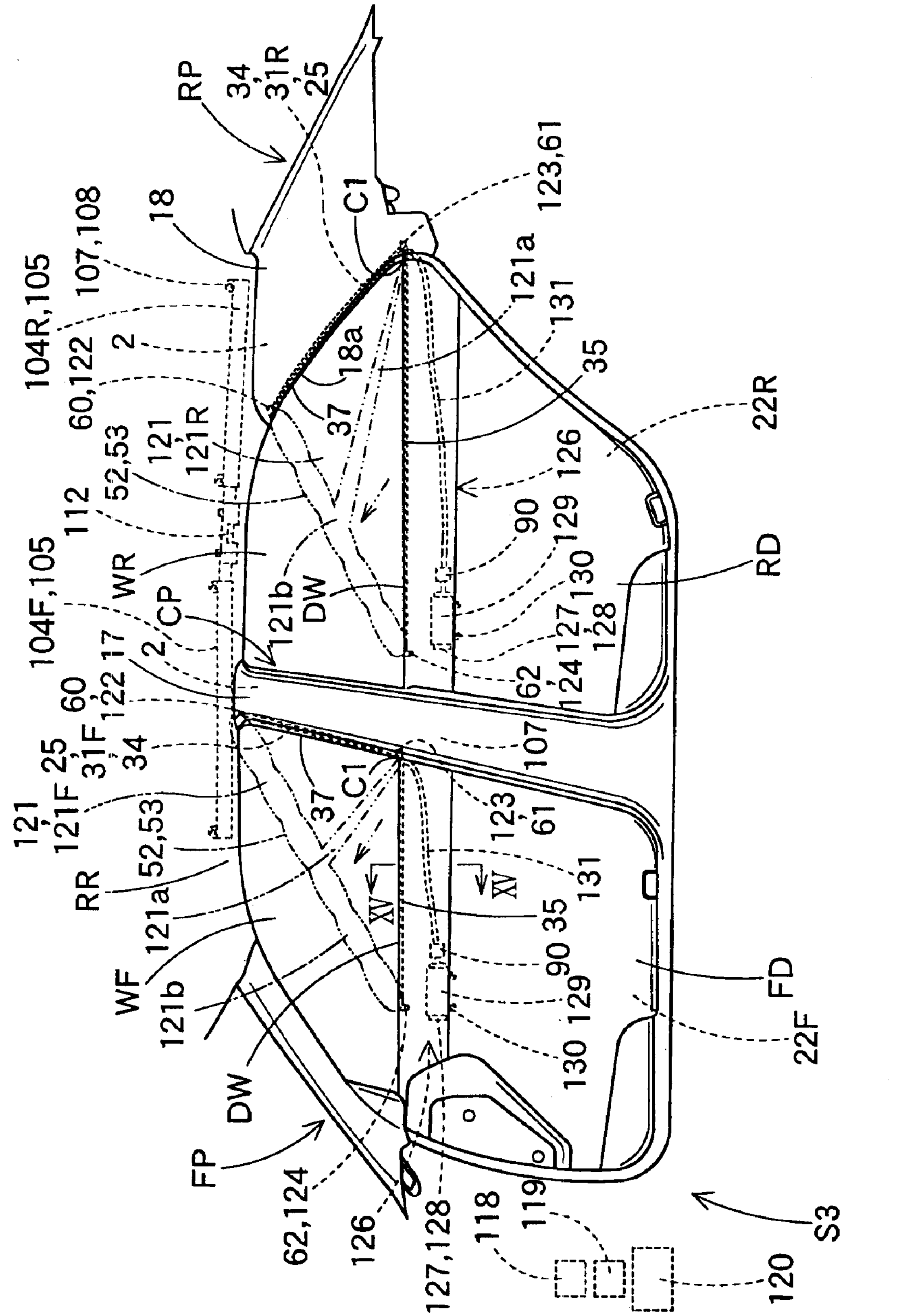
FIG. 14 is a front elevation showing an occupant restraining device of a third embodiment as taken from the inside of a vehicle.
Figure 15:
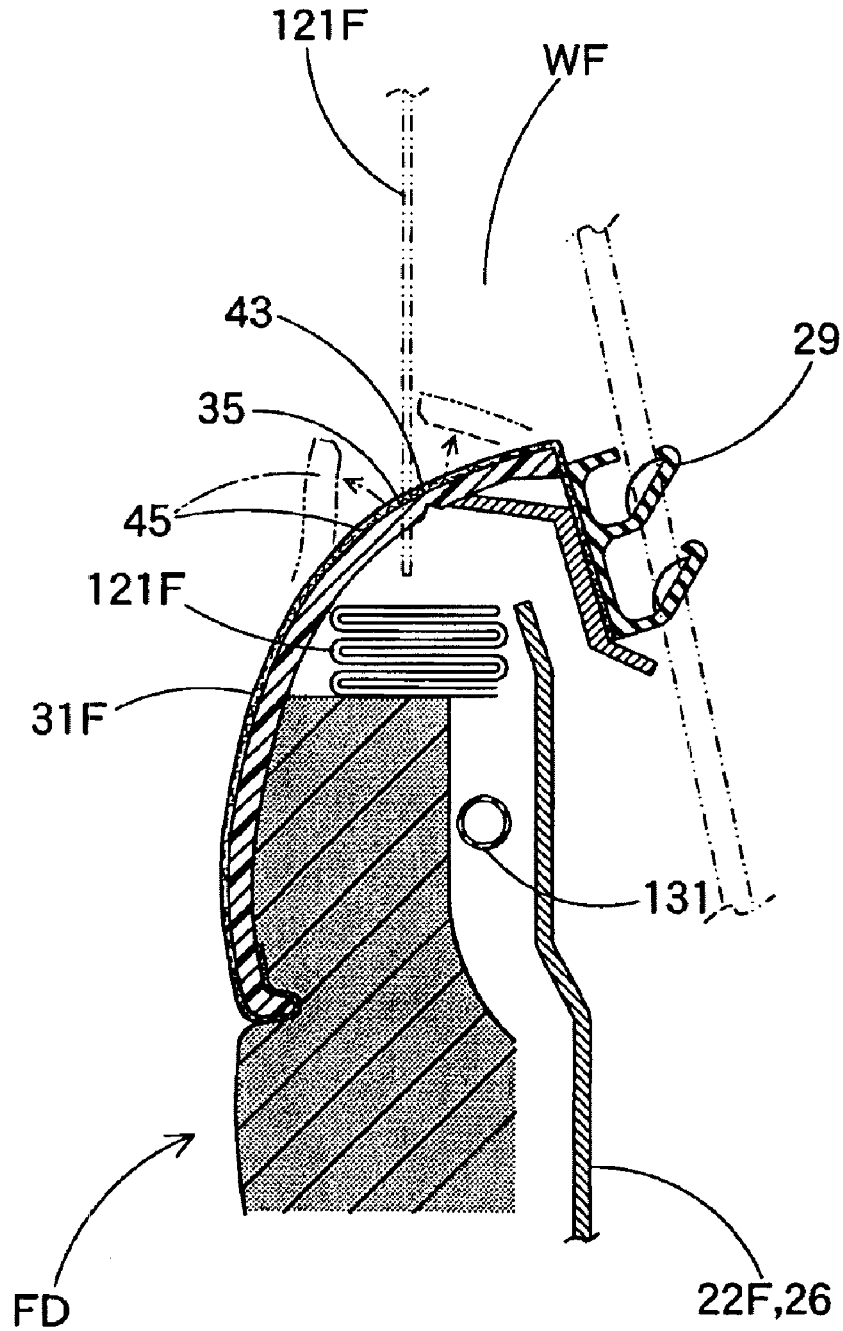
FIG. 15 is a schematic section of a portion XV—XV of FIG. 14.
Figure 16:
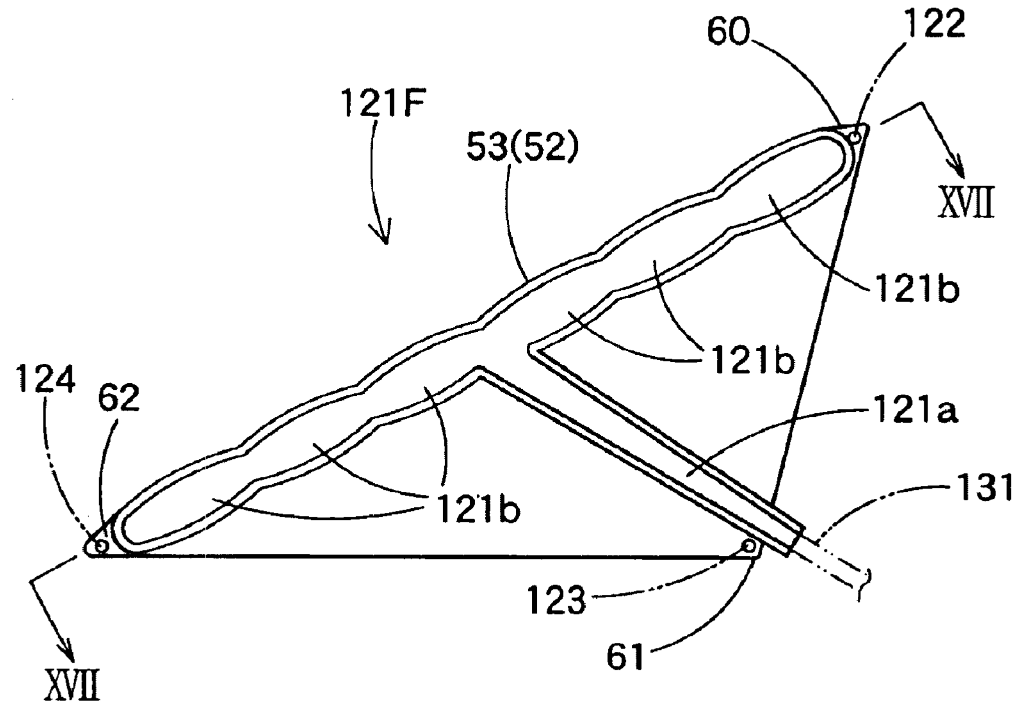
FIG. 16 is a diagram showing a shielding member of the third embodiment.

In an occupant restraining device S3 of the third embodiment, as shown in FIGS. 14 to 16, a shielding member 121F/121R for shielding the window WF/WR of the door FD/RD is expanded by admitting the inflating gas thereinto.

These shielding members 121F/121R are expanded from their folded states when inflators 128/128 act as a drive source 127 for deployment means 126. The inflator 128 is activated together with the inflator 112 when the control device 120 receives a predetermined detection signal from the rollover sensor 118 and the side collision sensor 119.

Figure 17:
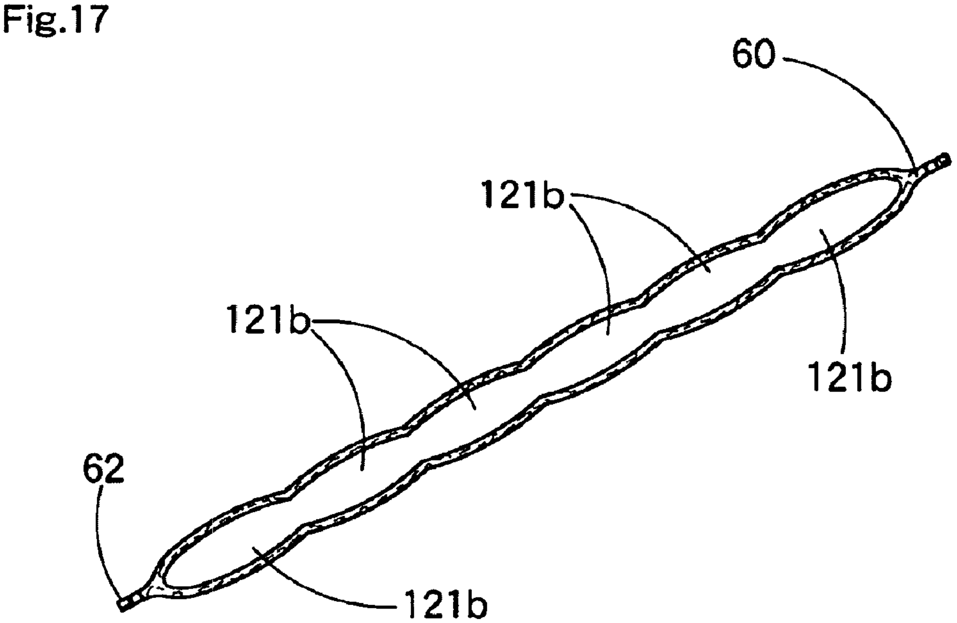
FIG. 17 is a section of a portion XVII—XVII of FIG. 16.

The shielding member 121F/121R is expanded like the shielding member 51F/51R into a triangular sheet shape, as shown in FIGS. 14 and 16. Specifically, the shielding member 121F/121R shields the triangular region extending downward to the front from the rear vertical edge portion 25 in the window WF/WR of the door frame 22F/22R. The shielding member 121F/121R is fixed at the three apex portions 60/61/62 in the expanded state on the peripheral edge of the window WF/WR of the door frame 22F/22R by using mounting bolts 122/123/124. At the oblique side 53 of the shielding member 121F/121R, moreover, there are arranged a plurality of inflation portions 121*b* (as referred to FIG. 17) for causing a tension along the oblique side 53. In the inflation portions 121*b*, there is arranged an inlet passage 121*a* for admitting the inflating gas. Each of the individual inflation portions 121*b* is made to communicate with each other so that they may be roundly inflated when fed with the inflating gas. The inlet passage 121*a* is so extended obliquely upward from the vicinity of the apex portion 61 of the rear lower portion to communicate with the inflation portions 121*b* at the central portion of the oblique side 53 as to allow the deployment of the shielding member 121. To the vicinity of the apex portion 61 of the inlet passage 121*a*, there is connected a feed pipe 131 for guiding the inflating gas from the inflator 128.

Moreover, the shielding member 121F/121R is so housed in the folded state that it is covered with the rear vertical edge portion 34 and the lower edge portion 35 of the door frame garnish 31F/31R. If the inflating gas flows in via the inlet passage 121*a*, moreover, the shielding member 121F/121R pushes and opens the door portion 37/45 (although the numeral 37 is not shown) of the edge portion 34/35 and protrudes into the window WF/WR. Then, the inflation portions 121*b* are inflated in spherical shapes, and the inlet passage 121*a* is inflated in a rod shape, so that the shielding member 121F/121R is expanded into the triangular sheet shape joining the apex portions 60/61/62.

The deployment means 126 for expanding the shielding member 121F/121R is constructed to include the inflator 128 as the drive source 127, and the feed pipe 131. Moreover, the inflator 128 is connected, as a cylinder type similar to the inflator 82 of the second embodiment, to the feed pipe 131. On the other hand, the inflator 128 is clamped by a mounting bracket 129. By fixing the mounting bracket 129 on the door frame 22F/22R with bolts 130, moreover, the inflator 128 is arranged in front side of the lower edge portion DW in the window WF/WR.

On the other hand, the feed pipe 131 is provided near the inflator 128 with the flow control valve 90. This valve 90 is also normally held in the fully open state. In response to a rollover detection signal from the rollover sensor 118, moreover, the control device 120 controls the valve 90 to throttle the flow rate of the inflating gas.

In this occupant restraining device S3 of the third embodiment, too, the control device 120 controls the valve 90 properly to activate the inflator 128 when it receives a predetermined signal from the sensor 118/119. Then, the shielding member 121F/121R is inflated by feeding the inflating gas from the inflator 128 via the feed pipe 131 and the inlet passage 121*a* to the inflation portions 121*b*. Therefore, the shielding member 121F/121R pushes and opens the door portion 37/45 and protrudes into the window WF/WR. Then, the inflation portions 121*b* are inflated in spherical shapes, and the inlet passage 121*a* is inflated in a rod shape. Specifically, the shielding member 121F/121R is expanded, as indicated by double-dotted lines in FIG. 14, obliquely forward and upward along the arranged direction of the inlet passage 121*a* from the corner C1 of the peripheral edge of the window WF/WR on the rear side of the lower edge portion DW. Then; the shielding member 121F/121R is expanded in a triangular sheet shape joining the apex portions 60/61/62.

Therefore, the shielding member 121F/121R is smoothly expanded to raise the occupant from the lower side, even if the occupant leans against the lower edge portion DW of the window WF/WR on the inner side of the vehicle, thereby to shield the window WF/WR.

At this time, the inflator 128 is also activated so that the airbag 104F/104R completes its expansion/inflation.

Therefore, the occupant restraining device S3 of the third embodiment can also restrain the occupant properly at the time of a rollover or side collision of the vehicle.

Figure 18:
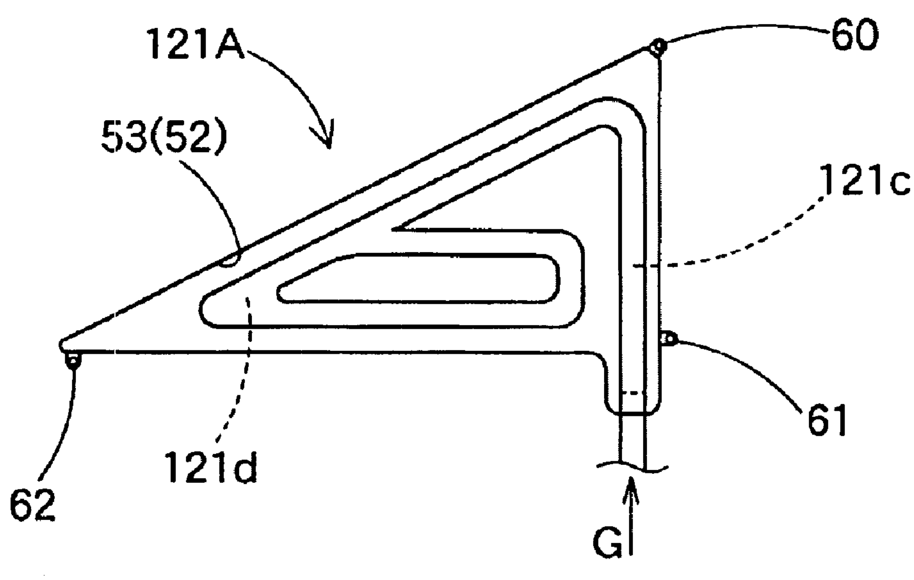
FIG. 18 is a diagram showing a modification of the shielding member.
Figure 19A:
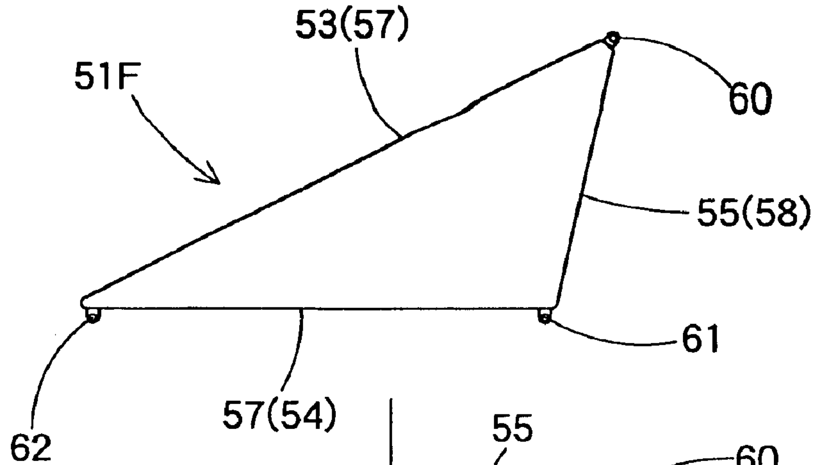
FIGS. 19A, 19B, 19C, and 19D are diagrams showing a modification of the sequential steps of folding the shielding member.
Figure 19B:
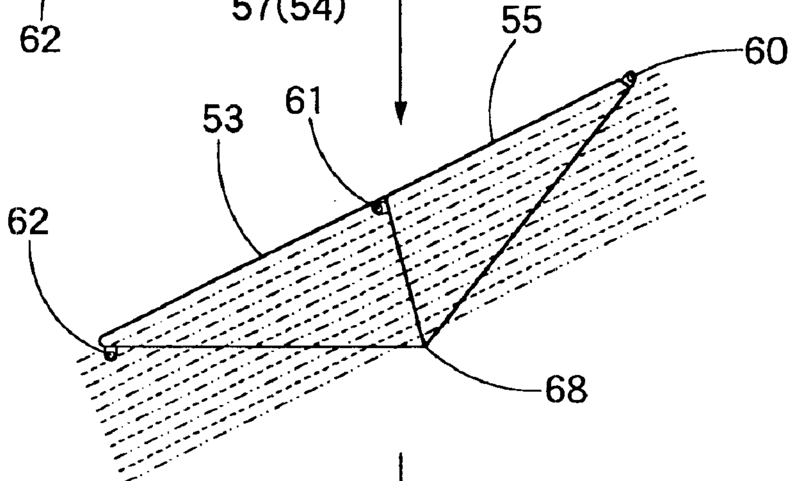
Figure 19C:
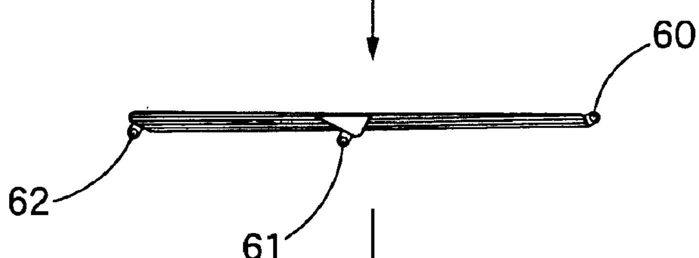
Figure 19D:
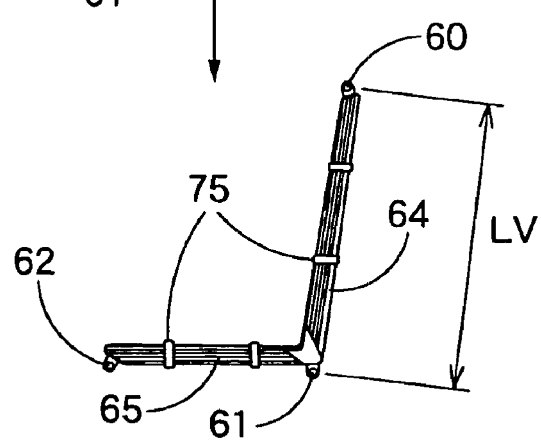

Here, the shielding member for admitting the inflating gas G may be constructed as a shielding member 121A, as shown in FIG. 18. In this shielding member 121A, there are arranged a vertical gas passage 121*c* for expanding the shielding member 121A, and a bent gas passage 121*d* for producing a tension in the oblique side 53.

The shielding member 51 of the first embodiment is folded in order to keep unchanged the distance of the vertical edge portion 55 to be fixed on the peripheral edge of the window WF/WR, i.e., the distance LV between the upper apex portion 60 on the side of the upper end 53*a* of the oblique side 53 and the lower apex portion 61 in the vicinity of the crossing corner C, as shown in FIGS. 7 and 10. Specifically, the shielding member 51 is folded so that the folding width is made so much larger on the side of the lower edge portion 54 than on the upper side below the oblique side 53 at the time of deployment completion that the oblique side 53 may approach the vertical edge portion 55 to be arranged on the vertical edge portion VW of the peripheral edge of the window WF at the time of deployment completion.

In other words, the shielding member 51 is folded to keep the length of the stationary side edge portion 58 (55) unchanged by using the oblique side 53 and the lower edge portion 54 of the three edge portions 53/54/55 as a moving side edge portion 57 and by using the remaining edge portion 55 as a stationary side edge portion 58. In the first embodiment, moreover, the shielding member 51 is folded like a folding-fan on the intersection (or the upper apex portion 60) between the oblique side 53 and the stationary side edge portion 55.

At the time of finishing the folding, therefore, the vertical edge portion 55 of the shielding member 51 has its length unchanged so that the upper/lower apex portions 60/61 at the upper/lower ends of the vertical edge portion 55 of the folded shielding member 51 can be mounted as they are on the outer side of garnish rear vertical edge portion 34 in the vertical edge portion VW. As a result, the shielding member 51 can be easily folded and mounted at the predetermined position.

Here, the shielding member 51 may be folded, as shown in FIG. 19, when fixing the distance between the upper/lower apex portions 60/61, by using the vertical edge portion 55 as the stationary edge portion 58 and the remaining edge portions 53/54 as the movable edge portions. For this folding work, the lower apex portion 61 is applied at first to the oblique side 53 while the distance LV between the upper/lower apex portions 60/61 being unchanged, as shown in FIGS. 19A and 19B. Next, the shielding member 51 is then folded in a bellows, as shown in FIGS. 19B and 19C, by forming crests and valleys parallel to the oblique side 53 so that the folded-back top portion 68 may approach the oblique side 53. After this, the shielding member 51 is folded up while being wrapped with the tape members 75, as shown in FIG. 19D.

By this folding method, too, the shielding member 51 can be folded without changing the distance LV (i.e., the distance LV of the stationary edge portion 58) between the upper apex portion 60 and the lower apex portion 61 in the completely folded state. Therefore, the shielding member 51 can be easily mounted on the door frame rear vertical edge portion 25 of the vertical edge portion VW.

Figure 20:
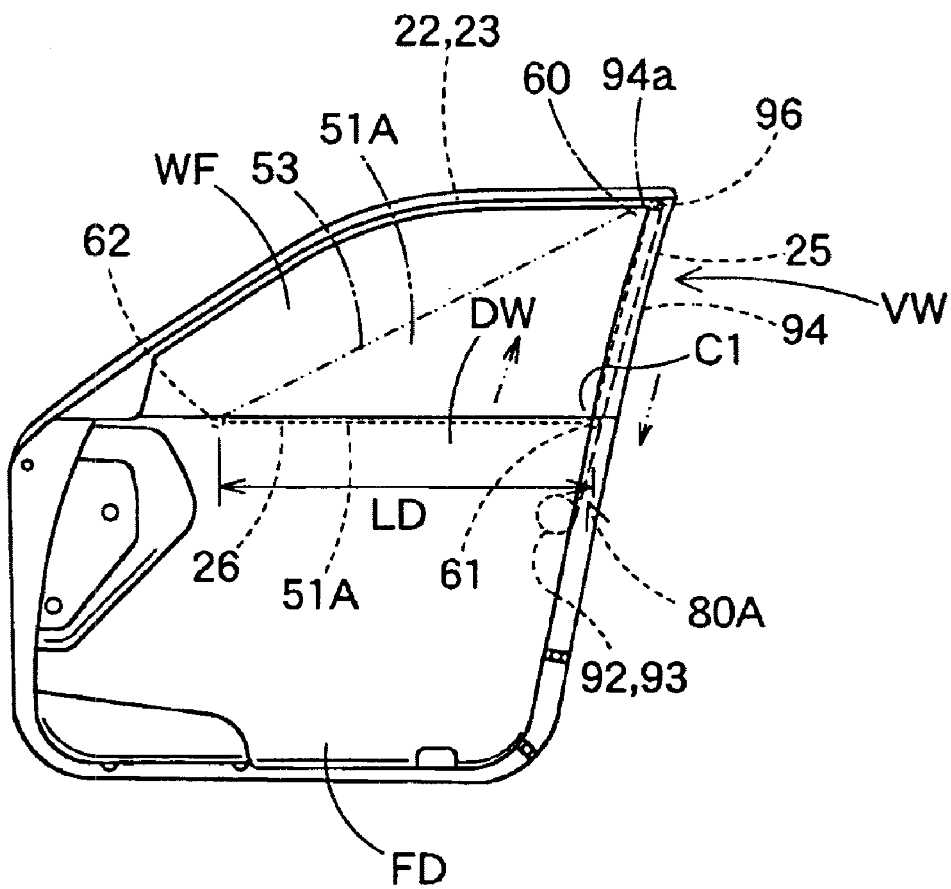
FIG. 20 is a diagram showing another modification of the shielding member.
Figure 21:
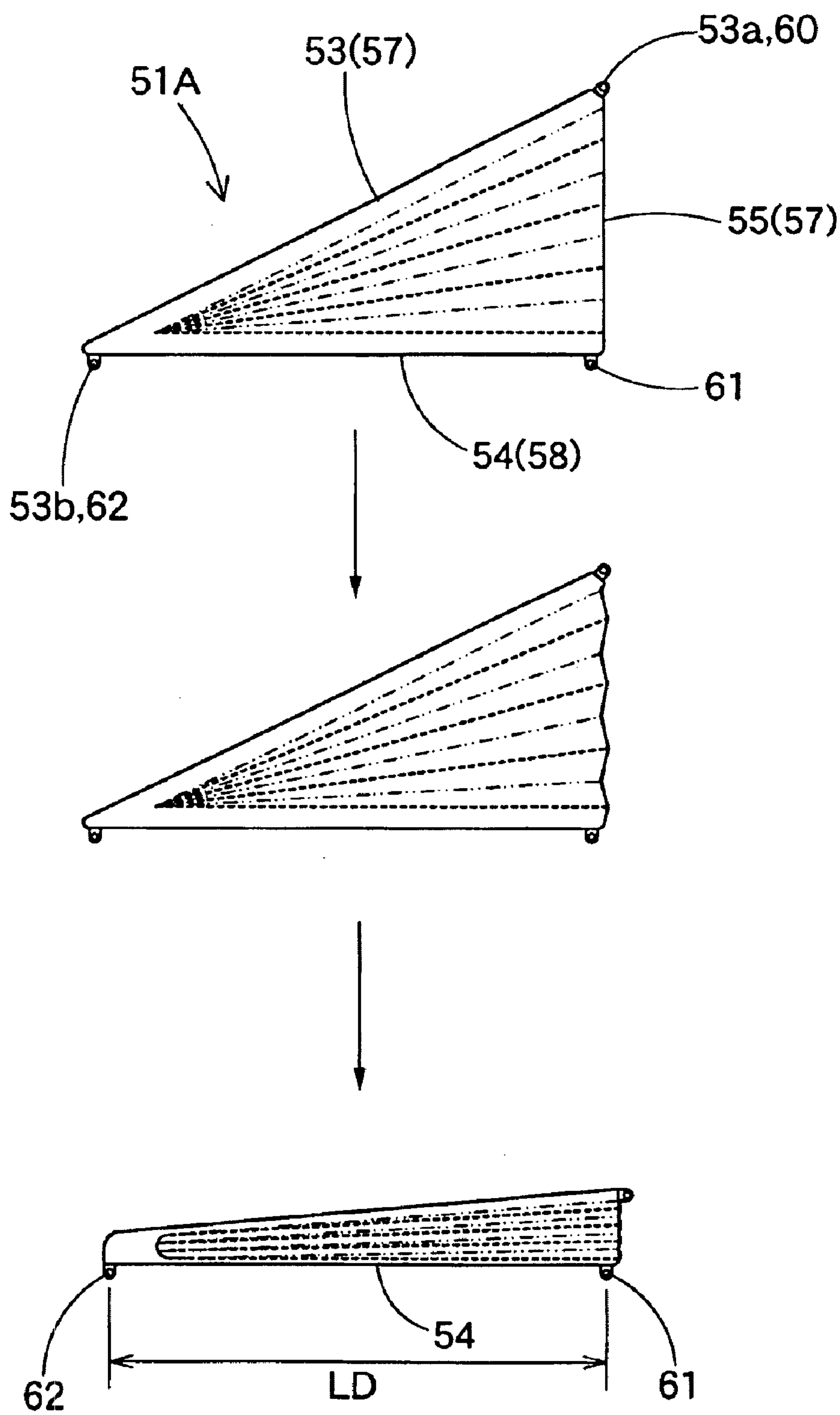
FIG. 21 diagrams the steps of folding the shielding member shown in FIG. 20.

Here, to facilitate the mounting work on the peripheral edge of the window, the shielding member may be folded like a shielding member 51A, as shown in FIGS. 20 and 21, without changing the length (i.e., the distance LD between the leading end apex portion 62 and the lower side apex portion 61) of the lower edge portion 54. Specifically, the shielding member 51 may be folded by using the oblique side 53 and the vertical edge portion 55 of the three edge portions 53/54/55 as the moving side edge portion 57 and by using the remaining one edge portion 54 as the stationary side edge portion 58 thereby to keep the length of the stationary side edge portion 58 (54) unchanged.

The shielding member 51A is different in the folding manner and in the deployment direction from that of the first embodiment. This shielding member 51A is folded, as shown in FIG. 21, such that the shielding member 51A of the triangular sheet shape is folded from the flatly expanded state by setting the leading end apex portion 62 (at the intersection between the oblique side 53 and the stationary side edge portion 54) on the side of the lower end 53*b* of the oblique side 53, at the center of a folding-fan and by making the folding width larger on the side of the vertical edge portion 55 than on the side of the leading end apex portion 62, while the distance LD (i.e., the distance LD of the stationary side edge portion 54) between the leading end/lower apex portion 62/61 being unchanged. Here, the shielding member 51A is housed only in the lower edge portion DW of the peripheral edge of the window WF.

On the other hand, deployment means BOA shown in FIG. 20 is constructed to include the pretensioner 92 similar to that of the first embodiment for tensing the tension member 94, and a rotatable roller 96 for winding the tension member 94. The tension member 94 protrudes from the body 93 of the pretensioner 92 and is wound on the upper outer circumference of the roller 96. Moreover, the leading end 94*a* of the tension member 94 is connected to the upper apex portion 60 of the upper end 53*a* of the oblique side 53 of the shielding member 51A folded. Moreover, the roller 96 is rotatably mounted near the intersecting portion between the upper edge portion 23 of the door frame 22 and the rear vertical edge portion 25.

In this shielding member 51A, the tension member 94 is tensed by the activated pretensioner 92 so that the shielding member 51A in the folded state raises the upper apex portion 60 along the vertical edge portion VW thereby to complete the deployment action.

Figure 22:
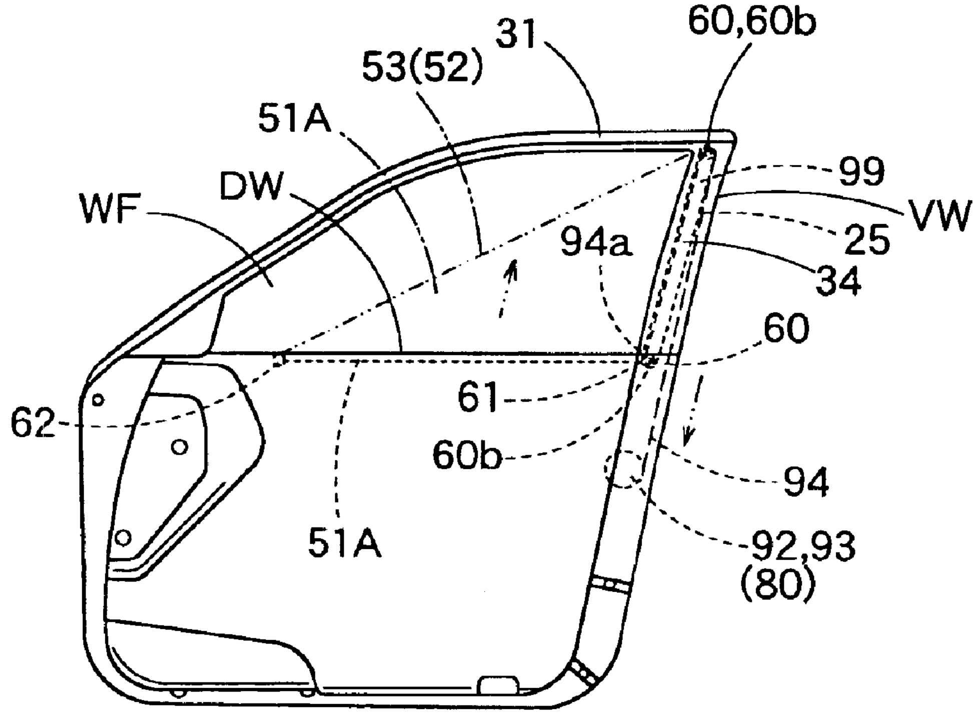
FIG. 22 is a diagram showing guide means for the shielding member shown in FIG. 20.

In case the shielding member is to be deployed by raising the leading end 94*a* of the tension member 94 in the pretensioner 92 along the vertical edge portion VW, a guide rail may be used as the guide means for stabilizing the upward moving track of the leading end 94*a*. As shown in FIG. 22, more specifically, a guide rail 99 along the vertical edge portion VW is so fixed on the door frame rear vertical edge portion 25 that it may be covered with the rear vertical edge portion 34 of the garnish 31. Moreover, the upward movement of the shielding member 51A can be stabilized if the shielding member 51A is provided at its upper apex portion 60 or the like with an engagement portion 60*b* such as a cam follower to be guided in the moving direction by the guide rail 99.

Here, in case the leading end 94*a* is laterally moved as in the first embodiment, too, it is arbitrary that the shielding member 51 is provided at its leading end apex portion 62 with the engagement portion 60*b* such as a cam follower and that the lower edge portion DW is provided with a guide rail for guiding the engagement portion 60*b*.

Figure 23:
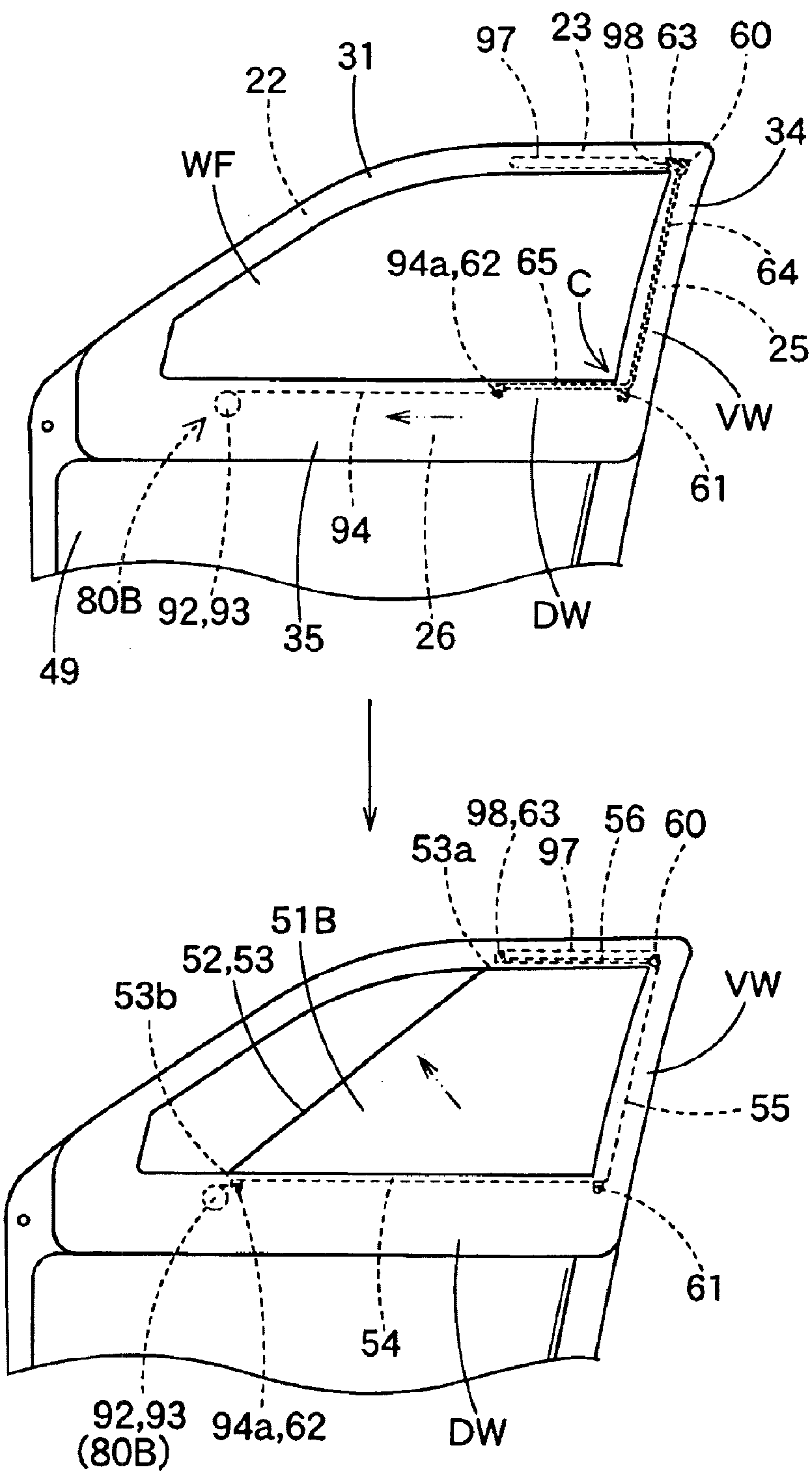
FIG. 23 presents diagrams showing still another modification of the shielding member.
Figure 24A:
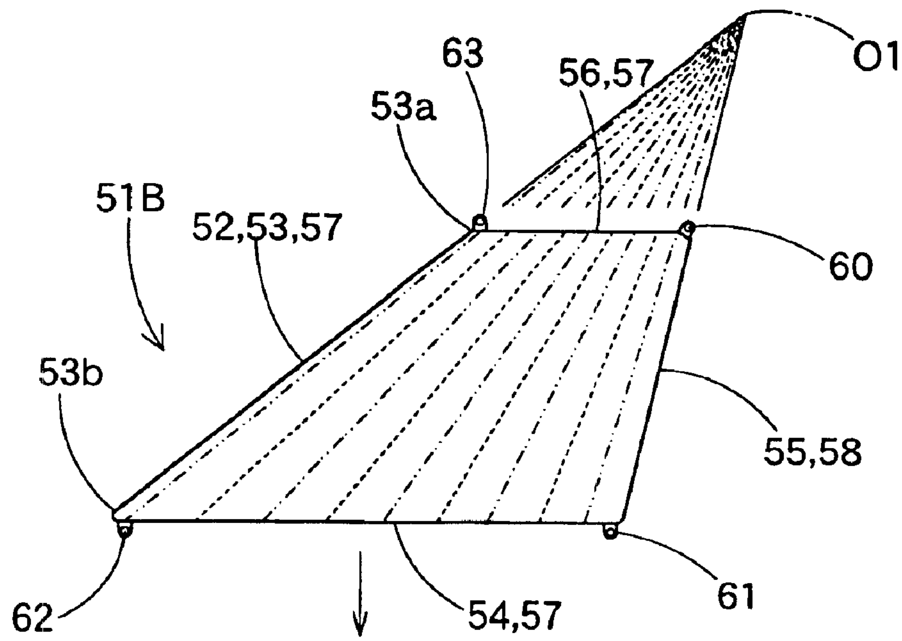
FIGS. 24A, 24B, and 24C are diagrams showing the sequential steps of folding the shielding member shown in FIG. 23.
Figure 24B:
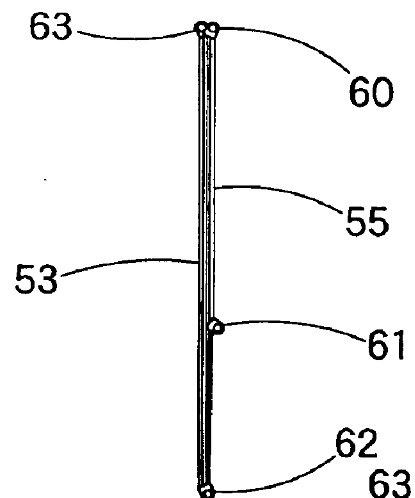
Figure 24C:
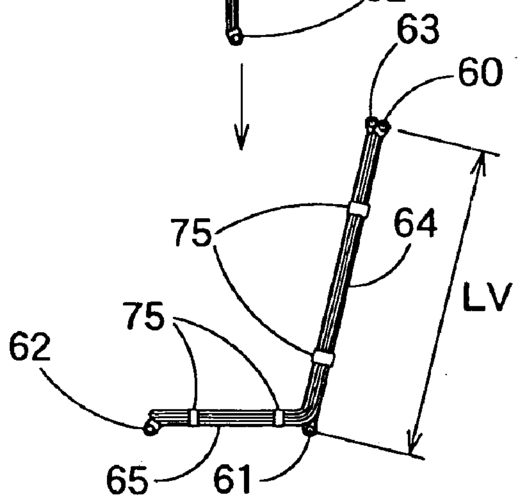

On the other hand, the shielding member should not be so limited to a triangular sheet shape having three apexes as to facilitate the mounting work on the peripheral edge of the window. As shown in FIGS. 23 and 24, however, a sheet-shaped flexible shielding member 51B which has such a generally triangular sheet shape as is cut at its upper end to form a rectangular sheet shape may be employed.

This shielding member 51B is formed into a shape having the oblique side 53 crossing the window WF obliquely during deployment. Moreover, the shielding member 51B is shaped to shield such one of regions of the window WF halved by the oblique side 53 as is located on the lower side of the oblique side 53. Specifically, the shielding member 51B has the generally trapezoidal shape including: the oblique side 53; the lower edge portion 54 extending from the lower end 53*b* of the oblique side 53 to the vertical edge portion VW on the housing side; an upper edge portion 56 extending from the upper end 53*a* of the oblique side 53 to the vertical edge portion VW on the housing side; and the vertical edge portion 55 along the vertical edge portion VW.

The shielding member 51B is folded and housed between the rear vertical edge portion 25 of the door frame 22 in the vertical edge portion VW of the peripheral edge of the window WF and the rear vertical edge portion 34 of the door frame garnish 31, and between the lower edge portion 26 of the door frame 22 in the lower edge portion DW of the peripheral edge of the window WF and the lower edge portion 35 of the door frame garnish 31. In short, the shielding member 51B is folded and housed in such an inverted L-shape as to cross the intersection corner C at which the vertical edge portion VW and the lower edge portion DW intersect.

In the shielding member 51B, moreover, the upper apex portion 60 at the intersection between the vertical edge portion 55 and the upper edge portion 56, and the lower apex portion 61 near the intersection between the vertical edge portion 55 and the lower edge portion 54, are fixed on the rear vertical edge portion 25 of the door frame 22 in the vertical edge portion VW, and the leading end apex portion 62 on the side of the lower end 53*b* of the oblique side 53 is connected to the leading end 94*a* of the tension member 94 of the pretensioner 92 acting as deployment means 80B. On an upper leading apex portion 63 of the intersection between the oblique side 53 and the upper edge portion 56, i.e., on the upper end 53*a* of the oblique side 53, there is mounted a roller 98 which is slid on and guided by a guide rail 97.

The deployment means 80B for letting off the shielding member 51B is constructed to include: the pretensioner 92 provided with the tension member 94 similar to that of the first embodiment; the roller 98 mounted on the upper leading apex portion 63; and the guide rail 97 mounted on the upper edge portion 23 of the door frame 22 for guiding the roller 98 so that the roller 98 slides on the guide rail 97. The guide rail 97 is arranged on the door frame upper edge portion 23 to guide the roller 98 from the location occupied by the upper leading apex portion 63 at the time of folding/housing the shielding member 51B, which is illustrated in the upper part of FIG. 23, to the location occupied by the upper leading apex portion 63 at the time of deployment completion, which is shown in the lower part of FIG. 23. Thus, as shown in FIG. 23, the upper end 53*a* of the oblique side 53 follows the guide roller 98 when the shielding member 51B is deployed.

Moreover, the shielding member 51B is folded from the flat expanded state, when housed, as shown in FIG. 24, such that the distance of the vertical edge portion 55 (or the stationary side edge portion 58) to be fixed on the peripheral edge of the window WF may be unchanged. Specifically, the shielding member 51B is folded to bring the side of the oblique side 53 closer to the side of the vertical edge portion 55 by making the folding width larger on the lower edge side than on the upper edge side so as not to change the distance LV between the upper apex portion 60 and the lower apex portion 61 near the intersection corner C. In the case of the embodiment, the shielding member 51B is folded in such a folding-fan shape on an intersection 01 between the extension of the oblique side 53 and the extension of the vertical edge portion 55 in the flatly expanded state that the folding width is made wider on the side of the lower edge portion 54 than on the side of the upper edge portion 56. Here, the shielding member 51B thus folded is wrapped with collapse preventing breakable tape members 75 and is provided with the roller 98 at its upper leading apex portion 63.

At the time of completion of the fold, the folded portion from the upper apex portion 60 to the lower apex portion 61 being the vertical edge portion 55 is the vertical edge side housed portion 64 which is housed between the rear vertical edge portion 25 of the door frame 22 and the rear vertical edge portion 34 of the door frame garnish 31. On the other hand, the folded portion of the lower edge portion 54 from the lower apex portion 61 to the leading apex portion 62 is the lower edge side housed portion 65 which is housed between the lower edge portion 26 of the door frame 22 and the lower edge portion 35 of the door frame garnish 31.

Then, the shielding member unit is assembled by mounting the pretensioner 92 on the outer side face of the garnish 31, mounting the folded shielding member 51B with the garnish 31 and connecting the leading apex portion 62 of the shielding member 51B to the tension member leading end 94*a* of the pretensioner 92. When the shielding member unit assembled is mounted together with the garnish 31 on the door frame 22 while assembling the roller 98 with the guide rail 97, moreover, the shielding member unit can be assembled with the door frame 22. When the door trim 49 is then mounted on the lower portion of the door frame lower edge portion 26, the assembly of the door FD can be completed. When the door FD is mounted on the body 1, moreover, the shielding member 51B and the deployment means 80B can be mounted on the vehicle.

In this shielding member 51B, too, at the deployment time, the oblique side 53 substantially rises from the intersection corner C of the peripheral edge of the window WF so that it may turn clockwise, as viewed from the inner side of the vehicle, on the upper leading apex portion 63 to be moved forward while being guided by the guide rail 97 to the deployment completion position. In short, the oblique side 53 as the edge portion 52 to cross the window is deployed obliquely upward from the intersection corner C on the lower side of the peripheral edge of the window WF. Even if the occupant leans against the peripheral edge of the window WF on the inner side I, therefore, the oblique side 53 raises the occupant from the lower side thereby to deploy the shielding member 51B smoothly.

The shielding member 51B and the shielding member 51F/51R of the first/second embodiment, more specifically, is folded and housed so that the oblique side 53 approaches the side of the vertical edge portion VW which is in the shielded region of the window WF/WR and extends upward from either one of front/rear end of the lower edge portion DW of the peripheral edge of the window WF/WR. The lower end 53*b* of the oblique side 53 is deployed in the direction apart from the side of the vertical edge portion VW on the housing side.

In these cases, at the activated time of the deployment means 80, the oblique side 53 can be moved upward by moving the lower end 53*b* of the oblique side 53 laterally. Moreover, the tension along the oblique side 53 can be easily established in the oblique side 53 of the shielding member 51B/51F/51R when completely deployed, so that the airbag 104 can be stably supported.

In these cases, moreover, the deployment means 80 (i.e., the inflator 82 or the pretensioner body 93 acting as the drive source for the deployment means 80) can be arranged at the lower edge portion DW of the peripheral edge of the window WF/WR. Specifically, there is a larger space on the lower side of the window WF/WR than at such an upper edge portion UW of the peripheral edge of the window WF/WR as has adjoining windows and a ceiling portion. Therefore, the deployment means 80 (especially, its drive source) can be easily arranged at the lower edge portion DW of the peripheral edge of the window WF/WR.

Figure 36:
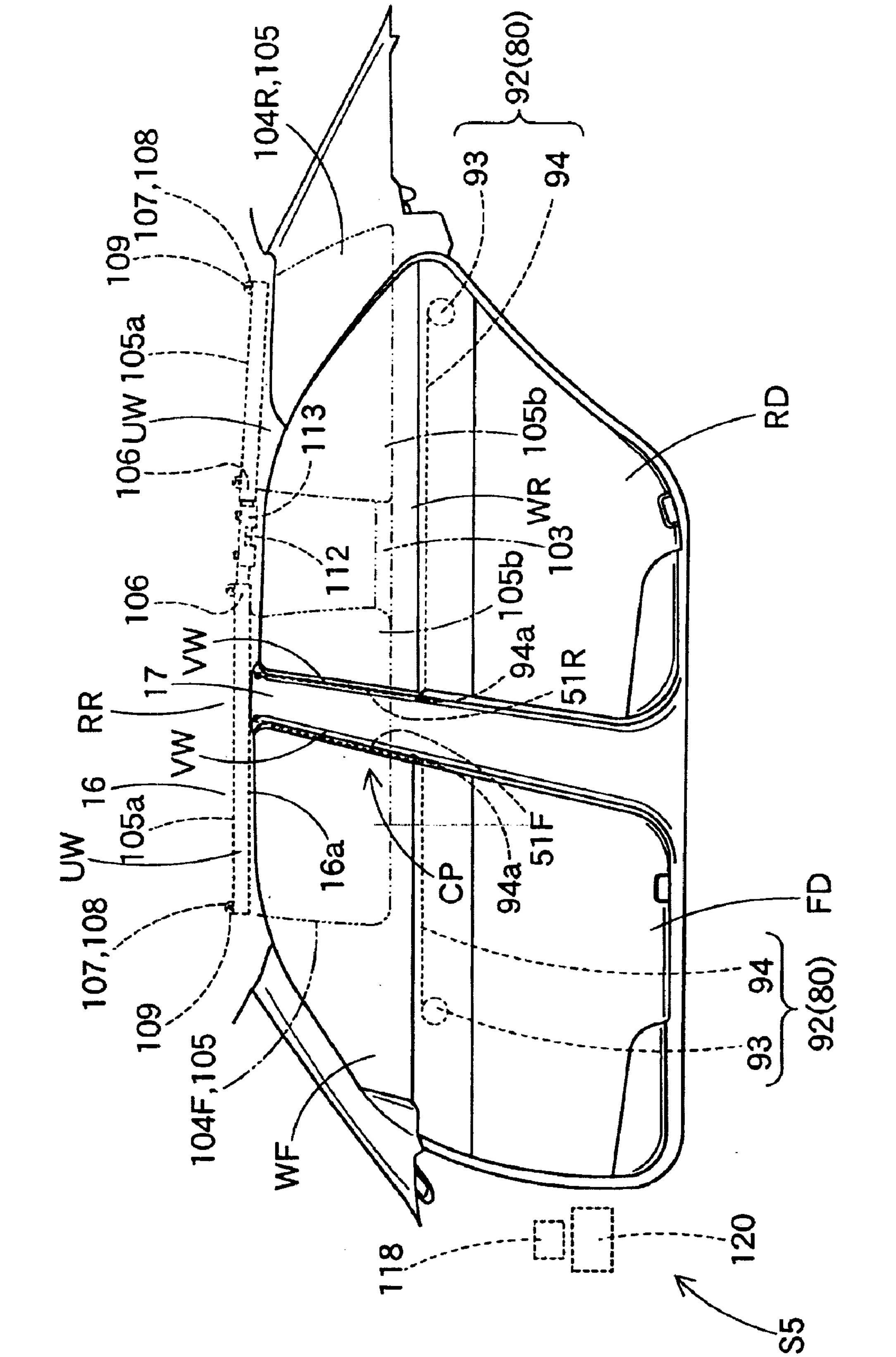
FIG. 36 is a front elevation showing an occupant restraining device of a fifth embodiment as taken from the inside of a vehicle.
Figure 37:
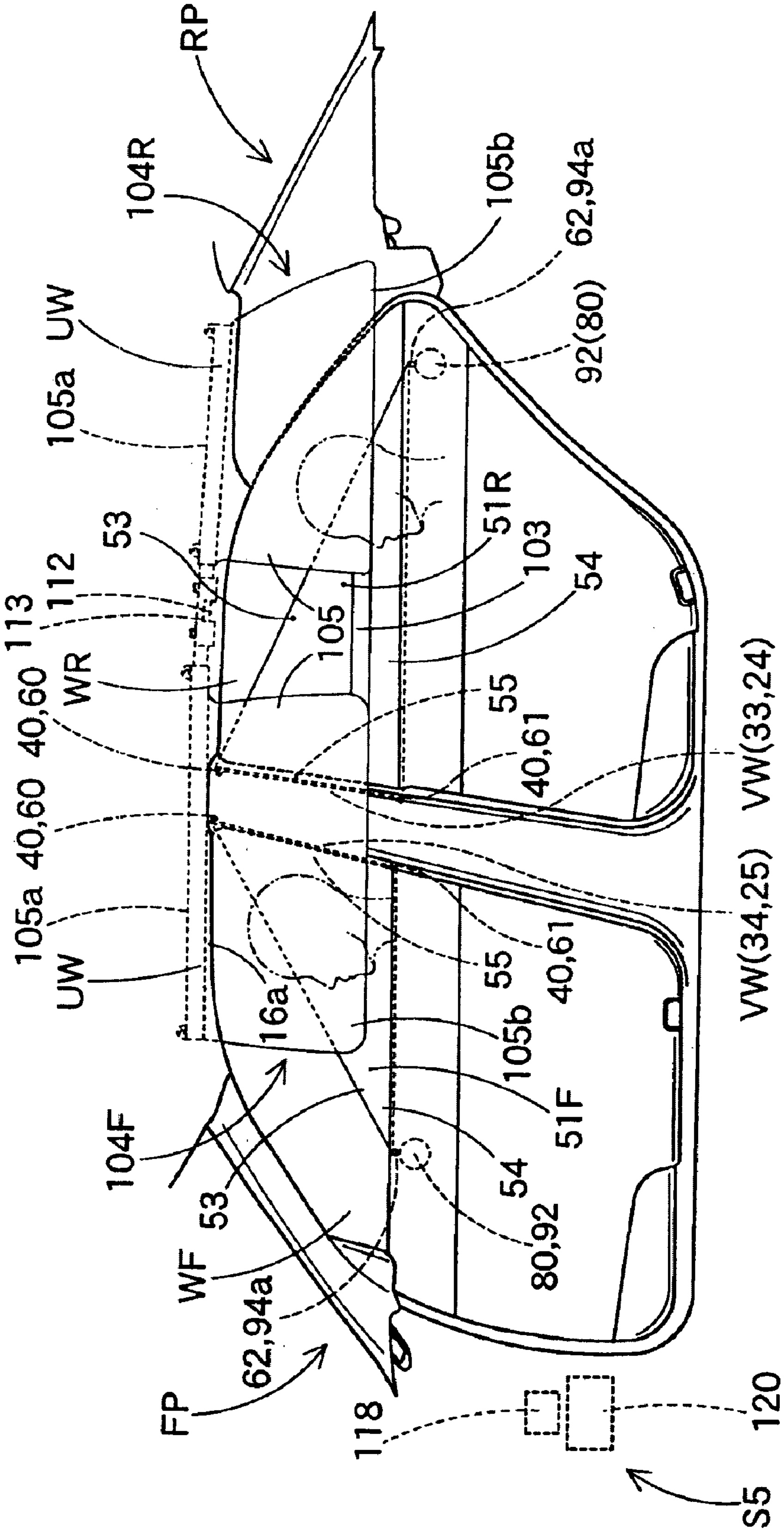
FIG. 37 is a front elevation showing the acting time of the occupant restraining device of the fifth embodiment as taken from the inside of the vehicle.

From this point of view, the shielding member 51F/51R may be housed only in the vertical edge portion VW of the peripheral edge of the window WF/WR (as referred to FIGS. 36 and 37).

However, the following working-effects can be obtained from the construction in which this shielding member 51B and the shielding member 51F/51R of first/second embodiment has the vertical edge side housed portion 64 to be housed in the vertical edge portion VW and the lower edge side housed portion 65 to be housed in the lower edge portion DW with the leading end apex portion 62 connected to the deployment means 80.

First of all, the shielding member 51B/51F/51R is not housed in its entirety in the vertical edge portion VW.

Therefore, the housing space of the vertical edge side housed portion 64 can be minimized to arrange the shielding member 51B/51F/51R easily in the door FD/RD having a limited space.

On the other hand, the leading end apex portion 62 to be connected to the deployment means 80/80B can be arranged at the leading end of the vertical edge side housed portion 64 housed in the lower edge portion DW. Moreover, the leading end apex portion 62 can be so housed in the lower edge portion DW as to protrude from the vertical edge portion VW. As compared with the case in which the shielding member 51B/51F/51R is housed in its entirety in the vertical edge portion VW, therefore, the moving stroke of the leading end apex portion 62 till the deployment completion can be made shorter by a length size L1 (as referred to FIG. 7) of the lower edge side housed portion 65 extending from the vertical edge portion VW. As a result, the load on the pretensioner 92 as the deployment means 80/80B can be reduced so that it can be made more simple and compact.

Here, the shown embodiment has been described on the case in which the shielding member 51B/51F/51R is housed from the vehicle's rear side vertical edge portion VW of the peripheral edge of the window WF/WR to the lower edge portion DW. However, the shielding member 51B/51F/51R may be housed (as referred to FIG. 35) from the vehicle's front side vertical edge portion VW to the lower edge portion DW.

In the first/second embodiment, on the other hand, the shielding member 51 is constructed in a complete sheet shape. However, the shielding member may be formed into a net or mesh shape having holes, as long as it can shield the window WF/WR. Moreover, the shielding member may be formed into either a belt shape having only the side of the oblique side 53 of the shielding member 51 or a T-shaped belt shape having only the vicinity of the inflation portions 121*b* or the inlet passage 121*a* of the shielding member 121 (as referred to FIG. 16).

Figure 25A:
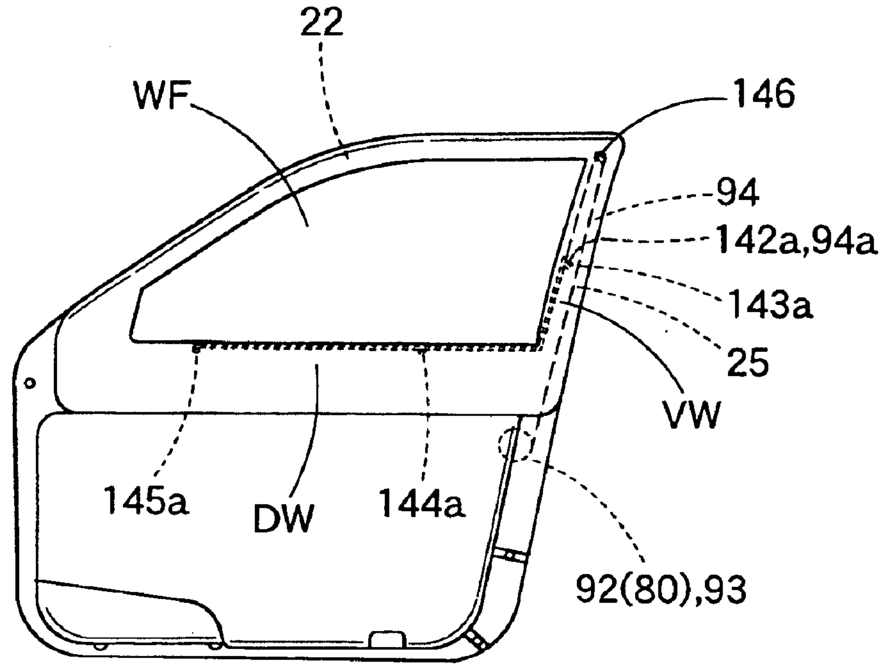
FIGS. 25A and 25B are diagrams showing still another modification of the shielding member.
Figure 25B:
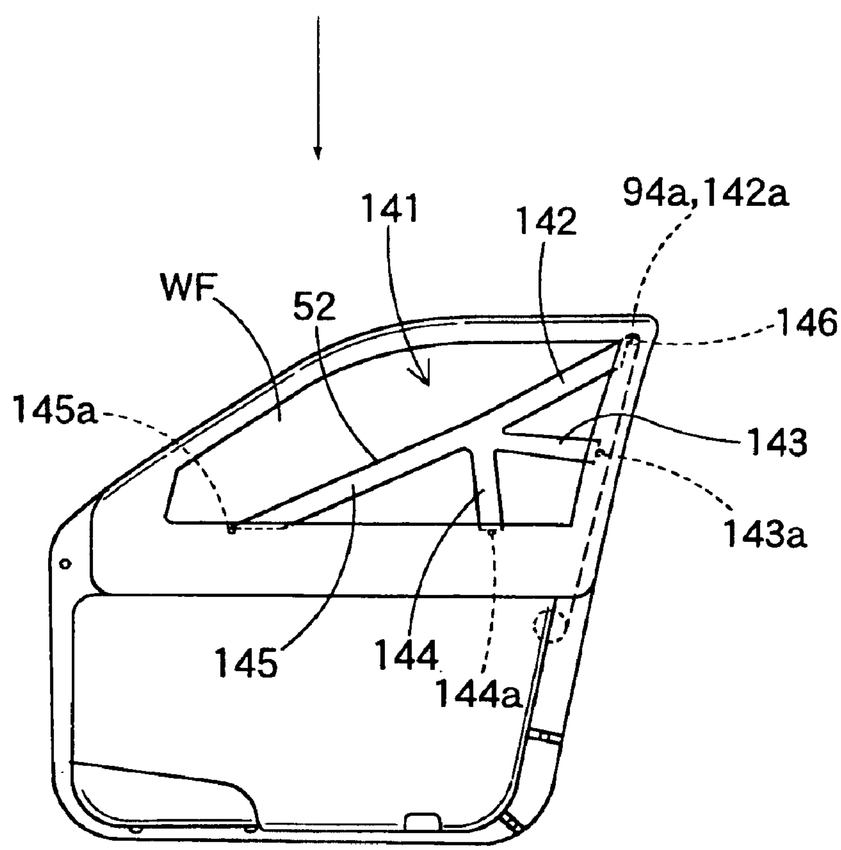
Figure 26:
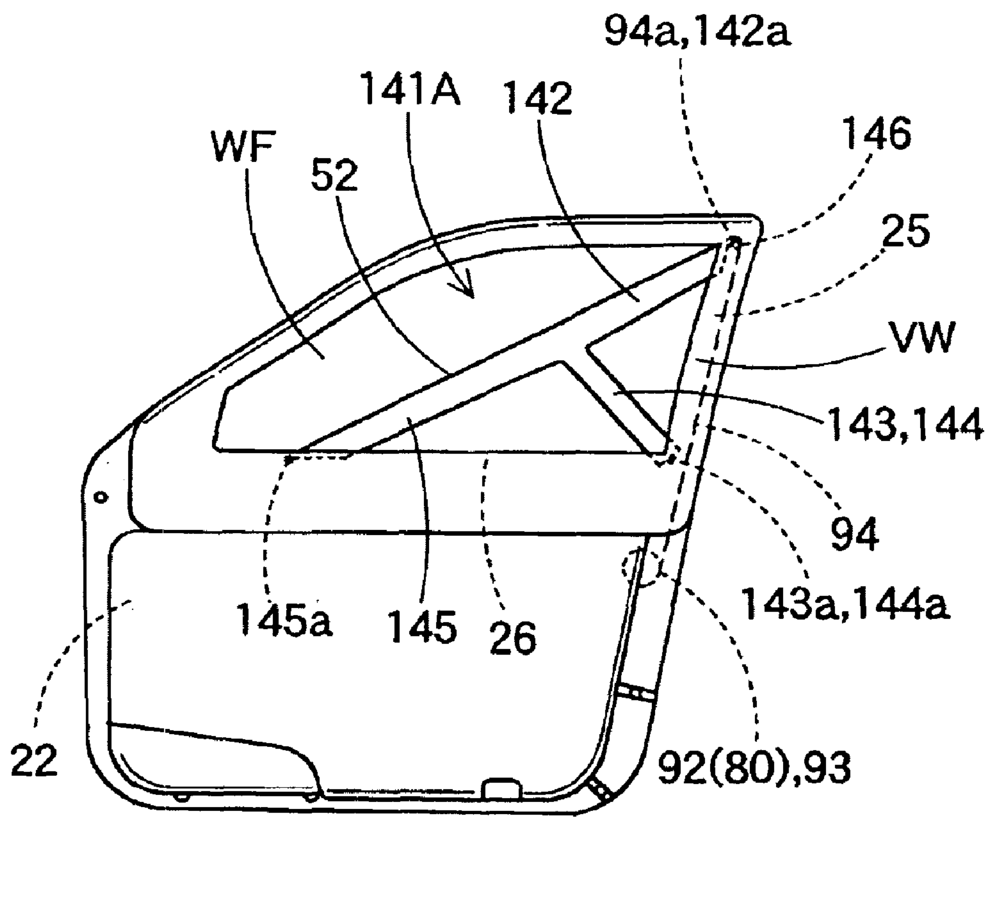
FIG. 26 is a diagram showing still another modification of the shielding member.

Here, the belt-shaped shielding member may be formed, like a shielding member 14*l* shown in FIG. 25, by jointing a plurality of band-shaped portions 142/143/144/145 for shielding the window WF. In this shielding member 141, the leading ends 143*a*/144*a*/145*a* of the band-shaped portions 143/144/145 are connected to the door frame 22, and the leading end 142*a* of the band-shaped portion 142 is connected to the leading end 94*a* of the tension member 94 in the pretensioner 92 as the deployment means 80. The tension member 94 is wound on a rotatable roller 146 arranged in the upper portion of the rear vertical edge portion 25 of the door frame 22 and is connected to the band-shaped portion leading end 142*a*. At the housing time, the shielding member 141 is housed in the vertical edge portion VW and the lower edge portion DW, as shown in FIG. 25A. At the acting time, moreover, the pretensioner 92 tenses the tension member 94 and pulls up the leading end 142*a* of the band-shaped portion 142, as shown in FIG. 25B, so that the deployment is completed. When the shielding member is constructed of band-shaped portions, it is possible to set the number of the band-shaped portions arbitrarily. For example, as a T-shaped shielding member 141A shown in FIG. 26, a shielding member may be constructed by joining the band-shaped portions 143/144 of the shielding member 141 into one to make the three band-shaped portions including the band-shaped portions 142/145 and by connecting the leading end 143*a*/144*a* of the single band-shaped portion 143/144 to the vicinity of the intersection between the rear vertical edge portion 25 and the lower edge portion 26 of the door frame 22. The housing of this shielding member 141A is similar to that shown in FIG. 25A, excepting the connecting positions of the band-shaped portions 143/144 to the door frame 22.

In this shielding member 141/141A, also, the tensile force of the pretensioner 92 as the deployment means 80 acts directly on the band-shaped portion 142/145 so that a high tension can be established in the band-shaped portions 142/145 acting as the edge portion 52 to be deployed across the window WF.

In case the pretensioner 92 is used as the deployment means 80 of the shielding member 51, the tension member 94 itself may be used as a part of the shielding member 51. Specifically, a portion of the tension member 94 may be used as the edge portion 52 of the shielding member 51 to cross the window WF/WR.

Figure 27:
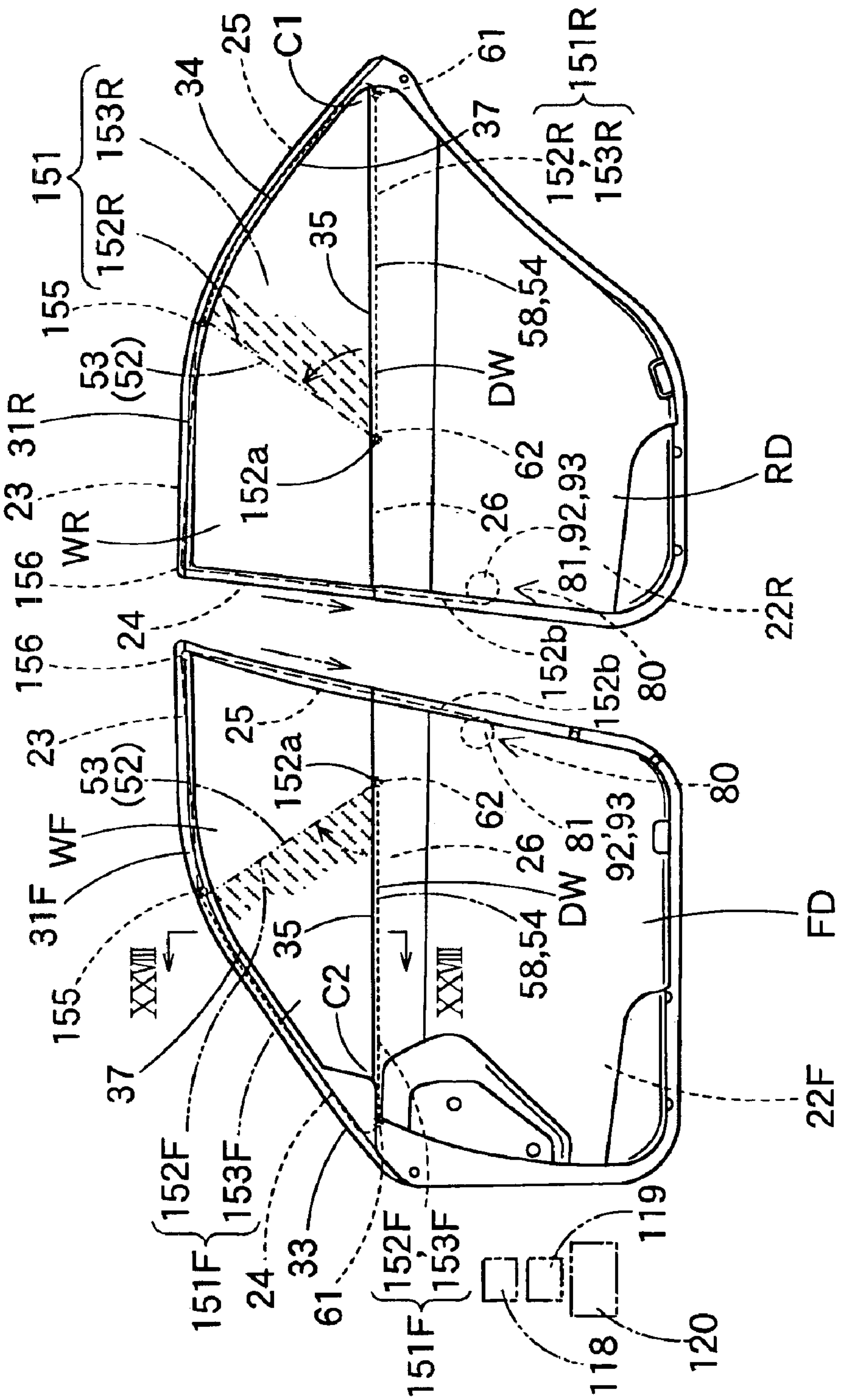
FIG. 27 presents diagrams showing still another modification of the shielding member.
Figure 28:
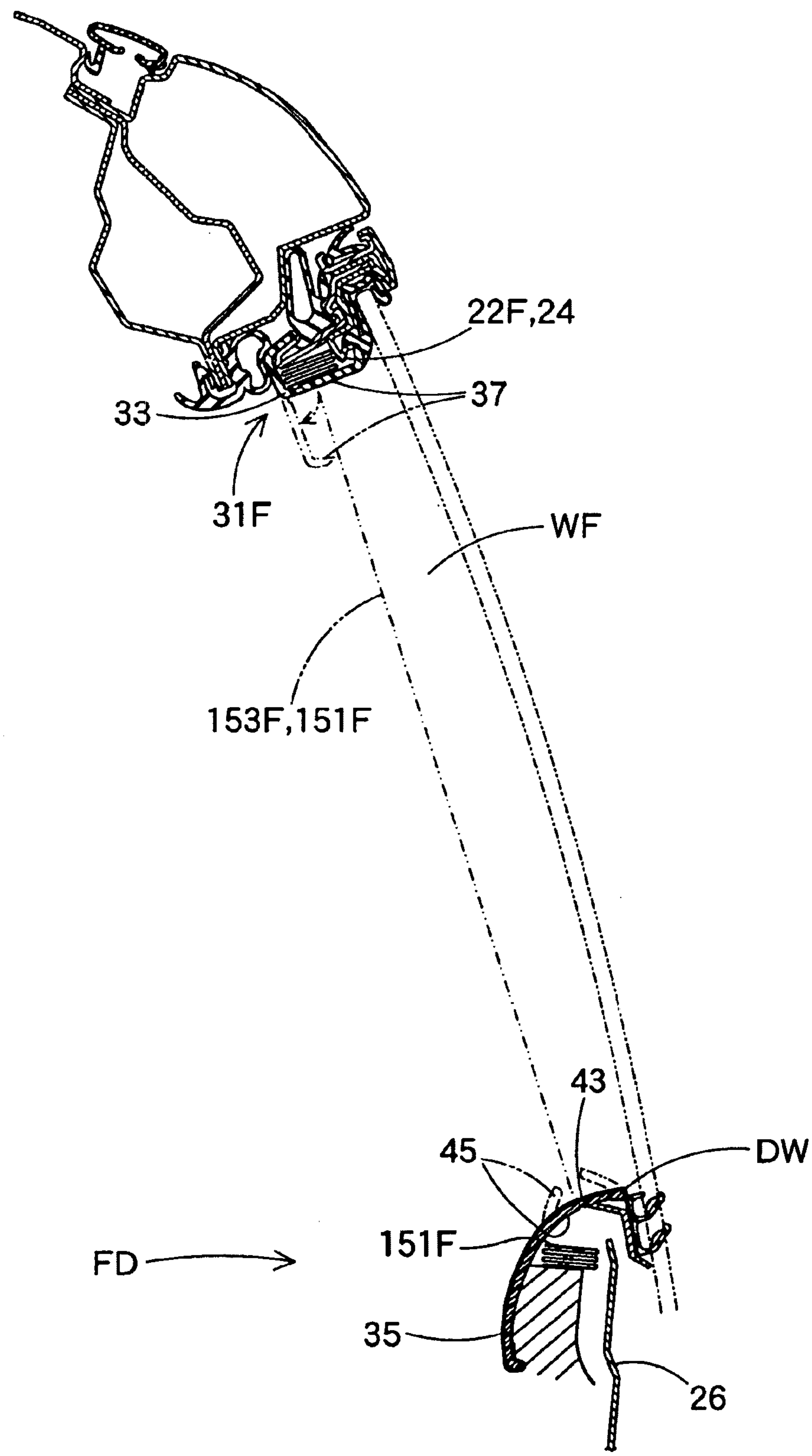
FIG. 28 is a schematic section of a portion XXVIII—XXVIII of FIG. 27.

As shown in FIGS. 27 and 28, for example, a shielding member 151F/151R may be constructed to include a flexible triangular sheet member 153F/153R for covering the side of the front lower corner C2 of the window WF or the rear lower corner C1 of the window WR, and a string member 152F/152R. This string member 152F/152R is connected at its leading end side to the substantially entire length of the oblique side 53 on the upper edge side of the sheet member 153F/153R. The sheet member 153F/153R is fixed at the front/rear end portion 61/62 of the lower edge portion 54 on the lower edge portion 26 of the door frame 22F/22R on the side of the lower edge portion DW by using the lower edge portion 54 as the stationary edge portion 58.

The string member 152F is bonded at its leading end portion 152*a* to the oblique side 53 acting as the edge portion 52 in the sheet member 153F to cross the window WF and this leading edge portion 152*a* together with the edge portion 62 of the sheet member 153F is fixed to the lower edge portion 26 of the door frame 22F in the vicinity of the center pillar portion CP. Moreover, the string member 152F is wound at its root portion 152*b* on a free roller 155 fixed on the vicinity of the front portion of the upper edge portion 23 in the door frame 22F and further on a free roller 156 fixed on the vicinity of the upper end of the rear vertical edge portion 25*in* the door frame 22F. Moreover, the root portion 152*b* is connected in a tensible manner to the body 93 of the pretensioner 92 arranged at the lower edge portion 26 of the door frame 22F.

The string member 152R is bonded at its leading end portion 152*a* to the oblique side 53 acting as the edge portion 52 in the sheet member 153R to cross the window WR and this leading edge portion 152*a* together with the edge portion 62 of the sheet member 153R is fixed to the lower edge portion 26 of the door frame 22R in the vicinity of the center pillar portion CP. Moreover, the string member 152R is wound at its root portion 152*b* on a free roller 155 fixed on the vicinity of the rear portion of the upper edge portion 23 in the door frame 22R and further on a free roller 156 fixed on the vicinity of the upper end of the front vertical edge portion 24 in the door frame 22R. Moreover, the root portion 152*b* is connected in a tensible manner to the body 93 of the pretensioner 92 arranged at the lower edge portion 26 of the door frame 22R.

The shielding member 151F/151R is so folded along the lower edge portion 54 that it may be covered with the lower edge portion 35 of the door frame garnish 31F/31R and that the sheet member 153F/153R together with the string member 152F/152R may be close to the lower edge portion 54 as the stationary edge portion 58. On the other hand, the string member 152F is housed along the garnish 31F from the side of the door frame front vertical edge portion 24 through the free roller 155/156 so that the portion extending from the sheet member 153F may be covered with the garnish 31F on the side of the door FD. Moreover, the string member 152R is housed along the garnish 31R from the side of the door frame rear vertical edge portion 25 through the free roller 155/156 so that the portion extending from the sheet member 153R may be covered with the garnish 31R on the side of the door RD.

In this shielding member 151F/151R, when the control device 120 activates each pretensioner body 93 acting as the drive source 81 of the deployment means 80 on detecting a rollover, the string member 152F/152R is tensed while being guided by the free roller 155/156. Then, the sheet member 153F raises the oblique side 53 obliquely backward and upward from the front lower corner C2 of the window WF. The sheet member 153R raises the oblique side 53 obliquely forward and upward from the rear lower corner C1 of the window WR. Then, the shielding member 151F/151R shields the window WF/WR. At this action time, the string member 152 and the sheet member 153 push/open the door portion 37/45 (although the numeral 37 is not shown) of the garnish 31 (as referred to FIG. 28).

Figure 29:
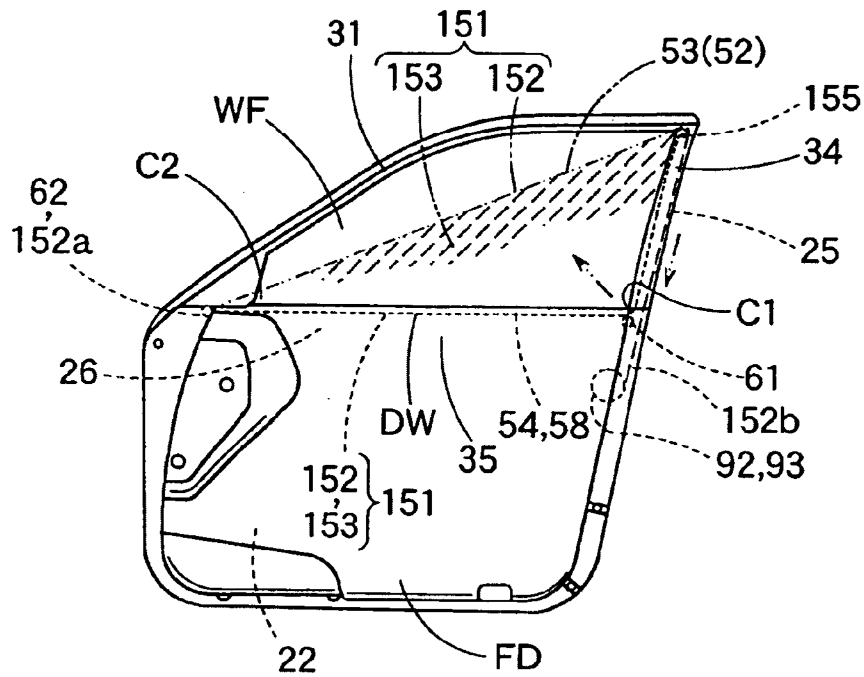
FIG. 29 is a diagram showing another modification of the shielding member.
Figure 30:
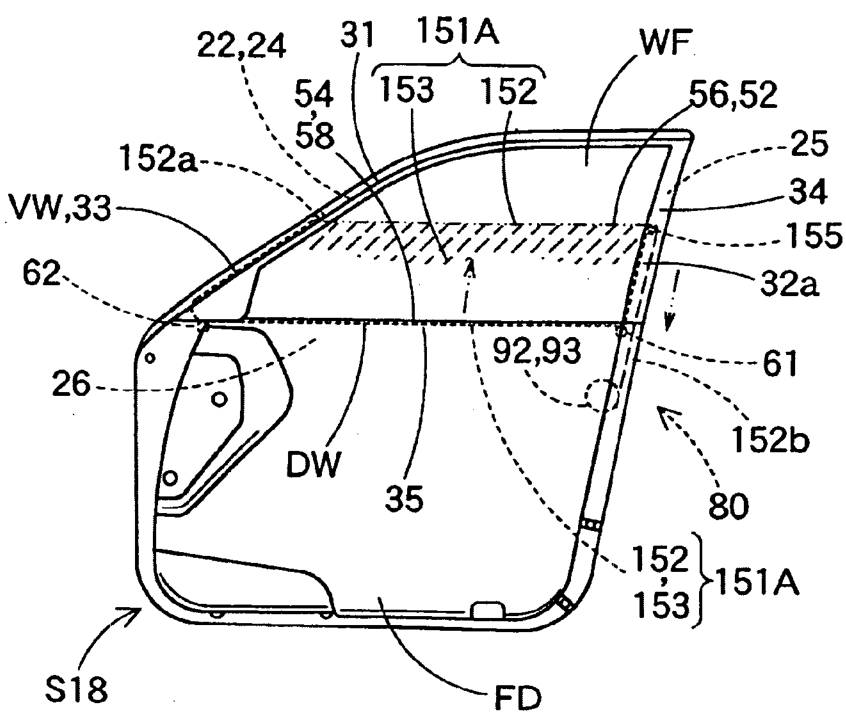
FIG. 30 is a diagram showing another modification of the shielding member.

Moreover, the shapes and the arrangement of the string member 152 and sheet member 153 may be constructed as shown in FIGS. 29 and 30, as long as they rise from the side of the lower edge portion DW in the peripheral edge of the window WF/WR.

The shielding member 151 shown in FIG. 29 is constructed to include the triangular sheet member 153 for shielding the half of the window WF on the side of the rear lower corner C1, and the string member 152 connected to the oblique side 53 of the sheet member 153. In the sheet member 153, the lower edge portion 54 is fixed as the stationary side edge portion 58 at its front and rear edge portions 61/62 on the door frame lower edge portion 26. The sheet member 153 is folded toward the lower edge portion 54 and is housed to be covered with the lower edge portion 35 of the garnish 31. The string member 152 is fixed at its leading end 152*a* in the vicinity of the front lower corner C2 of the door frame 22 and is covered, when housed, with the lower edge portion 35 of the garnish 31. Moreover, the part apart from the sheet member 153 is housed in the rear vertical edge portion 34 on the rear side of the garnish 31 and is turned back by winding itself downward on the free roller 155 fixed at the rear vertical edge portion 25 of the door frame 22. The root portion 152*b* is connected to the body 93 of the pretensioner 92 arranged at the door frame lower edge portion 26.

In the shielding member 151 shown in FIG. 29, when the pretensioner body 93 is active, the string member 152 is tensed so that the oblique side 53 rises upward and forward from the rear lower corner C1 as to rotate counter clock wise on the front lower corner C2, thereby shielding the window WF.

A shielding member 151A, as shown in FIG. 30, is constructed to include the generally rectangular sheet member 153 for shielding the lower half of the window WF, and the string member 152 connected to the substantially entire length of the upper edge portion 56 of the sheet member 153. The string member 152 is fixed at its leading end portion 152*a* on a vertically intermediate portion of the front vertical edge portion 24 of the door frame 22. The string member 152 is housed at its leading edge portion 152*a* in the front vertical edge portion 33 on the front side of the garnish 31 and extends downward to be covered with the lower edge portion 35. Moreover, the string member 152 is housed at its part apart from the sheet member 153 in the rear vertical edge portion 34 on the rear side of the garnish 31 and is turned back by winding itself downward on the free roller 155 fixed at the rear vertical edge portion 25 of the door frame 22. Still moreover, the string member 152 is connected at its root portion 152*b* to the body 93 of the pretensioner 92 arranged at the door frame lower edge portion 26. In the sheet member 153, the lower edge portion 54 is fixed as the stationary side edge portion 58 at its front and rear edge portions 61/62 on the door frame lower edge portion 26. Moreover, the sheet member 153 together with the string member 152 is folded toward the lower edge portion 54 and is housed to be covered with the lower edge portion 35 and the front vertical edge portion 33 of the garnish 31.

In the shielding member 151A shown in FIG. 30, when the pretensioner body 93 is active, the string member 152 is tensed so that the sheet member 153 rises from the lower edge portion DW of the window WF with its upper edge portion 56 acting as the edge portion 52 to cross the window WF, thereby to shield the window WF.

In these shielding members 151A/151/151F/151R, too, the tension of the string member 152 is applied directly to the oblique side 53 or the upper edge portion 56 acting as the edge portion 52 to cross the window WF/WR so that a high tension is caused.

Here in case the shielding member for shielding the window is formed into the generally rectangular shape, it may be expanded from its folded state by feeding itself with the inflating gas.

In case the shielding member 51 or the like admitting no inflating gas is used, it can be formed of a thin flexible sheet or band members, unlike the shielding member 121 or the like to be deployed admitting an inflating gas, so that the shielding member 51 can be housed compactly when folded.

Without using the sheet members 153 shown in FIGS. 27 to 30 as a shielding member, a shielding member 151B may be constructed of a band-shaped string member 152 by making the string member 152 itself of a wide band.

Figure 31:
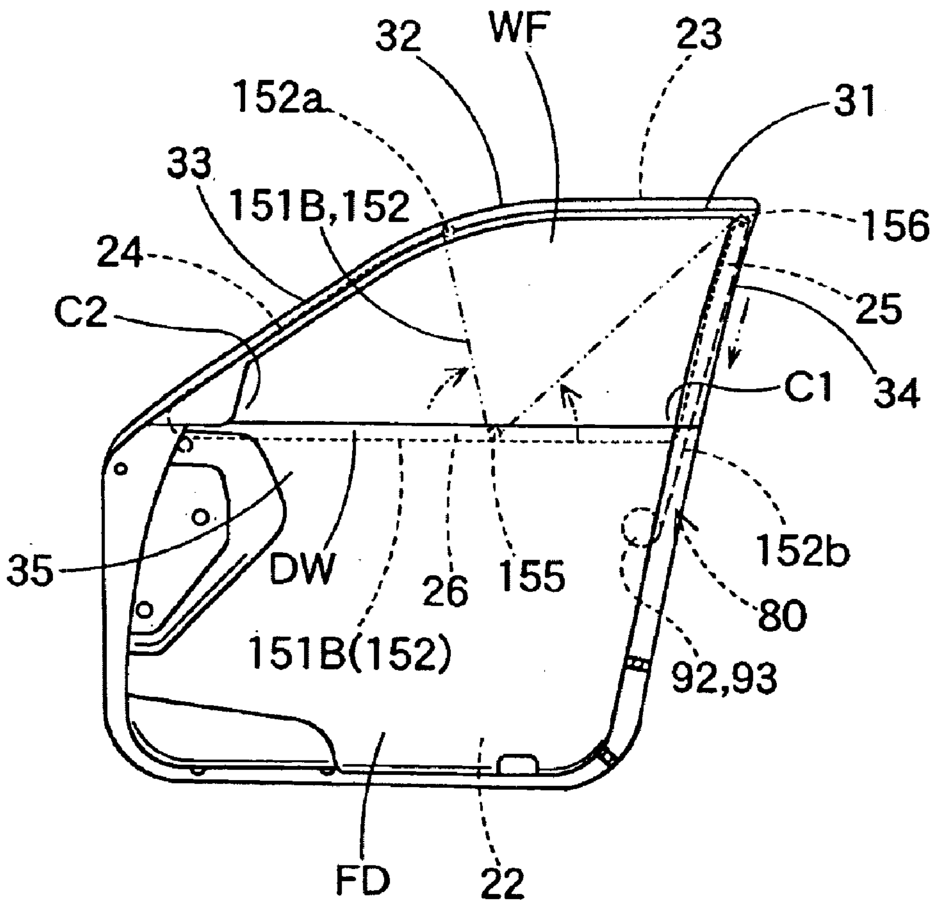
FIG. 31 is a diagram showing another modification of the shielding member.

The shielding member 151B shown in FIG. 31 is constructed of a band-shaped string member 152. This string member 152 is fixed at its leading end portion 152*a* on a position near the front end of the upper edge portion 23 of the door frame 22 of the peripheral edge of the window WF. Moreover, the string member 152 is extended downward with the side of its leading edge portion 152*a* being covered with the front vertical edge portion 33 on the front side of the garnish 31 when housed, and is further extended backward passing below the free roller 155 fixed at the door frame lower edge portion 26, while being covered with the lower edge portion 35 of the garnish 31. Moreover, the string member 152 is wound downward and turned back on the free roller 156 fixed at the upper end of the rear vertical edge portion 25 of the door frame 22 and is connected at its root portion 152*b* to the body 93 of the pretensioner 92 arranged at the door frame lower edge portion 26.

In the shielding member 151B shown in FIG. 31, when the pretensioner body 93 is activated, the string member 152 is tensed to rise obliquely backward and upward from the front lower corner C2 of the window WF and obliquely forward and upward from the rear lower corner C1 of the window WF so that it shields the window WF while joining the leading edge portion 152*a* and the free rollers 155/156, as fixed at the door frame 22, sequentially and linearly.

Figure 32:
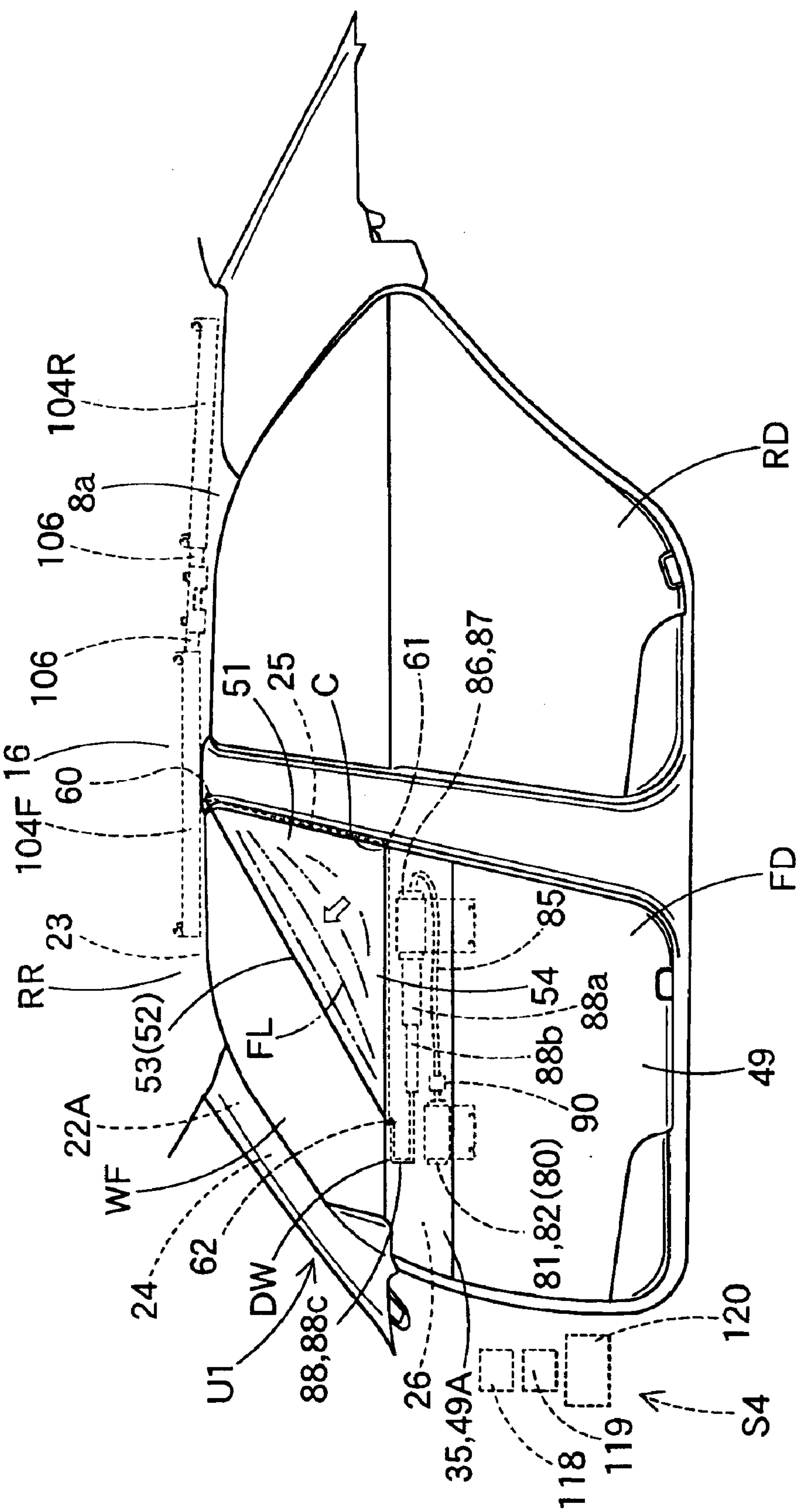
FIG. 32 is a front elevation showing an occupant restraining device of a fourth embodiment as taken from the inside of a vehicle.

The first embodiment has been described on the case in which the shielding member unit UF/UR is employed to improve the assembling work of the shielding member 51 with the door frame 22. Like an occupant restraining device S4 of a fourth embodiment shown in FIGS. 32 to 34, however, a shielding member unit U1 may be constructed of the shielding member 51F/51R and a garnish 31A but not the deployment means 80.

Figure 33:
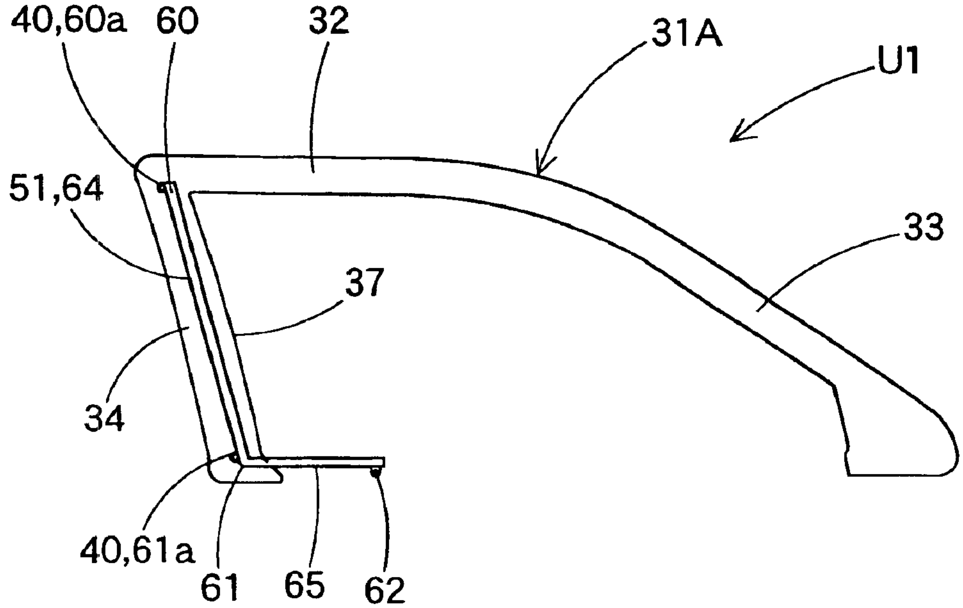
FIG. 33 is a diagram showing a shielding member unit of the occupant restraining device of the fourth embodiment as taken from the outside of a vehicle.
Figure 34:
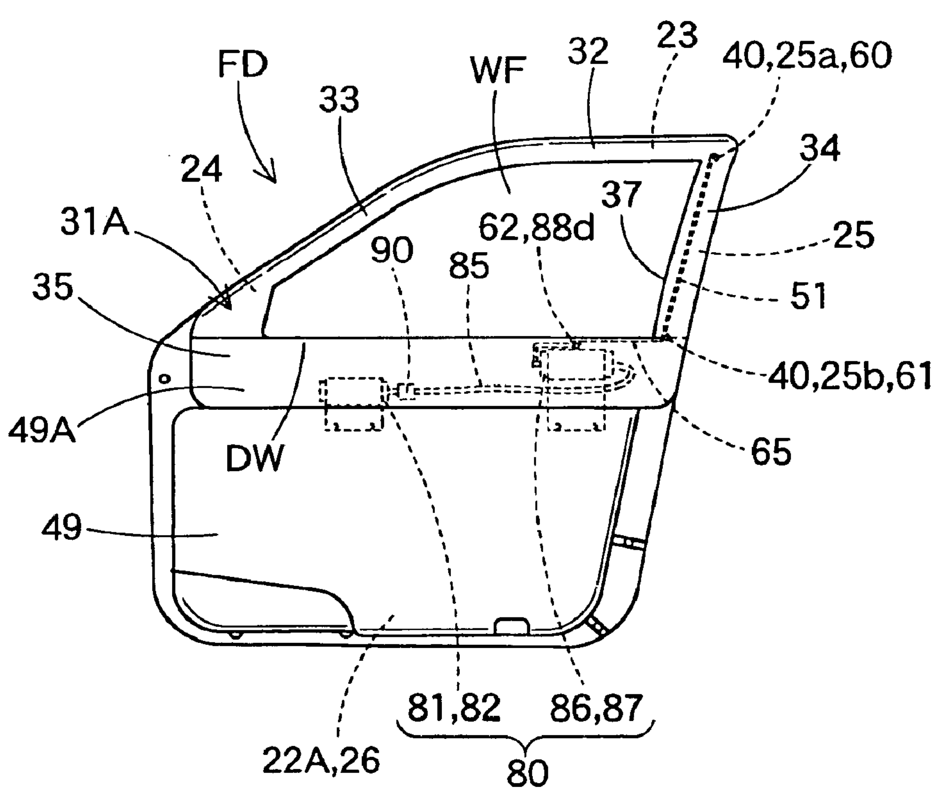
FIG. 34 is a front elevation showing a door in the state, where the shielding member unit shown in FIG. 33 is mounted in a door frame, as taken from the inside of the vehicle.

In the occupant restraining device S4 of the fourth embodiment, the shielding member unit U1 does not include a deployment means 80. As shown in FIG. 33, a garnish 31A constructing the shielding member unit U1 is not provided with a lower edge portion 35, unlike the garnish 31 of the first embodiment. Moreover, the lower edge portion 35 is formed at a door trim 49A covering the lower edge portion 26 of a door frame 22A. In addition, the fourth embodiment is different from the first embodiment in that the let-off means 80 employs the inflator 82.

In the assembly of the shielding member unit U1, the shielding member 51, while in a flattened state, is folded into a bellows shape with folds FL (as referred to FIG. 32) such that the front apex portion 62 approaches the rear apex portion 60/61.

The shielding member 51 thus folded is wrapped with a plurality of unillustrated breakable tape members for preventing the collapse of the shielding member 51. Then, the retaining pins 40 are inserted into the mounting holes 60*a*/61*a* to mount the apex portions 60/61 of the shielding member 51 in the garnish rear vertical edge portion 34 on the outer side of the vehicle, so that the shielding member unit U1 can be assembled.

Moreover, the retaining pins 40/40 are fitted in the mounting holes 25*a*/25*b* of the door frame 22A. On the other hand, the upper edge portion 32, the front vertical edge portion 33 and the rear vertical edge portion 34 of the garnish 31A are fitted in the upper edge portion 23, the front vertical edge portion 24 and the rear vertical edge portion 25 of the door frame 22A, and the garnish 31A is fixed on the door frame 22A by using bolts at not-shown portions. Thus, the shielding member unit U1 can be assembled with the door frame 22A.

After this, the inflator 82 and the cylinder 87 are fixed on the door frame 22A, and the door trims 49A/49 are mounted on the door frame lower edge portion 26. Then, the assembly of the door FD can be completed. The subsequent mounting of the unit on the vehicle and the action modes are similar to those of the shielding member unit UF/UR.

Here, the unit U1 has been described only on the side of the front door FD, but the rear door RD can also be likewise constructed.

Figure 35:
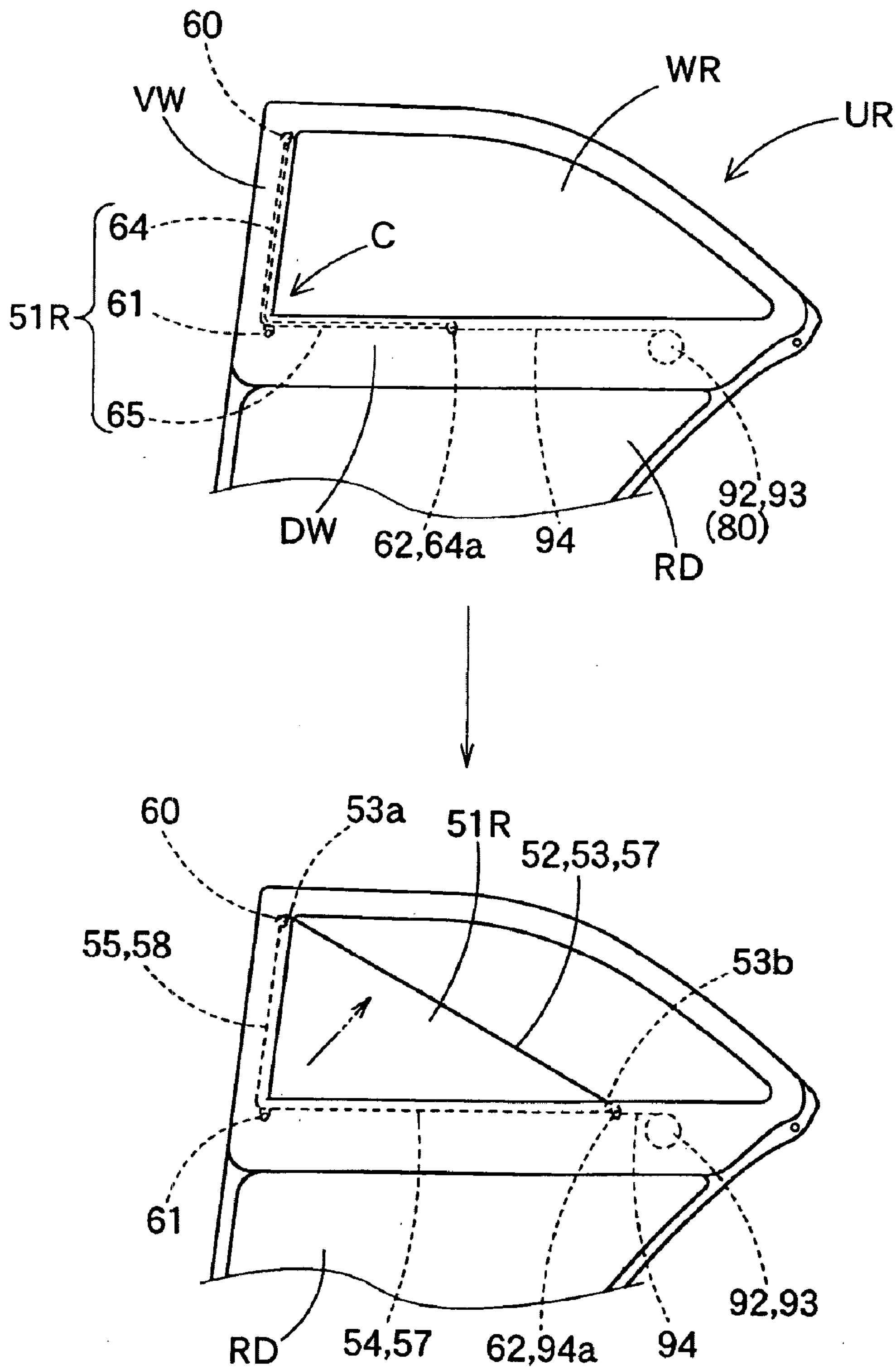
FIG. 35 presents diagrams showing a modification of a shielding member on the rear side of the vehicle.

When the shielding member unit UR is arranged in the rear door RD, the shielding member 51R can be housed in an L-shape from the front side vertical edge portion VW to the lower edge portion DW of the window WR, as shown in FIG. 35. It is natural that this construction may be applied, including the first/second embodiment, to the shielding member 51/51F arranged in the peripheral edge of the window WF on the front side. In this case, moreover, the shielding member 51/51F/51R may be housed exclusively either in the vertical edge portion VW on the front side of the vehicle or in the lower edge portion DW.

Moreover, the first to fourth embodiments have been constructed such that the airbags 104F/104R are arranged at the two front and rear positions of the vehicle. However, the construction may be modified such that one airbag having the two airbags 104F/104R connected is arranged.

As in an occupant restraining device S5 of a fifth embodiment shown in FIGS. 36 and 37, still moreover, the airbags 104F/104R may be connected near their lower edges 105*b* to each other by means of a belt 103 so that their lower edges 105*b* may swing together.

With this construction, the airbags 104F/104R having their lower edges 105*b* connected to each other can swing together so that their occupant restraining property can be stabilized.

Here in this occupant restraining device S5, the shielding member 51F/51R is housed only in the vertical edge portion VW of the peripheral edge of the window WF/WR on the rear or front side of the vehicle. In the shown embodiment, the shielding member 51F is housed between the door frame rear vertical edge portion 25 and the door frame garnish rear vertical edge portion 34 in the vertical edge portion VW of the peripheral edge of the window WF on the rear side of the vehicle. The shielding member 51R is housed between the door frame front vertical edge portion 24 and the door frame garnish front vertical edge portion 33 in the vertical edge portion VW of the peripheral edge of the window WR on the front side of the vehicle. These shielding member 51F/51R can be housed in the vertical edge portion VW by the folding method, in which the shielding member 51F/51R in the expanded state is folded in the bellows shape with crest/valley folds parallel with the vertical edge portion 55 to bring the leading end apex portion 62 close to the lower apex portion 61.

The individual embodiments have been described on the case in which the shielding member 51/121/141/151 is housed in the door FD/RD. However, the shielding member may naturally be arranged on the peripheral edge of the window which is formed in a body not a door, as exemplified in a vehicle having three tandem seats, because it can be housed in the peripheral edge of any window.

Figure 38:
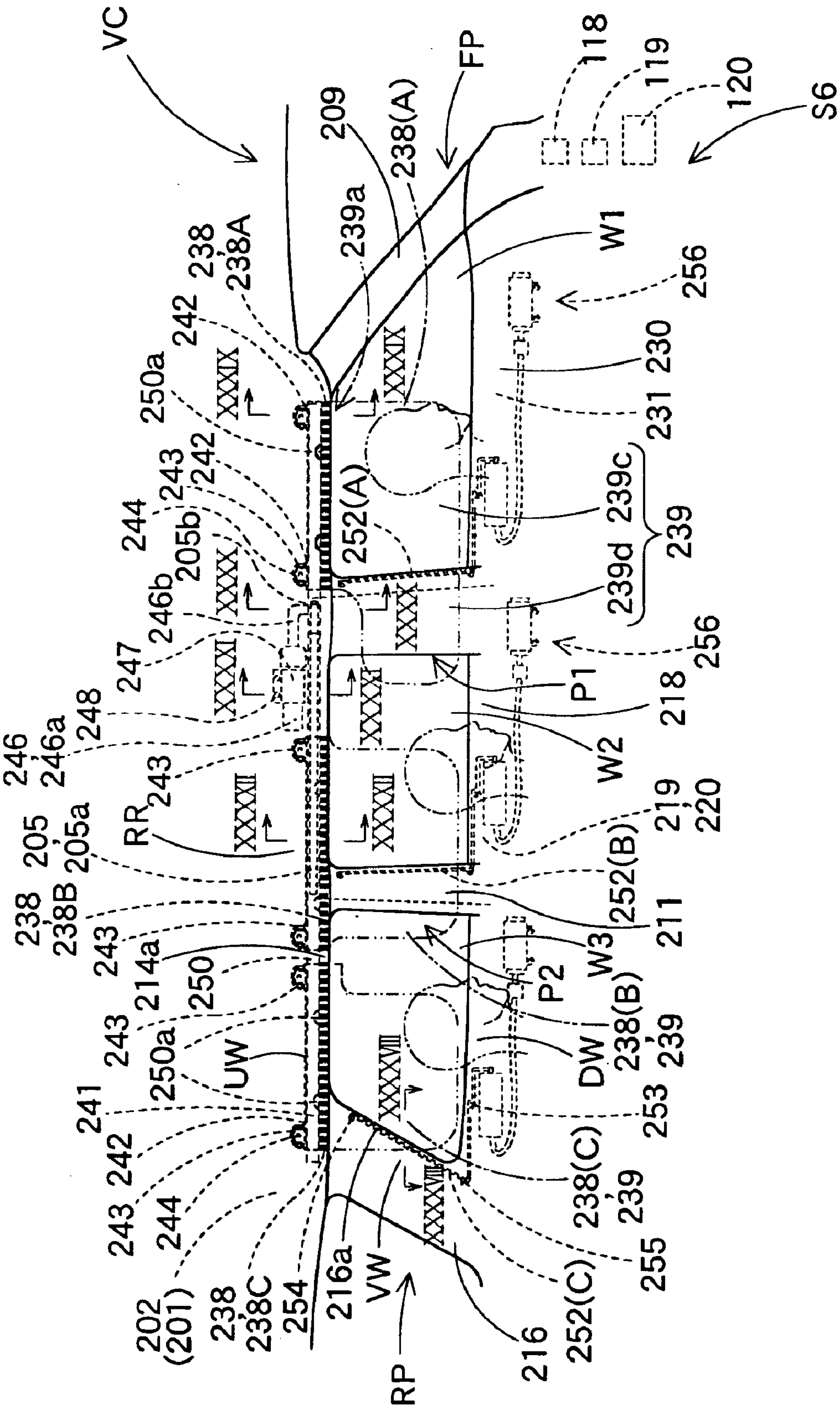
FIG. 38 is a schematic diagram showing the used mode of an occupant restraining device of a sixth embodiment.

As shown in FIG. 38, an occupant restraining device S6 of a sixth embodiment is mounted on a vehicle VC having three tandem seats. The occupant restraining device S6 is constructed by arranging three folded airbags 238 (238A/238B/238C) in the roof side rail portion RR in the upper edge side peripheral edge UW of the window W1/W2/W3 of the door or body on the inner side from the vicinity of the front pillar portion FP through first/second intermediate pillar portions P1/P2 to the vicinity of the rear pillar portion RP. In this vehicle VC, there is arranged a slide door 218 which is slid backward when opened and forward when closed. In this vehicle VC, there is further arranged a shielding member 252 (252A/252B/252C) for shielding the window W1/W2/W3. The airbag 238 and the shielding member 252 are activated when the control device 120 receives a predetermined detection signal from the rollover sensor 118 and the side collision sensor 119.

Figure 42:
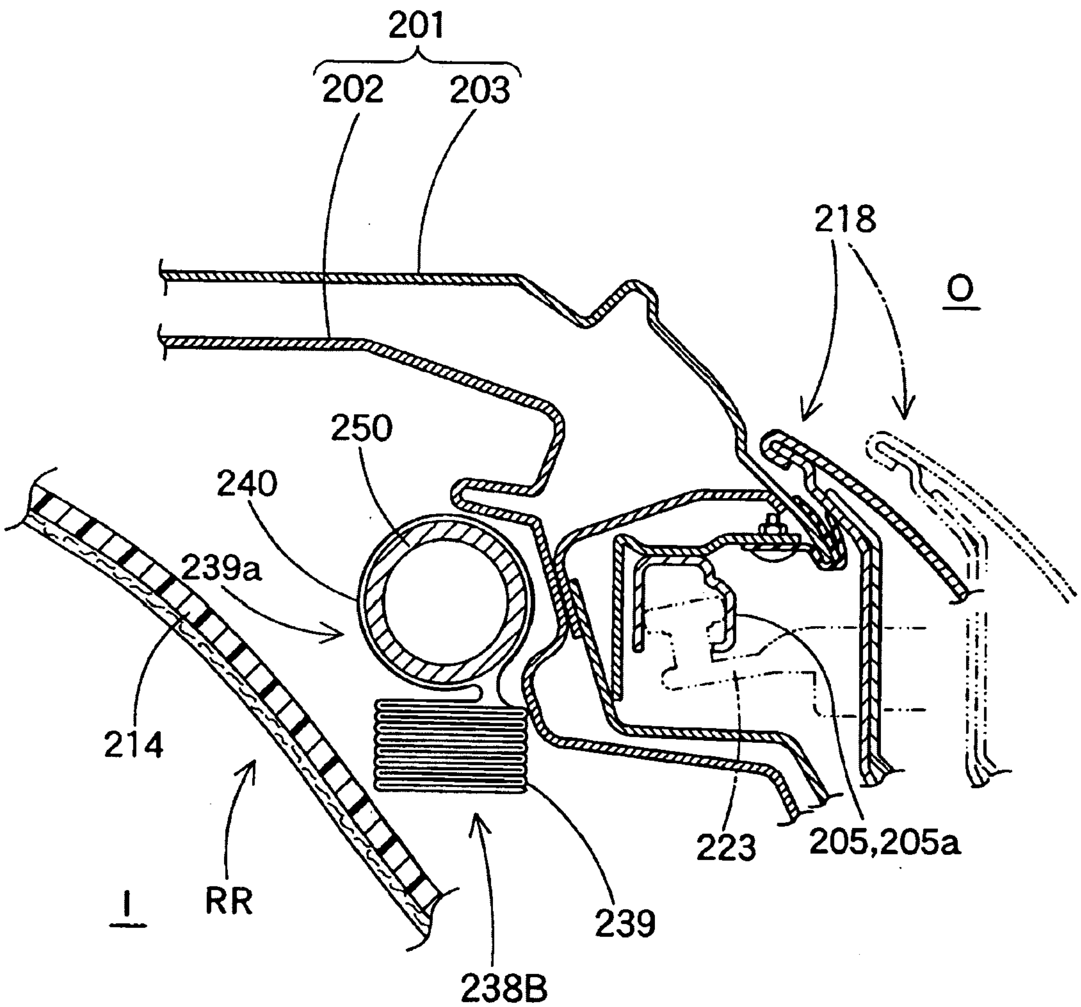
FIG. 42 is an enlarged schematic section of a portion XXXXII—XXXXII of FIG. 38.
Figure 43:
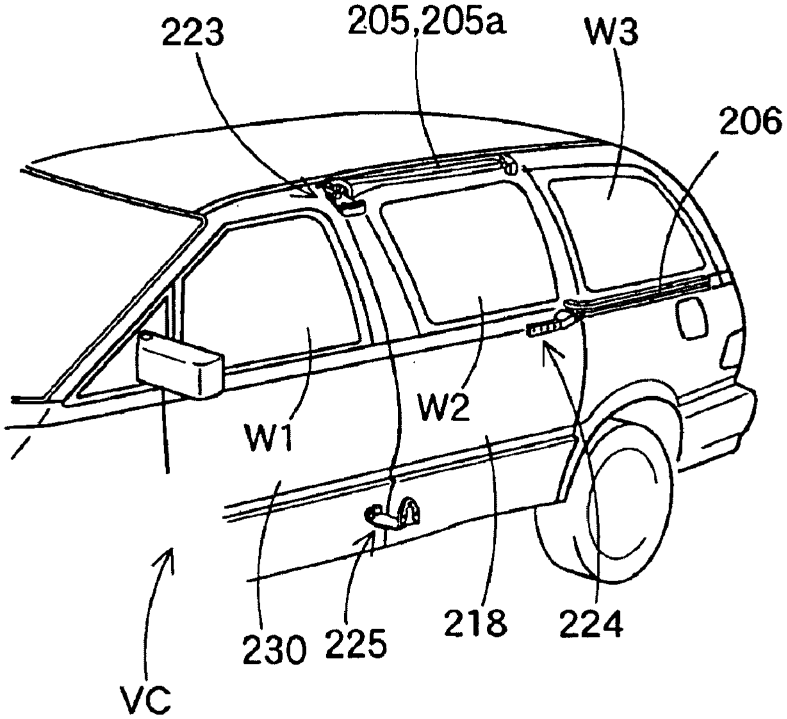
FIG. 43 is a diagram for explaining the sliding mechanism of a slide door mounted on a vehicle to which the sixth embodiment is applied.

As shown in FIG. 43, the slide door 218 is provided with three roller units 223/224/225 for guiding and supporting itself with respect to the body 201 of the vehicle VC at a sliding time. The upper roller unit 223 to be arranged at the front edge upper portion of the door 218 is constructed, as shown in FIGS. 40 to 43, to include a rotatable roller 223*b* having a generally vertical pivot, and a bracket 223*a* for bearing the roller 223*b* at the end portion at the inner side I of the vehicle. The bracket 223*a* is arranged to extend to the inner side I from an inner panel 220 in a door frame 219 of the door 218. Moreover, the roller 223*b* of the upper roller unit 223 is fitted in an upper rail 205 on the side of the body 201.

Figure 46:
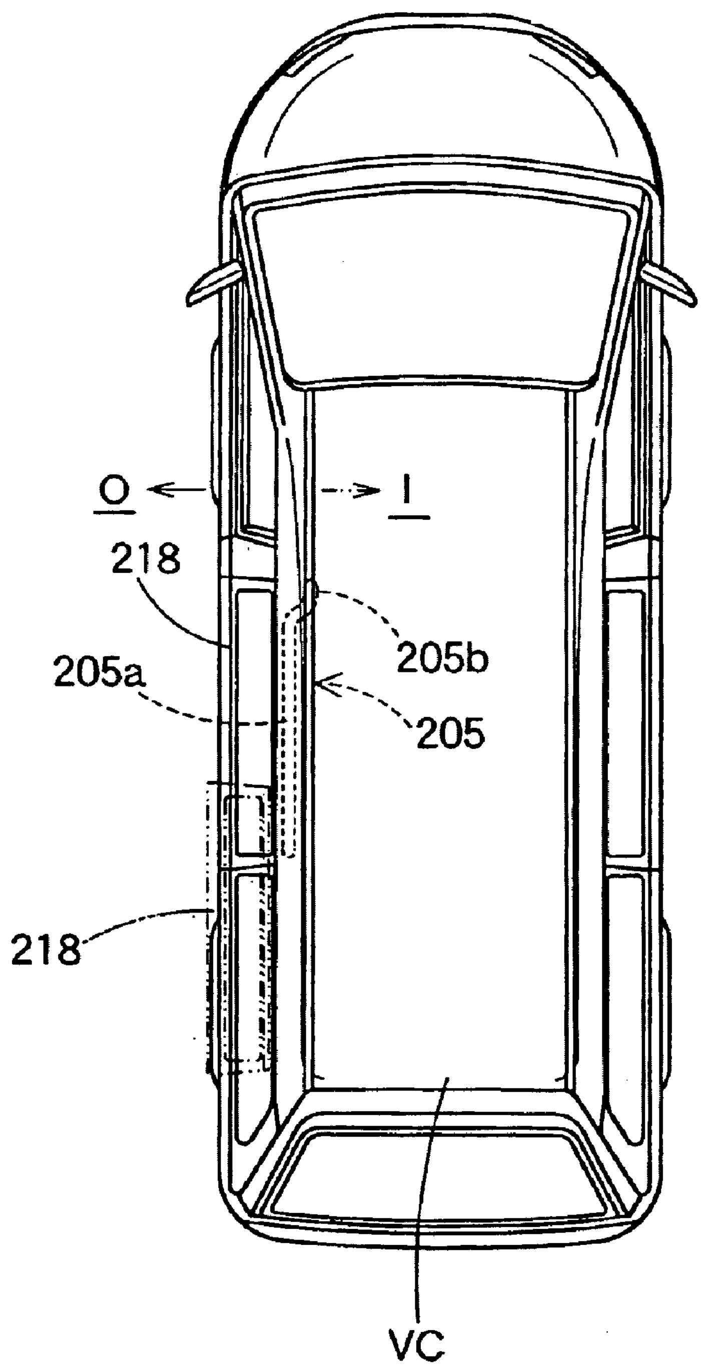
FIG. 46 is a schematic top plan view of the vehicle according to the sixth embodiment.

As shown in FIGS. 38 and 40 to 43, the upper rail 205 is arranged between the first/second intermediate pillar portions P1/P2 on the outer side O of the roof side rail portion RR. The upper rail 205 is arranged in a generally horizontal direction and is so constructed in its top plan that a straight portion 205*a* is bent to the inner side I in the vicinity of its front end, as shown in FIG. 46. A bent portion 205*b* at the front end of the straight portion 205*a* is so bent that the face of the front edge side of the closed slide door 218 on the outer side O may be flush with the face of the body 201 on the outer side O.

Figure 44:
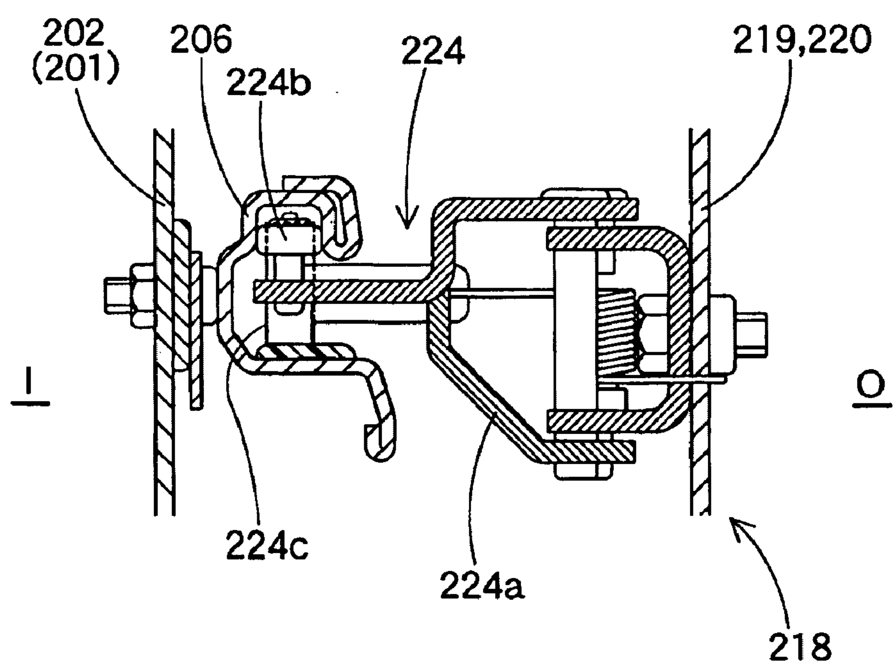
FIG. 44 is a schematic longitudinal section of the vicinity of a center rail for sliding the slide door of the sixth embodiment.

The center roller unit 224 to be arranged at the generally vertically intermediate portion of the rear edge of the slide door 218 is constructed, as shown in FIGS. 43 and 44, to include a rotatable roller 224*b* having a generally vertical pivot, a rotatable roller 224*c* having a generally horizontal pivot, and a bracket 224*a* for bearing the rollers 224*b*/224*c* at the end portion on the inner side I. The bracket 224*a* is arranged to extend to the inner side I from the inner panel 220 of the door frame 219. Moreover, the rollers 224*b*/224*c* of the center roller unit 224 are fitted in a center rail 206 fixed on the inner panel 202 on the side of the body 201.

Here, the center rail 206 is also arranged generally horizontally and is bent in the vicinity of its front end, as viewed in a top plan, to the inner side I, so that the face of the rear edge side of the closed slide door 218 on the outer side O may be flush with the face of the body 201 on the outer side O.

Figure 45:
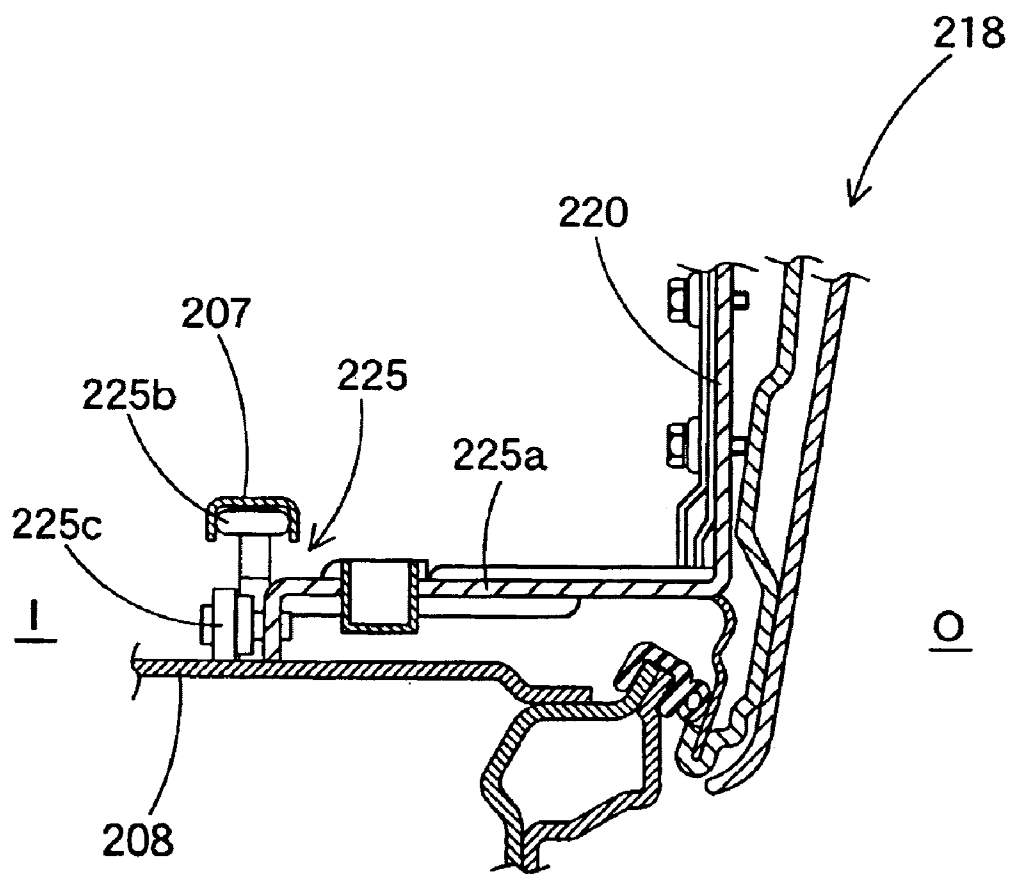
FIG. 45 is a schematic longitudinal section of the vicinity of a lower rail for sliding the slide door of the sixth embodiment.

The lower roller unit 225 to be arranged in the lower portion of the front edge side of the slide door 218 is constructed, as shown in FIGS. 43 and 45, to include a rotatable roller 225*b* having a generally vertical pivot, a rotatable roller 225*c* having a generally horizontal pivot, and a bracket 225*a* for bearing the rollers 225*b*/225*c* at the end portion on the inner side I. The bracket 225*a* is arranged to extend to the inner side I from the inner panel 220 of the door frame 219. The roller 225*b* of the lower roller unit 225 is fitted in a lower rail 207 fixed separately on the side of the body 201, and the roller 225*c* is held to abut against the upper face of a floor panel 208 on the side of the body 201.

This lower rail 207 is also arranged generally horizontally and is bent in the vicinity of its front end, as viewed in a top plan, to the inner side I, so that the face of the front edge side of the closed slide door 218 on the outer side O may be flush with the face of the body 201 on the outer side O.

Figure 47:
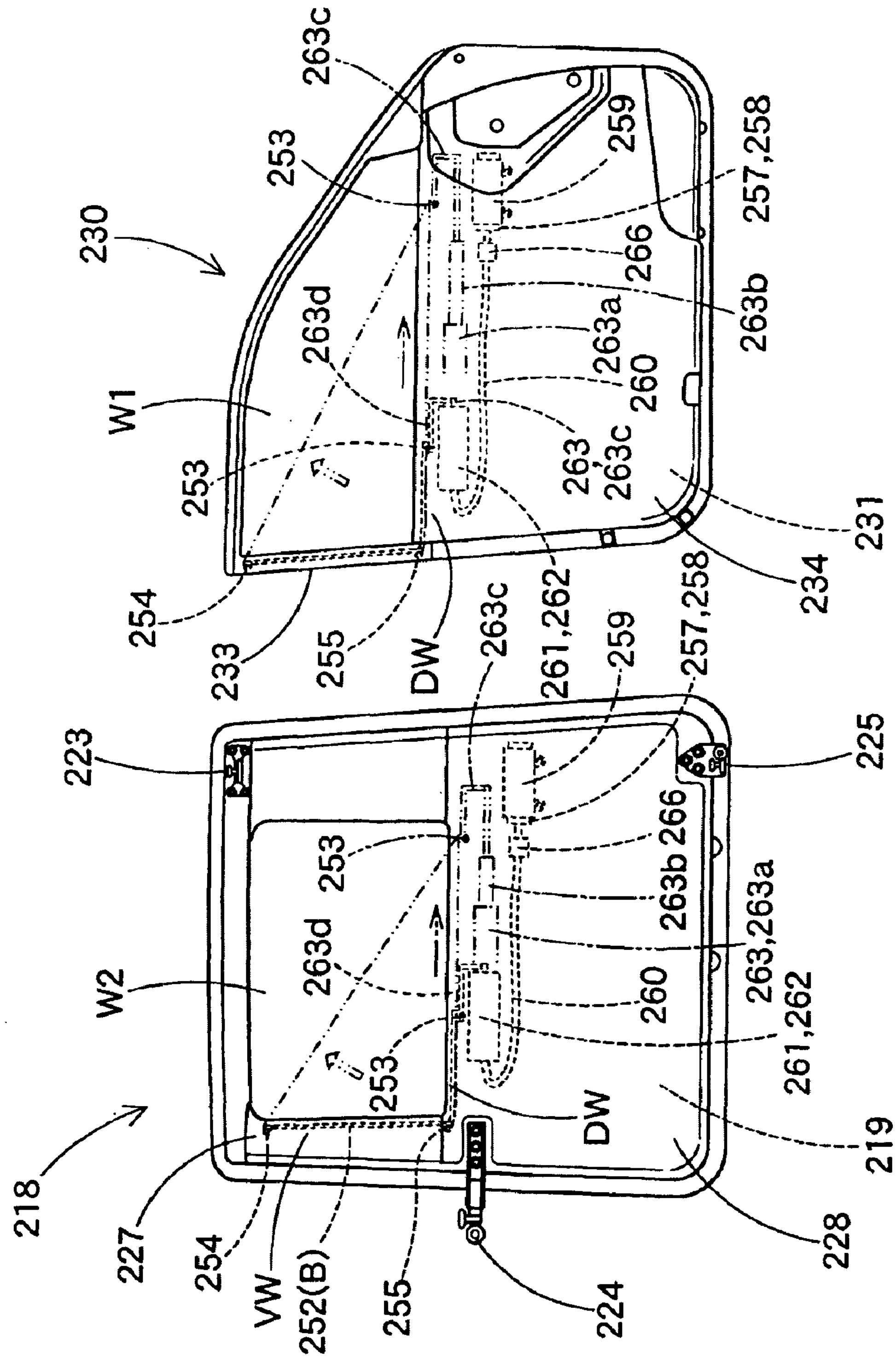
FIG. 47 is a diagram for explaining a shielding member mounted in the door of the vehicle according to the sixth embodiment.
Figure 49:
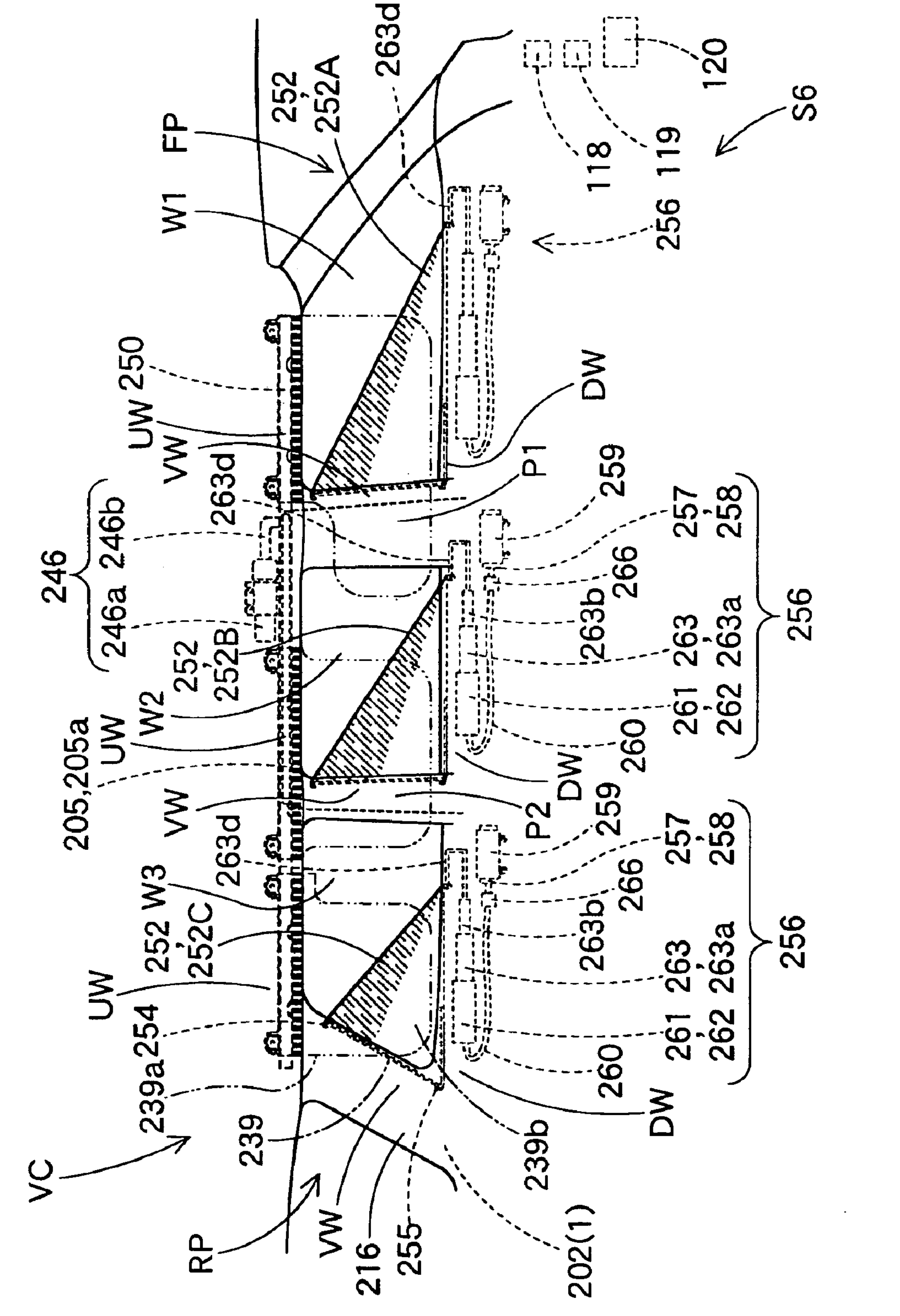
FIG. 49 is a front elevation showing the acting time of the occupant restraining device of the sixth embodiment as taken from the inside of the vehicle.

As shown in FIGS. 38, 47 and 49, the shielding member 252 is formed of a flexible cloth having a triangular sheet shape in an expanded state and is folded and housed in an L-shape in the peripheral edge of the window W1/W2/W3 from the rear side vertical edge portion VW to the lower edge portion DW. The shielding member 252 has apex portions 253/254/255 located at the front end, the rear edge upper portion and the rear edge lower portion in the expanded state. The apex portion 253 is connected to a piston rod upper end 263*d*, which is part of the later-described connection means 261 of deployment means 256. The apex portions 254/255 are fixed at the upper/lower corners of the peripheral edge of the window W1/W2/W3. In the case of the sixth embodiment, the shielding member 252A/252B on the front side is fixed at its apex portion 254 on the door frame 219/231 of the slide door 218 or a front door 230. Moreover, the apex portion 254 is fixed at the upper portion of the vertical edge portion VW of the peripheral edge of the window W1/W2. On the other hand, the shielding member 252A/252B is fixed at its apex portion 255 in the door frame 219/231. On the other hand, the apex portion 255 is fixed in the lower portion of the vertical edge portion VW of the peripheral edge of the window W1/W2.

Moreover, the shielding member 252C on the rear end side is fixed at its apex portion 254 in the upper portion of the inner panel 202 on the side of the body 201. The apex portion 254 is fixed in the upper portion of the vertical edge portion VW of the peripheral edge of the window W3. On the other hand, the shielding member 252C is fixed at its apex portion 255 in the inner panel 202 on the side of the body 201. The apex portion 255 is fixed in the lower portion of the vertical edge portion VW of the peripheral edge of the window W3.

Figure 48:
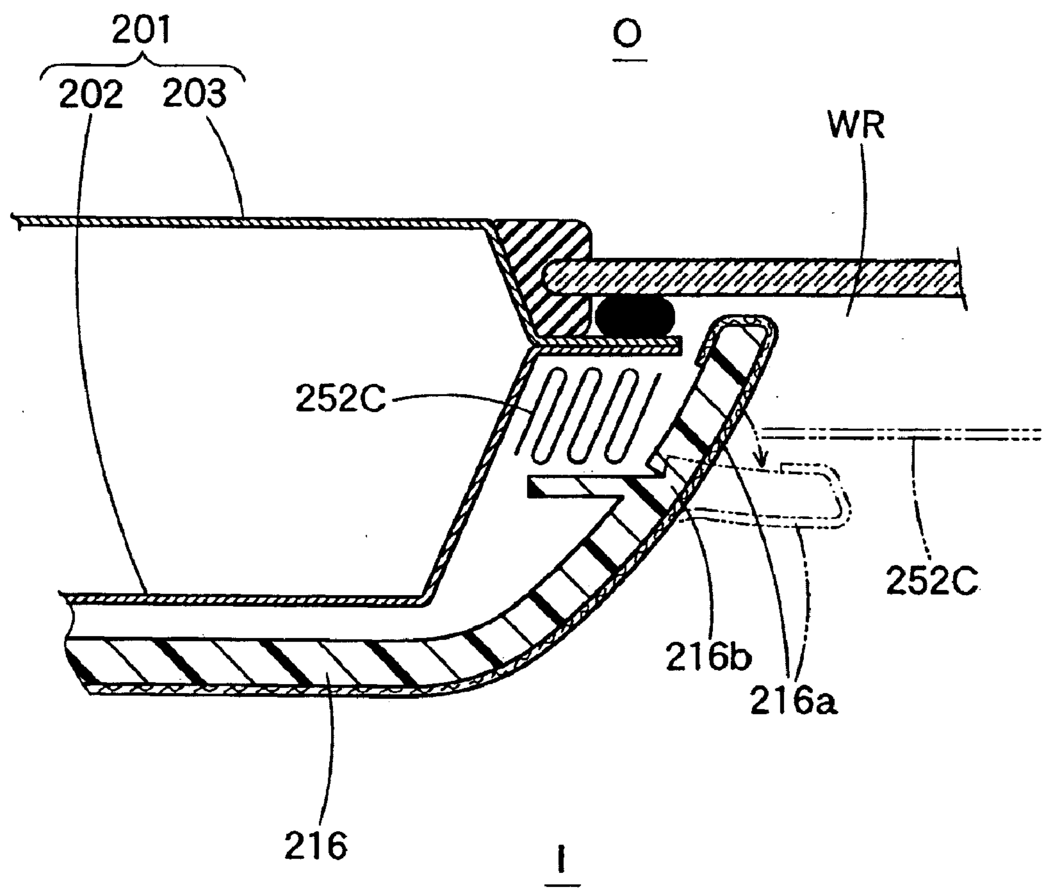
FIG. 48 is a schematic section of a portion XXXXVIII—XXXXVIII of FIG. 38.

Moreover, the shielding member 252A/252B/252C is covered, when it is folded and housed in the L-shape, with a door garnish 233/227, a door trim 234/228 or a window edge garnish (or quarter trim) 216. Here, the quarter trim 216 is mounted and fixed on the inner panel 202 of the peripheral edge of the window W3 on the side of the body 201. The door garnish 233/227, the door trim 234/228 or the quarter trim 216 can be either pushed/opened to the inner side or broken, as in the first/second embodiment, by the shielding member 252A/252B/252C thereby to allow the shielding member 252A/252B/252C to expand (as referred to the door portion 37 of FIG. 3, the door portion 45 shown in FIGS. 12 and 13, and a door portion 216*a* or *a* hinge portion 216*b* of FIG. 48).

The deployment means 256 for letting off the shielding member 252 is provided with an inflator 258 as a drive source 257. The inflator 258 is constructed to discharge the inflating gas when activated. In the case of the sixth embodiment, on the other hand, the connection means 261 for guiding the expanding shielding member 252 is constructed, as in the second embodiment, to include a cylinder 262 for admitting the inflating gas from the inflator 258, and a piston rod 263 which protrudes largely from the cylinder 262 when the inflating gas flows into the cylinder 262. To the cylinder 262, there is connected a feed pipe 260 for guiding the inflating gas from the inflator 258. The rod 263 is composed of a first rod 263*a* protruding from the cylinder 262, a second rod 263*b* protruding from the first rod 263*a*, and a third rod 263*c* protruding from the second rod 263*b*. The apex portion 253 of the shielding member 252 is connected to the upper end 263*d* protruding forward from the third rod 263*c*.

The inflator 258 is fixed in the door frame 231/219 or the inner panel 202 on the lower side of the peripheral edge of the window W1/W2/W3 by using a mounting bracket 259. The cylinder 262 is arranged on the lower side of the peripheral edge of the window W1/W2/W3 by fixing itself on the door frame 231/219 or the inner panel 202 with not-shown mounting bracket.

The feed pipe 260 is provided near the inflator 258 with a flow control valve 266 for adjusting the flow rate of the inflating gas. This flow control valve 266 is electrically connected with the control device 120 so that the adjustment of the flow rate of the inflating gas may be controlled by the control device 120. As in the second embodiment, the flow control valve 266 is normally kept in a fully open state and is controlled to a closed side for throttling the flow rate of the inflating gas by the control device 120. If the inflator 258 is activated in the fully open state of the flow control valve 266, the shielding member 252 completes its expansion as the airbag 238 completes its expansion. When flow control valve 266 is controlled to throttle the flow rate of the inflating gas, on the other hand, the shielding member 252 completes its expansion after the airbag 238 completes its expansion. As in the second embodiment, the control device 120 of the sixth embodiment activates the inflator 258 without throttling the flow control valve 266 when it receives a side collision detection signal from the side collision sensor 119. In response to a rollover detection signal from the rollover sensor 118, on the other hand, the control device 120 controls the flow control valve 266 to throttle the flow rate of the inflating gas.

As shown in FIG. 38, moreover, the occupant restraining device S6 is constructed to include not only the shielding member 252, the deployment means 256, the rollover sensor 118, the side collision sensor 119 and the control device 120 but also the airbag 238 (238A/238B/238C), an inflator 246, mounting brackets 243/247 and a feed pipe 250. This feed pipe 250 feeds the airbag 238A/238B/238C with the inflating gas from the inflator 246.

Figure 41:
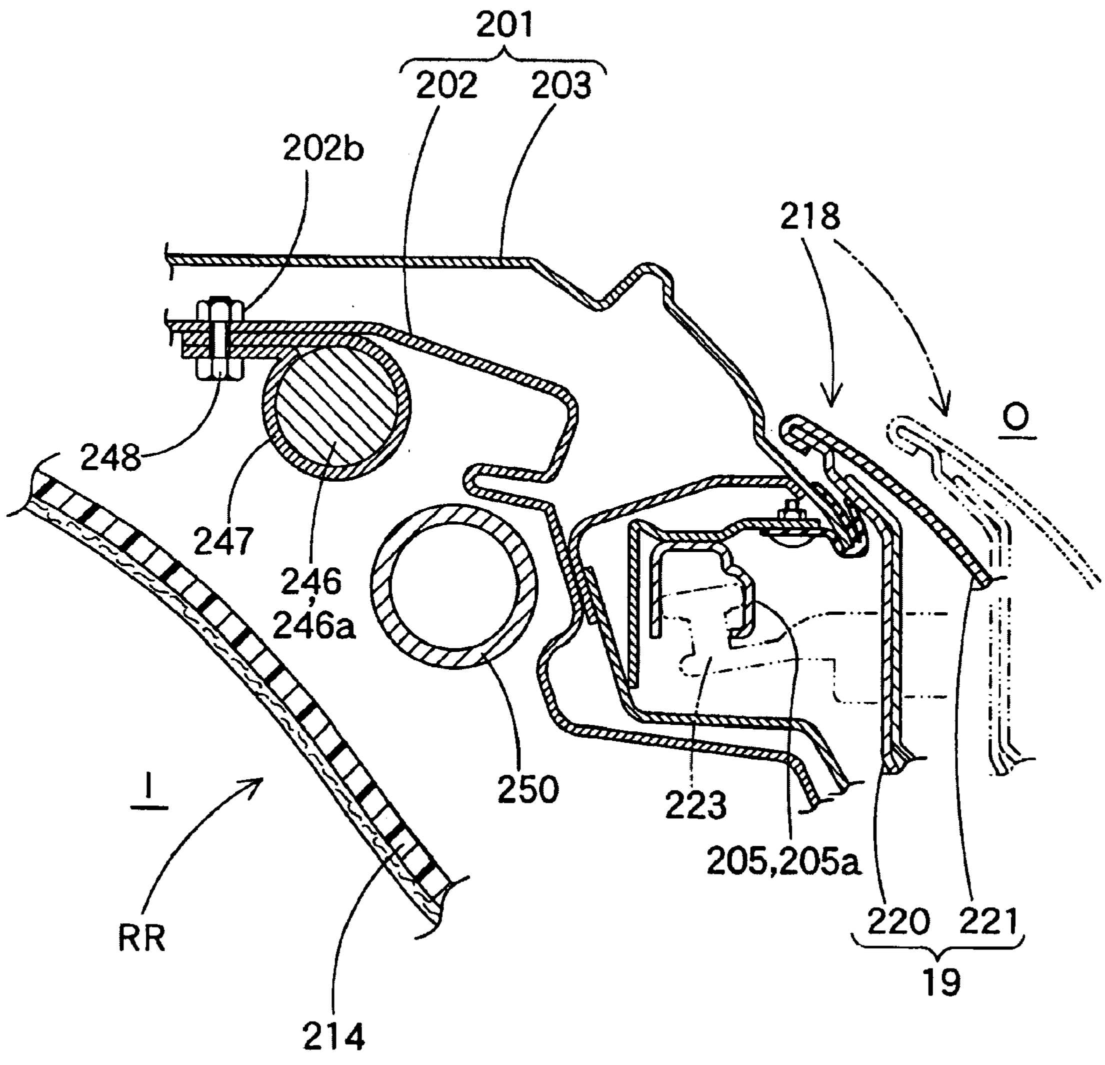
FIG. 41 is an enlarged schematic section of a portion XXXXI—XXXXI of FIG. 38.

This inflator 246 is arranged on the inner side I of the inner panel 202 of the body 201 in the roof side rail portion RR, as shown in FIGS. 38 and 41. The inflator 246 includes a cylinder type body portion 246*a* and a communication portion 246*b*. This communication portion 246*b* is formed into a pipe to introduce the inflating gas discharged from the body portion 246*a* into the feed pipe 250. The inflator 246 is clamped by the mounting bracket 247 at the body portion 246*a*. The inflator 246 is fixed on the inner panel 202 by mounting the mounting bracket 247 on the inner panel 202 by means of bolts 248. These bolts 248 are fastened in nuts 202*b* disposed on the inner panel 202.

The feed pipe 250 is made of a metal pipe material having an annular section with two ends closed, as shown in FIGS. 38 to 42. The feed pipe 250 is arranged to extend from the back side of the front pillar portion FP through the upper side of the first/second intermediate pillar portions P1/P2 to the vicinity of the upper side of the rear pillar portion RP. The feed pipe 250 is provided with a plurality of openings 250*a*. These openings 250*a* are formed at portions where the feed pipes 250 are inserted into each of the airbags 238. The opening 250*a* feeds the airbag 238 with the inflating gas having flown into the pipe 250. This feed pipe 250 is arranged to have its axis in the longitudinal direction generally parallel to the straight portion 205*a* of the upper rail 205.

Figure 39:
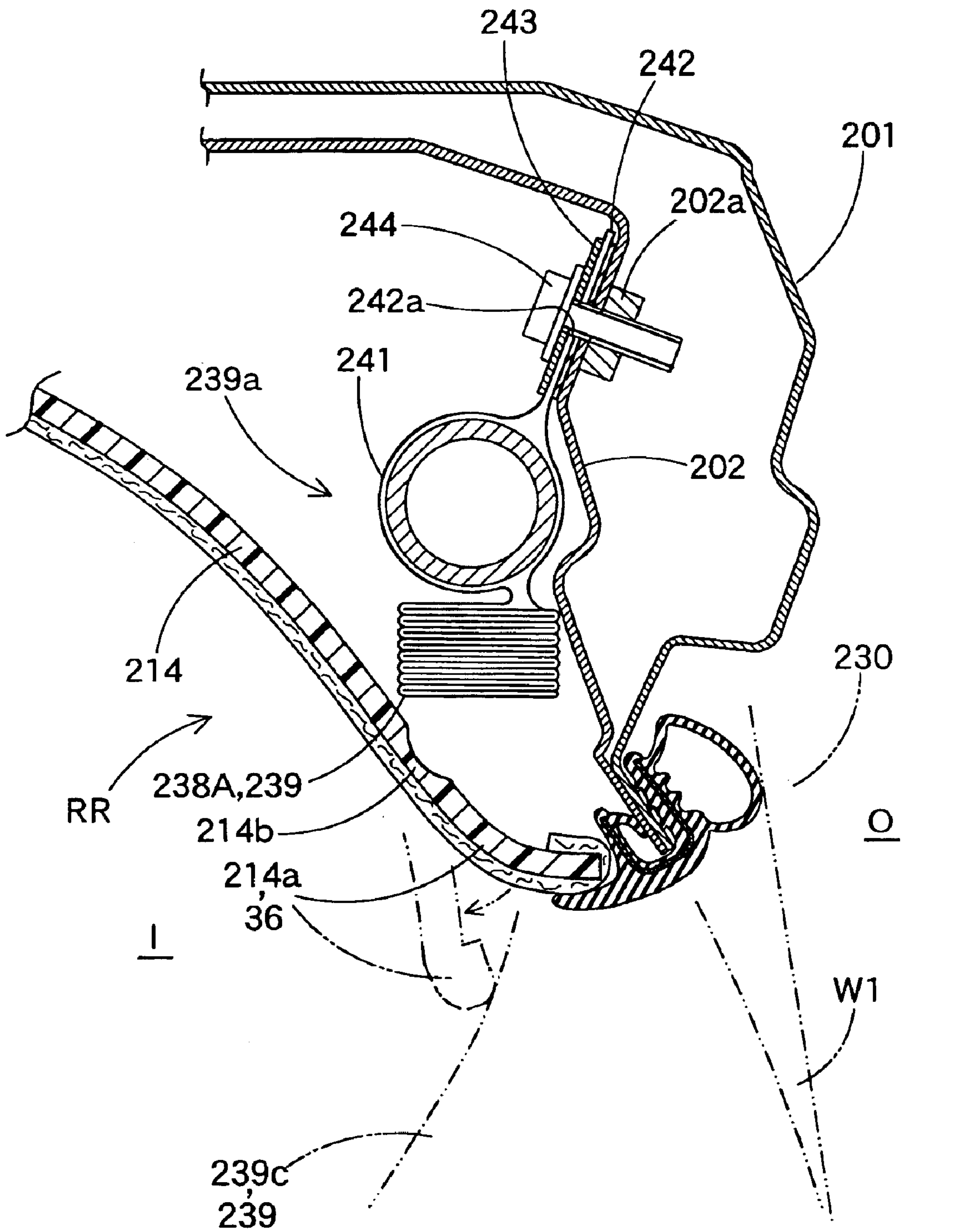
FIG. 39 is an enlarged schematic section of a portion XXXIX—XXXIX of FIG. 38.
Figure 40:
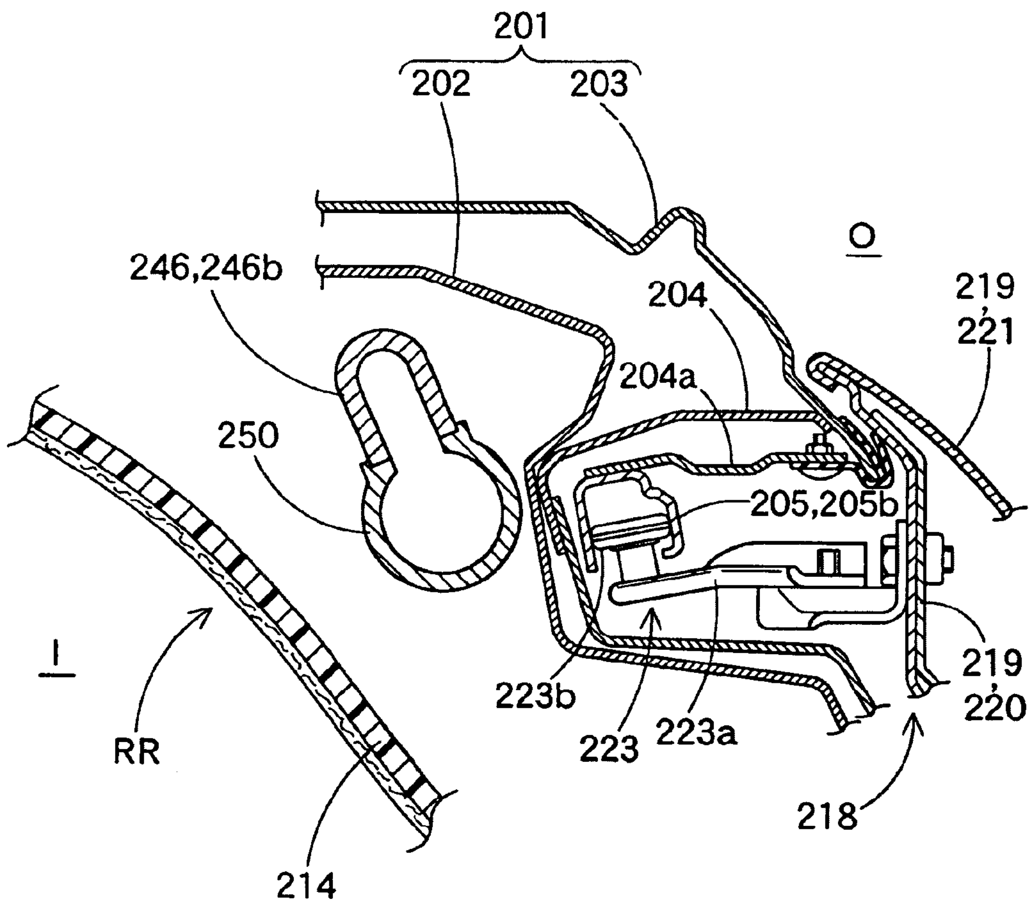
FIG. 40 is an enlarged schematic section of a portion XXXX—XXXX of FIG. 38.

As shown in FIGS. 38 and 39, moreover, the airbag 238A is arranged as the front side one. This front side airbag 238A is folded and housed on the inner side I of the roof side rail portion RR in front of the bent portion 205*b* of the upper rail 205. The airbag 238B is arranged as a rear side one, as shown in FIGS. 38 and 42. This rear side airbag 238B is folded and housed on the inner side I of the roof side rail portion RR on the rear side of the bent portion 205*b* of the upper rail 205. The airbag 238C is arranged as an end side one, as shown in FIG. 38. This end side airbag 238C is folded and housed on the inner side I of the roof side rail portion RR on the rear side of the upper rail 205.

Figure 50:
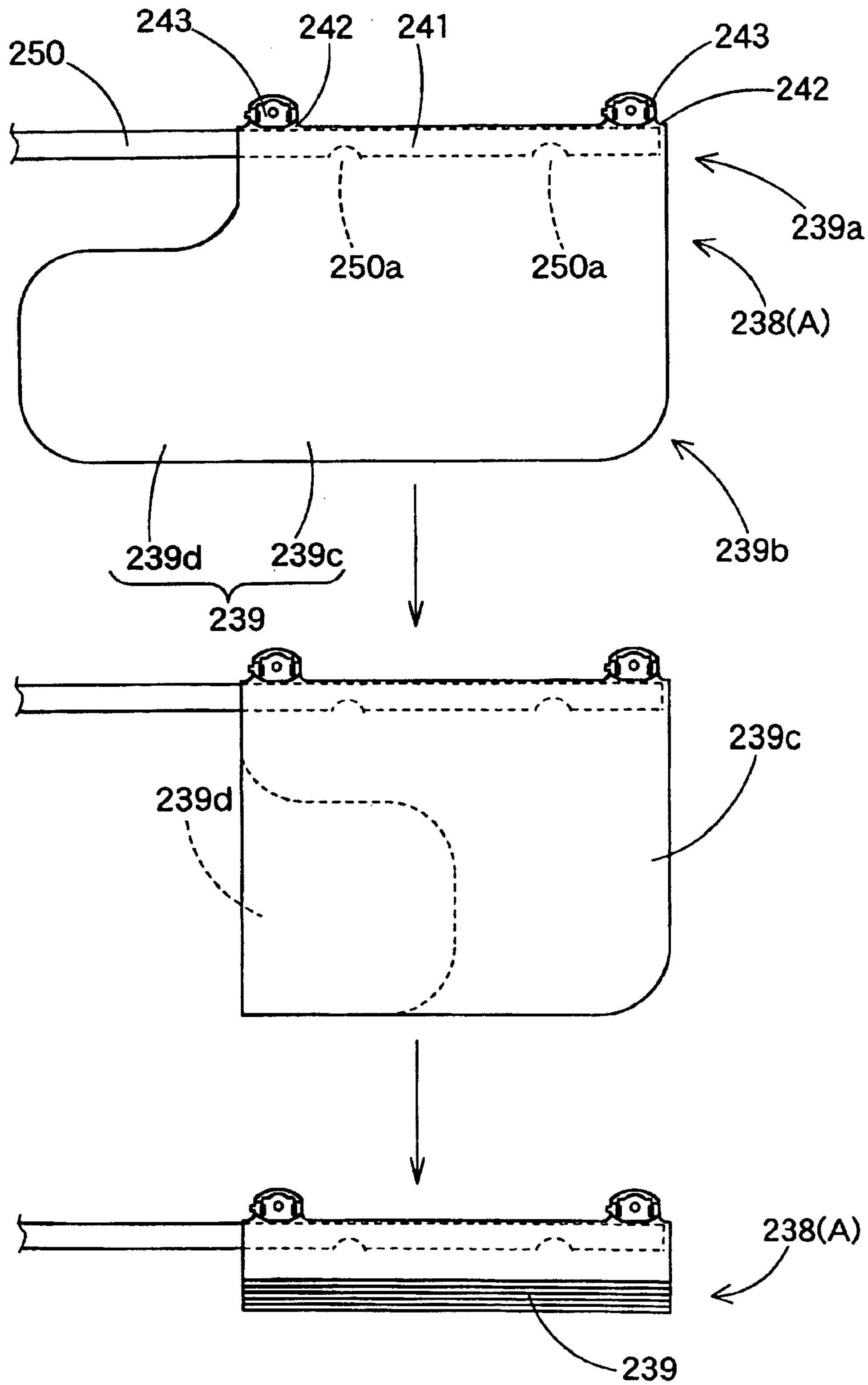
FIG. 50 diagrams the steps of folding a front side airbag of the sixth embodiment.

The airbag 238A/238B/238C is provided on the side of its upper edge (or upper end) 239*a* with a plurality of mounting portions 242 for mounting itself on the inner panel 202 on the side of the body 201. In the mounting portion 242, there is formed a mounting hole 242*a* and the mounting bracket 243 is fixed thereon (as referred to FIGS. 38, 39 and 50). Moreover, the mounting portion 242 is fastened together with the mounting bracket 243 by a mounting bolt 244 inserted into the mounting hole 242*a* so that it is mounted on the inner panel 202 on the side of the body 201. The bolt 244 is fastened in a nut 202*a* disposed on the inner panel 202.

The airbag 238A/238B/238C is constructed to include an insertion portion 241 having the feed pipe 250 inserted thereinto below the mounting portion 242, and a body portion 239 below the insertion portion 241. This insertion portion 241 has the feed pipe 250 inserted thereinto while retaining its sealing properties. In that portion of the feed-pipe 250 which is inserted into the insertion portion 241, there is formed the opening 250*a* which can feed the body portion 239 with the inflating gas.

The body portion 239 of the rear/end side airbag 238/238C is formed into a shape to extend downward, when expanded, in a generally rectangular sheet shape from between the two front and rear end mounting portions 242/242 on the side of the upper edge 239*a*. The body portion 239 of the rear side airbag 238B covers, when expanded/inflated, the vicinity of the inner side of a pillar garnish 211 of the second intermediate pillar portion P2. At the time of extension/inflation, the body portion 239 of the end side airbag 238C covers the inner side of the quarter trim 216 in the rear pillar portion RP.

The body portion 239 of the front side airbag 238A is provided with a main portion 239*c* and a bulging portion 239*d*. The main portion 239*c* is formed to extend downward, when expanded, in a generally rectangular shape from between the two front/rear end mounting portions 242/242 on the side of the upper edge 239*a*. The bulging portion 239*d* protrudes to extend backward in a generally rectangular sheet shape from the main portion 239*c*. At the time of expansion/inflation, this body portion 239 of the front side airbag 238A covers the inner side of the front side window W1 of the vehicle VC with its main portion 239*c*, and covers the inner side of a pillar garnish 210 of the first intermediate pillar portion P1 with its bulging portion 239*d*. In short, this bulging portion constructs the cover portion 239*d* for covering the inner side of the pillar portion P1.

With the feed pipe 250 being inserted, the airbag 238B/238C is folded into such a bellows that the body portion 239 of the airbag 238B/238C has its lower end 239*b* (or lower edge) closer to the side of the feedpipe 250 with its folds being arranged in the axial direction of the feed pipe 250. On the other hand, the airbag 238A is folded into such a bellows that the body portion 239 has its cover portion (or bulging portion) 239*d* put into the main portion 239*c* and then has its lower edge 239*b* closer to the side of the feed pipe 250 with its folds being arranged in the axial direction of the feed pipe 250, as shown in upper and middle diagrams of FIG. 50.

Here, the airbag 238A/238B/238C is wrapped, after being folded, with the not-shown breakable tapes so that it may not be collapsed. The mounting bracket 243 is fixed in advance on the mounting portion 242.

Before the airbag 238A/238B/238C is folded, the communication portion 246*b* of the inflator 246 is connected to the feed pipe 250, and the mounting bracket 247 is assembled with the inflator body portion 246*a*. With the feed pipe 250 being inserted, the airbag 238A/238B/238C is folded and wrapped with the not-shown breakable tapes. Then, it is possible to form an airbag assembly which is composed of the airbag 238 (238A/238B/238C), the inflator 246, the mounting bracket 243/247 and the feed pipe 250. Moreover, this airbag assembly can be mounted and fixed on the body 201 by fixing the mounting brackets 243/247 on the inner panel 202 by means of the mounting bolts 244/248. After this, a roof head lining 214 may be mounted as an airbag cover 236 on the vehicle VC.

Here, the airbag 238 is housed, when mounted on the vehicle VC, in the upper edge portion UW of the window W1/W2/W3, as shown in FIGS. 38 and 39, so that it is covered with the lower edge 214*a* of the roof head lining 214. When the airbag 238 is expanded/inflated, the lower edge 214*a* becomes a door portion which is pushed and opened to the inner side I by the airbag 238. The door portion is provided on its upper edge side with a thin hinge portion 214*b* so that it may be easily opened. This hinge portion 214*b* is arranged generally linearly along the longitudinal direction of the vehicle VC.

On the other hand, the shielding member 252, the deployment means 256, the rollover sensor 118, the side collision sensor 119 and the control device 120 are mounted together with the airbag assembly on the vehicle VC.

After the airbag assembly and so on were mounted on the vehicle VC, moreover, the control device 120 activates the inflator 246 in response to predetermined detection signals from the sensors 118/119. When the inflator 246 is activated, the inflating gas is discharged from the inflator body portion 246*a* so that it is fed from the inflator communication portion 246*b* to the feed pipe 250 and further from the opening 250*a* of the feed pipe 250 into the body portion 239 of the airbag 238A/238B/238C. Then, the body portion 239 of the airbag 238A/238B/238C is inflated while breaking not-shown tape members, to push and open the roof head lining lower edge 214*a* into the inner side I, so that it covers predetermined portions, as indicated by double-dotted lines in FIGS. 38 and 49. In the body portion 239 of the front side airbag 238A, the body portion 239*c* expands downward at the beginning of expansion, and the cover portion (or bulging portion) 239*d* protrudes backward from the main portion 239*c*. Then, the cover portion 239*d* thus having protruded covers the inner side of the first intermediate pillar portion P1.

At this time, the control device 120 controls the flow control valve 266 properly to activate the inflator 246 of the deployment means 256. Therefore, the piston rod 263 is elongated, as shown in FIG. 49, so that the shielding member 252A/252B/252C shields the window W1/W2/W3.

In the occupant restraining device S6 of the sixth embodiment, moreover, the airbag 238 (238A/238B/238C) at the time of completion of expansion/inflation has its lower end 239*b* as the free end capable of swinging generally perpendicularly to the window W1/W2/W3, so that working-effects similar to those of the first embodiment can be attained.

Even if the sixth embodiment employs the three airbags 238A/238B/238C, these airbags 238A/238B/238C share the single inflator 246*by* using the feed pipe 250. Therefore, it is possible to reduce the number of parts of the occupant restraining device S6 to be mounted on the vehicle VC and the number of their mounting steps.

In the occupant restraining device S6 of the sixth embodiment, moreover, the feed pipe 250 is inserted straight below the mounting portions 242 and on the side of the upper edge 239*a* in the airbag 238A/238B/238C generally over the entire length of the vehicle VC in the longitudinal direction on the side of the airbag upper edge 239*a*. Therefore, the swinging center of the airbag 238A/238B/238C can be formed straight along the longitudinal direction of the vehicle VC at the portion of the feed pipe 250 inserted into the side of the airbag upper edge 239*a*. As a result, the airbag 238A/238B/238C can swing smoothly in its entirety on the side of the lower edge 239*b*.

In the sixth embodiment; the airbag 238A at the time of completion of the expansion/inflation is shaped to include the main portion 239*c* of a generally rectangular sheet shape extending downward from the side of the upper edge 239*a*, and the bulging portion 239*d* bulging from at least one edge of the main portion 239*c* in the longitudinal direction of the vehicle. The airbag 238A, moreover, is folded toward the side of the upper edge 239*a* of the airbag 238A with the bulging portion put in the main portion 239C. With the length of the folded airbag 238A taken along the side of the upper edge 239*a* being made compact, therefore, the area of the airbag 238A at the time of completion of the expansion/inflation can be enlarged by the bulging portion 239*d*.

In the sixth embodiment, moreover, the bulging portion 239*d* is constructed to cover the inner side of the pillar portion P1 so that the airbag 238A can protrude from the upper edge portion UW of the window W1 to cover the inner side of the pillar portion P1. Even if the pillar garnish 210 is arranged on the inner side of the pillar portion P1 as in the embodiment, therefore, the inner side of the pillar portion P1 can be smoothly covered with the bulging portion 239*d* of the airbag 238A without having the airbag intrude into the outer side of the pillar garnish 210. Here, when the airbag is so protruded from the upper side of the pillar portion P1 as to cover the inner side of the pillar portion P1, the airbag easily intrudes into the outer side of the pillar garnish 210, which requires an intrusion preventing means.

In the embodiment, moreover, the airbag 238A is folded by inserting the bulging portion 239*d* into the main portion 239*c* so that the bulging portion 239*d* of the front side airbag 238A being expanded/inflated is deployed from the main portion 239C to protrude backward. In the embodiment, therefore, the bulging portion 239*d* can be expanded/inflated with the least protrusion to the inner side. Without considering this point, the bulging portion 239*d* is folded back to the inner or outer side of the main portion 239*c*, and the airbag 238A may be folded in the bellows shape to bring the lower edge 239*b* to the side of the upper edge 239*a* of the airbag 238A.

In the sixth embodiment, moreover, the front/rear airbags 238A/238B are connected to the single feed pipe 250 for feeding the inflating gas from the single inflator 246, and are arranged separately in front and in rear of the bent portion 205*b* of the upper rail 205.

In case the folded front/rear airbags 238A/238B are to be housed in the roof side rail RR of the vehicle VC, they can be arranged in front and in rear of the bent portion 205*b* of the upper rail 205. As a result, the airbags 238A/238B can be easily arranged in the roof side rail portion RR without any interference with the bent portion 205*b* of the upper rail 205.

If the member for feeding the inflating gas to the front/rear airbags 238A/238B is the single feed pipe 250, it avoids bulkiness. Moreover, the feed pipe 250 itself can have as a small diameter as possible as long as it can feed the inflating gas. Therefore, the feed pipe 250 can be easily arranged in the roof side rail portion RR including the side of the bent portion 205*b* of the upper rail 205.

In the occupant restraining device S6 of the sixth embodiment, therefore, the folded air bags 238A/238B can be housed without any difficulty in the roof side rail portion RR of the vehicle VC having the slide door 218, so that they can be easily mounted on the vehicle VC.

In the vehicle VC of the prior art having the slide door 218, the upper rail 205 is arranged in the roof side rail portion RR so that the space for housing the folded bulky airbag 238 can hardly be retained in the roof side rail portion RR. Especially on the front end side of the upper rail 205, there is arranged the bent portion 205*b* which is bent to the inner side, so that the face of the closed slide door 218 on the outer side may be flush with the face of the body 201 on the outer side. Therefore, it is more difficult to house the folded airbag 238 in the roof side rail portion RR.

In the sixth embodiment, moreover, the front side airbag 238A is folded and housed in the portion of the roof side rail portion RR on the front side of the bent portion 205*b*, and is provided with the cover portion 239*d* which can cover the inner side of the pillar portion P1 located below the bent portion 205*b*, at the expansion/inflation time. Therefore, the front side airbag 238A is enabled at the expansion/inflation time to cover the inner side of the pillar portion P1 located below the bent portion 205*b*, with the cover portion 239*d*. As a result, the cover portion 239*d* can properly arrest an occupant taking the position of the pillar portion P1.

In the sixth embodiment, on the other hand, the feed pipe 250 is arranged at the position of the upper rail 205 in the longitudinal direction generally parallel to the straight portion 205*a* of the upper rail 205. In other words, the feed pipe 250 is prevented from interfering with the straight portion 205*a* of the upper rail 205 so that it can be easily arranged in the roof side rail portion RR.

Here, the sixth embodiment has been described on the case in which the inflator 246 is arranged in the roof side rail portion RR and connected to the generally intermediate portion of the feed pipe 250. However, the inflator 246 may be arranged on the front or rear end side of the feed pipe 250. In the case of this construction, the inflator 246 may be arranged at or below the front pillar portion FP or at the rear pillar portion RP, and the feed pipe 250 may be so bent at its end portion that it can be connected to the inflator 246.

Here, the foregoing individual embodiments have been described on the case in which only one shielding member shields the window WF/WR/WS. However, a plurality of shielding members may be deployed to shield the single window.

Moreover, the shielding member may be constructed to cover not only the inner side of a window but also the outer side of the window.

What is claimed is:

1. An occupant restraining device comprising a shielding member and an airbag, said shielding member being deployed from the peripheral edge of a window of a vehicle to shield said window when a rollover of a vehicle is detected, and said airbag being expanded and inflated from the peripheral edge of said window to be interposed between said shielding member and an occupant when a rollover of a vehicle is detected, wherein said shielding member is arranged to substantially rise from the lower edge side of said window peripheral edge thereby to shield said window on the outer side of an occupant, and wherein said airbag is folded and housed in the upper edge portion of said window peripheral edge while allowing the lower end side thereof at the time of completion of the expansion and inflation to move in a direction generally perpendicular to said window, and having the upper end side thereof at the time of completion of the expansion and inflation connected to and supported by the upper edge portion of said window peripheral edge.

2. An occupant restraining device according to claim 1, wherein:

said window is formed in a door of the vehicle;

said shielding member is housed in the side of said door, and said airbag is housed in an upper edge portion of said window on the body side of the vehicle.

3. An occupant restraining device according to claim 1, wherein said window is formed in the body of the vehicle, and wherein said airbag and said shielding member are housed in the body at said window peripheral edge.

4. An occupant restraining device according to claim 1, wherein said shielding member has an oblique side in its shape at the completion of deployment such that the shielding member crosses said window obliquely and is shaped to shield said window by the lower side of said oblique side.

5. An occupant restraining device according to claim 4, wherein said shielding member is so folded and housed that said oblique side may come close to a vertical edge portion extending upward from one of the front or rear end portions of the lower edge portion of said window peripheral edge in the shielded region of said window, and said shielding member is so arranged that said oblique side may deploy the lower end side thereof in the direction apart from the side of said vertical edge portion on a housed side.

6. An occupant restraining device according to claim 1, wherein said airbag is arranged so that substantially the entire length of the lower end of the portion to shield the inner side of said window at the completion of the expansion and inflation horizontally overlaps said shielding member when deployment is completed.

7. An occupant restraining device according to claim 1, wherein said airbag covers the inner side of a pillar portion of the vehicle at the time of completion of the expansion and inflation.

8. An occupant restraining device according to claim 7, wherein said airbag covers a part of an adjoining window over said inner side portion of said pillar portion.

9. An occupant restraining device according to claim 1, wherein said occupant restraining device includes a plurality of airbags having their lower edge sides connected to one another.

10. An occupant restraining device according to claim 1, further comprising an inflator for feeding said airbag with an inflating gas, wherein said occupant restraining device includes a plurality of airbags arranged in a longitudinal direction of the vehicle, and wherein said inflator is so interposed between said airbags as to feed each of said airbags with the inflating gas.

11. An occupant restraining device according to claim 1, wherein said occupant restraining device includes at least three airbags sharing one inflator.

12. An occupant restraining device according to claim 1, further comprising an inflator for feeding a plurality of airbags with an inflating gas; and a feed pipe for feeding the inflating gas from said inflator into said airbags;

wherein said feed pipe is inserted straight through the upper edge side of said airbags over the substantially entire length of the upper edge side of said airbags in the longitudinal direction of the vehicle.

13. An occupant restraining device according to claim 1, wherein said airbag at the time of completion of the expansion and inflation includes a main portion having a generally rectangular sheet shape extending downward from the upper edge side, and a bulging portion bulging from at least one of the front or rear edge of said main portion along the longitudinal direction of the vehicle, and wherein said airbag is folded in the upper edge portion of said window peripheral edge having said bulging portion put into said main portion.

14. An occupant restraining device according to claim 13, wherein said bulging portion covers the inner side portion of a pillar portion.

15. An occupant restraining device according to claim 1, wherein said vehicle is provided at a roof side rail portion with an upper rail which guides the opening/closing action of a slide door and which is provided with at its front end side with a bent portion bent to the inner side, wherein said occupant restraining device includes at least two front and rear airbags arranged separately in front and in rear of the bent portion of said upper rail, and wherein said front and rear airbags are folded and housed on the inner side of said roof side rail portion and are connected to one feed pipe for feeding the inflating gas from one inflator.

16. An occupant restraining device according to claim 15, wherein a plurality of airbags is arranged on the back side of said bent portion.

17. An occupant restraining device according to claim 15, wherein said front airbag is folded and housed in a portion of the roof side rail portion on the front side of said bent portion and is provided with a cover portion for covering the inner side portion of a pillar portion located below said bent portion at the time of the expansion and inflation.

18. An occupant restraining device according to claim 1, wherein:

said folded airbag is covered with a door portion which is pushed and opened inward of the vehicle from a lower edge thereof at the time of the expansion and inflation; and said door portion is provided with a hinge portion about which the door portion opens, and the hinge portion is arranged to extend substantially in a longitudinal direction of the vehicle.

* * * * *